US006268909B1

(12) United States Patent
Honmochi et al.

(10) Patent No.: US 6,268,909 B1
(45) Date of Patent: Jul. 31, 2001

(54) IMAGE FORMING APPARATUS

(75) Inventors: Hiroki Honmochi, Tokyo; Seiichiro Adachi; Mitsushige Murata, both of Abiko; Kazunori Sasa, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/310,938

(22) Filed: May 13, 1999

(30) Foreign Application Priority Data

May 13, 1998 (JP) ................................................ 10-130348

(51) Int. Cl.[7] .......................... G03B 27/00; G03B 27/32; G03B 27/52

(52) U.S. Cl. ............................... 355/407; 355/25; 355/40

(58) Field of Search ............................... 355/407, 27–29, 355/40–41, 23–26; 399/407–408; 270/37, 58.07–58.08, 58.11

(56) References Cited

U.S. PATENT DOCUMENTS 4,640,611 * 2/1987 Ohdake et al. ....................... 355/77
4,891,681 1/1990 Fiske et al. .......................... 355/322
5,461,469 10/1995 Farrell et al. ........................ 355/321
5,993,369 * 11/1999 Sekita et al. ......................... 493/429
6,003,853 * 12/1999 Nakazawa et al. ............... 270/58.11
6,006,065 * 12/1999 Seki .................................... 399/407
6,027,107 * 2/2000 Natsume et al. ....................... 270/37

FOREIGN PATENT DOCUMENTS 0 757 964 2/1997 (EP) .

* cited by examiner

*Primary Examiner*—Russell Adams
*Assistant Examiner*—Hung Henry Nguyen
(74) *Attorney, Agent, or Firm*—Fitzpatrick, Cella, Harper & Scinto

(57) ABSTRACT

In an image forming apparatus that folds plural sheets in folio, an image forming unit forms images an a recording area on the sheets and forms a margin between the recording area and another forming area. A projecting unit folds the sheets upon nipping the sheets between two rollers by projecting between the two rollers so as to nip a part of the sheets where the margin is formed at first. The projecting unit projects to the margin of prescribed width of images formed at an image forming apparatus body to fold the plural sheets.

5 Claims, 62 Drawing Sheets

| PAPER SIZE | PAPER WIDTH | ALIGNMENT SPEED | ALIGNMENT CONTROL | | PADDLE | |
|---|---|---|---|---|---|---|
| | | | FIRST STREET | SECOND SHEET ON LATER | | |
| A4 | 297 | HIGH SPEED | TWO STEPS | ONE STEP | ONE TIME | |
| LTR | 279 | HIGH SPEED | TWO STEPS | TWO STEPS | ONE TIME | |
| B5 | 257 | HIGH SPEED | ONE STEP | TWO STEPS | ONE TIME | |
| A3 | 297 | HIGH SPEED | ONE STEP | ONE STEP | TWO TIMES | |
| B4 | 257 | LOW SPEED | TWO STEPS | ONE STEP | TWO TIMES | |
| LGL | 216 | LOW SPEED | TWO STEPS | ONE STEP | TWO TIMES | |
| LDR | 279 | HIGH SPEED | ONE STEP | ONE STEP | TWO TIMES | |
| A4R | 210 | LOW SPEED | ONE STEP | ONE STEP | ONE TIME | |
| LTRR | 216 | LOW SPEED | ONE STEP | ONE STEP | ONE TIME | |

FIG. 17

| CONVENTIONAL | | 100% DUTY |
|---|---|---|
| | SMALL SIZE | 60% |
| | LARGE SIZE | 80% |

FIG. 38a

| | BUNDLE DELIVERY SETTING UP SPEED | | | | |
|---|---|---|---|---|---|
| | 2-9 SHEETS | 10-19 SHEETS | 20-30 SHEETS | 31-39 SHEETS | 40-50 SHEETS |
| LARGE SIZE | 700 mm/sec | 700 | 600 | | |
| SMALL SIZE | 500 | 450 | 400 | 400 | 350 |

FIG. 38b

IMAGE FORMING APPARATUS

BACKGROUND OF THE INVENTION

1. Field of the Invention

This invention relates to an image forming apparatus having a sheet processing apparatus for fetching sequentially sheets on which images are formed by an image forming means, stapling the plural sheets with a stapling means, and folding the sheets in folio.

2. Description of Related Art

Some image forming apparatus such as photocopiers or the like today can do bookbinding by stapling plural sheets and folding the sheets in folio where connected with a sheet processing apparatus. Such an apparatus forms images on double sides or the sheets at an image forming apparatus body, fetches sequentially the sheets, staples the sheets at about the center of the sheet bundle upon driving the stapler unit, and folds the sheets in folio where the sheets are conveyed to a folding means.

As a structure for folding the sheets in folio, it is structured by a folding roller means made of a roller pair, and a projecting means made of a projecting plate and so on. The projecting plate folds the sheet bundle upon projecting the stapled position of the sheet bundle between the nip portions, and the folded sheet bundle is pressed and conveyed by the roller pair to fold the bundle in folio. Therefore, the sheet bundles delivered to the delivery tray are delivered in a state that the sheet bundles are folded in folio and bound in a book form at the center stapled position of the sheets.

Where the sheet processing apparatus performs a folding operation, if the frictional coefficient between sheets is low, the sheets may slip when the sheet bundle folded in folio is pulled by a folding roller, thereby possibly generating tears at the stapling positions. Such tears tend to occur right after the start of the folding operation. At that time, if images are formed at the folding start positions and toners cling to there, the sheets located inside in a fold form when the folding roller pulls inside the sheets are easily returned, thereby causing tears easily.

This invention is made with respect to the above viewpoint and it is an object to provide an image forming apparatus capable of bookbinding sheet bundles without generating tears when the sheet bundles are pulled inside.

SUMMARY OF THE INVENTION

A representative structure of the invention to accomplish the above object is characterized in an image forming apparatus for folding plural sheets in folio including: two rollers for folding sheets in folio; and projecting means for folding the sheets upon nipping the sheets between the two rollers by projecting between the two rollers, wherein the projecting means projects to a margin of a prescribed width of images formed at an image forming apparatus body to fold the plural sheets.

In another representative structure of the invention, an image forming apparatus for folding plural sheets in folio including: an image forming apparatus body having image forming means for forming images on the sheets; and a sheet processing apparatus for stapling the plural sheets on which images are formed at the image forming apparatus body and bookbinding the sheets in folio, wherein a margin of a prescribed width is placed at a folded portion of the sheets when the images are formed at the image forming apparatus body on the sheets to be folded and made into a book in the sheet processing apparatus.

With the above structures, when the sheet bundle is pulled inside at a sheet processing apparatus, a margin is placed in advance on the sheet, so that the frictional force between the sheets will not be lowered at that location. Therefore, the plural sheets can be folded in folio surely in the sheet processing apparatus, thereby preventing tears and wrinkles from occurring due to separation of the plural sheets.

BRIEF DESCRIPTION OF THE DRAWINGS

FIG. 17 is a diagram exemplifying drive times of the paddle, moving speed of the side guide, and alignment control according to the sheet size;

FIG. 38 is an illustration showing a setting up speed for delivery motor;

FIG. 51 is an illustration showing a status that a staple fitted in a groove on the anvil is released by the pickup roller;

DESCRIPTION OF PREFERRED EMBODIMENTS

Figure 1:
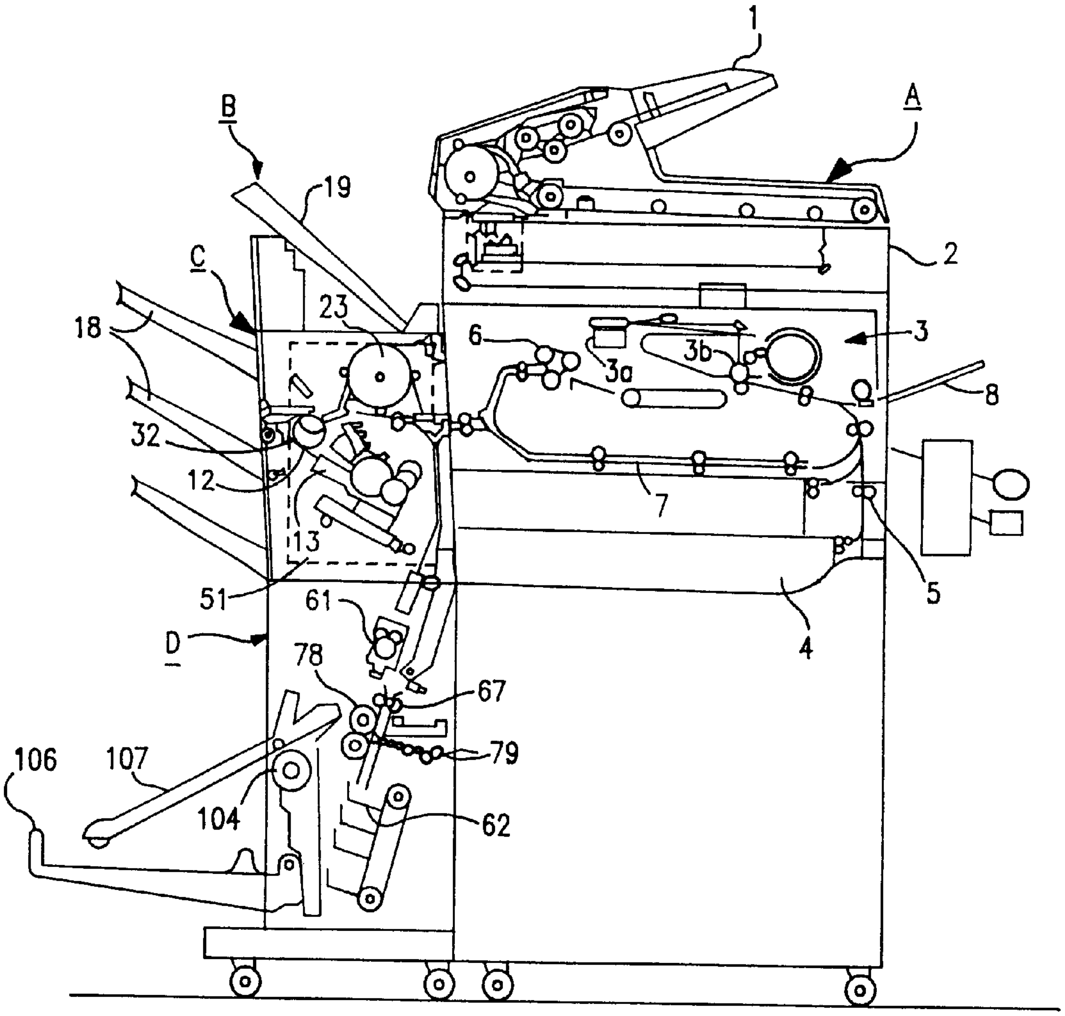
FIG. 1 is an illustration showing the whole structure of an image forming apparatus.

Referring to the drawings, an embodiment according to the invention is shown.

FIG. 1 is an illustration showing an inner structure of a photocopier as an example of an image forming apparatus to which this invention is applicable. This photocopier is structured having an image forming apparatus body A combined with a sheet processing apparatus B. The sheet processing apparatus B includes a finisher unit C capable of sorting the sheets on which images are recorded at the image forming apparatus body A according to the number of copies and a stitcher unit D capable of bookbinding the multiple sheets upon stapling the sheets.

Herein, the whole structure of the image forming apparatus is generally described, and subsequently, concerning the structure of the sheet processing apparatus, the finisher unit C and the stitcher unit D are described in detail.

The Whole Structure of the Image Forming Apparatus

The image forming apparatus body A reads, in an optical way with an optical means 2, original documents automatically fed from the original document feeding apparatus 1 mounted on the top of the apparatus and transmits the read information to an image forming means 3 as digital signals for recording the information on recording sheets such as plain papers or OHP sheets Multiple sheet cassettes 4 in which sheets of various types are contained are set at the lower portion of the image forming apparatus body A, and the image forming means 3 records images in an electrophotographic method on the sheets fed by the conveyance rollers 5 from the sheet cassettes 4. That is, latent images are formed on a photosensitive drum 3*b* by radiating a laser beam on the photosensitive drum 3*b* from a light radiating means 3*a* based on the information read through the optical means 2. The latent images are developed with toners and transferred onto the sheets, and the sheets are conveyed to a fixing means 6 to fix the images permanently in application of heat and pressure.

In a case of a single side recording mode, the sheet is sent to a sheet processing apparatus B, and in a case of a double side recording mode, the sheet is conveyed to a re-feeding path 7 in a switchback way, thereby sending the sheet to the sheet processing apparatus B after forming images on the other side where the sheet whose one side is recorded is conveyed to the image forming means 3 again.

It is to be noted that the sheets can be fed not only from the sheet cassettes 4 but also from the multi-tray 8.

Figure 2:
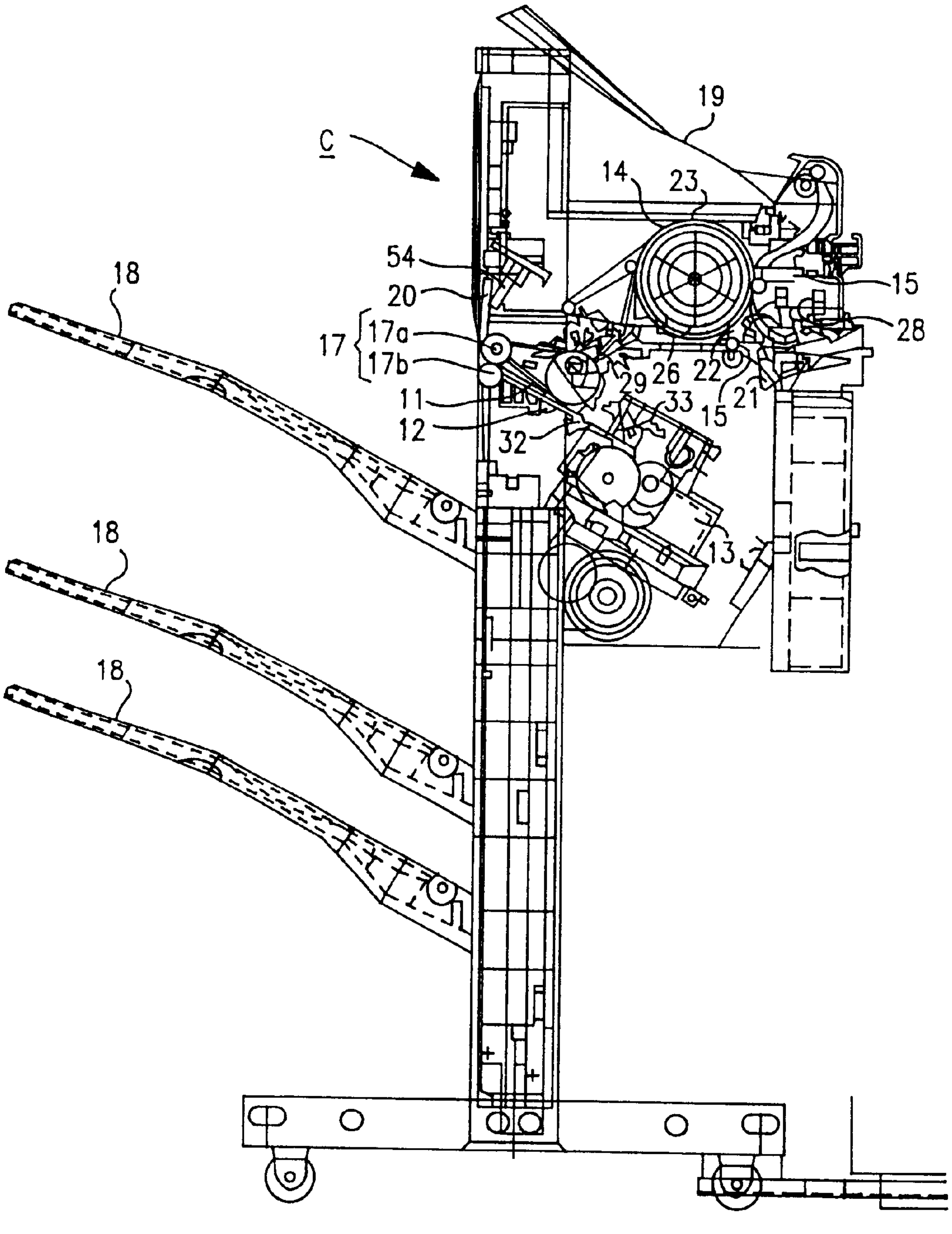
FIG. 2 is an illustration showing a cross-sectional structure of a finisher unit.

The finisher unit C in the sheet processing apparatus B is structured as shown in FIG. 2. To deliver the sheets, the finisher unit C can do delivery operations according to respective modes such as, in addition to a normal delivery mode, an offset mode, a staple mode, and so on.

The offset mode here is the operation anode in which, when the sheets are delivered upon sorting them by respective copies, the first sheet of each copy is positionally shifted in a sheet width direction (a direction perpendicular to the sheet conveyance direction) by a prescribed amount by actuating a side guide 11 when delivered, and the sheets of the second or latter are delivered in the normal fashion, thereby distinctively showing the boundaries of respective copies.

It is to be noted that, where no space to which the sheets are shifted is available with respect to the size in the sheet width direction, a reference guide 37 is made to escape lower than the level of a staple tray 12 serving as a temporally stacking means, thereby ensuring the sheet shifting amount adequately.

The staple mode is an operation mode in which, when the sheets are delivered upon sorting them with respect to each copy, the sheets are stacked and aligned on the staple tray 12 and stapled with a stapler 13 to deliver them upon stapling the sheets with respect to each copy.

It is to be noted that to deliver the sheets, this apparatus can perform a double sheet delivery control capable of delivering two sheets at the same time, in addition to the normal delivery control for delivering the sheets sheet by sheet. In this double sheet delivery control, a sheet sent to the sheet processing apparatus B from the image forming apparatus body A is stored in a buffer path 14 arranged in the finisher unit C, and the sheet is overlapped with another sheet subsequently delivered to deliver the two sheets at the same time.

Figure 3:
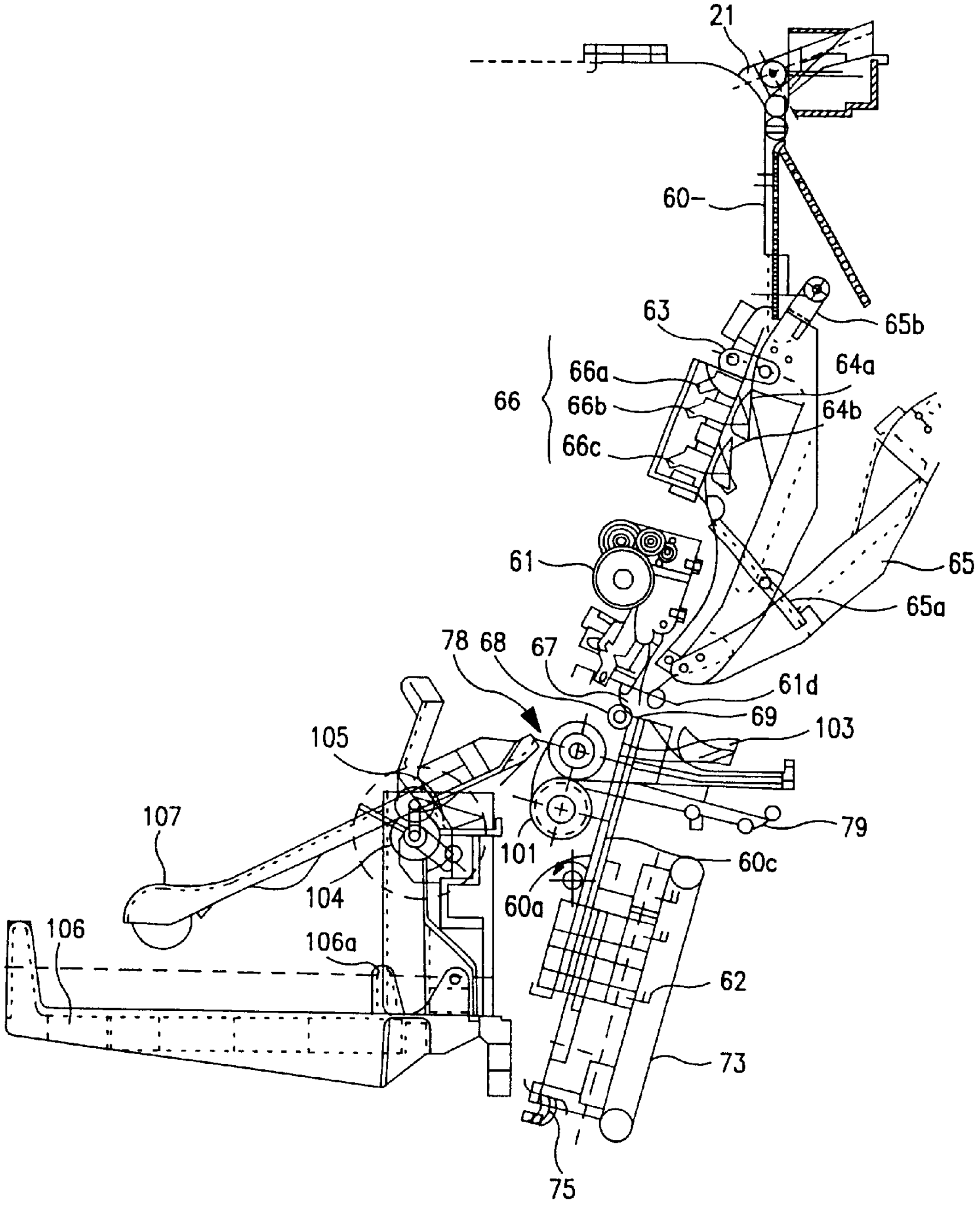
FIG. 3 is an illustration showing a cross-sectional structure of a stitcher unit.

Meanwhile, the stitcher unit D in the sheet processing apparatus B is structured as shown in FIG. 3. The sheets delivered from the image forming apparatus body A are aligned with respect to each copy and stapled by means of the staple unit, and the stapled sheets are folded in folio and bound into books. In briefly speaking, the sheets delivered from the image forming apparatus body A are conveyed to a vertical path 60 of the stitcher unit D; the sheets are stacked and aligned on a copy basis so that the lower end of the sheet hits a stopper 62; the stacked sheets are bound upon stapling the sheets with a stapling unit 61 at two locations of a center in the sheet lengthwise direction (sheet conveyance direction).

The stopper 62 is moved downward to move the sheet bundle so that the bound portion reaches a nip position of folding rollers 78, and where the bound position is struck by a striking plate 79, the sheet bundle is nipped and conveyed by the nip rollers 78 as to be folded in folio at the bound position. This operation makes the sheet bundle bound at the center in the sheet lengthwise direction as well as delivered on a stacking tray 106 in a folio bound form.

Finisher Unit

The sheet P delivered to the finisher unit C from the image forming apparatus body A according to this embodiment is, in the normal mode, conveyed to a conveyance roller 15 and delivered to the stack trays 18 by means of an upstream delivery roller pair 16 and a downstream delivery roller pair 17. The stack trays 18 are provided in a plural number as movable in a vertical direction by a driver installed at a lower side of the trays. When sheets are delivered upon sorting, the plural stack trays 18 are moved in a shifting manner step by step at the delivery opening, thereby delivering the sheets P where the sheets P are sorted with respect to each copy. In a case of the offset mode and the staple mode, sheets P can be delivered to the sole stack tray 18 in a sorted state upon offset operation or staple operation. Moreover, in a case of an interruption mode, the sheets P can be delivered on an upper tray 19 without delivered to the stack tray 18.

Offset Delivery Processing

Figure 4:
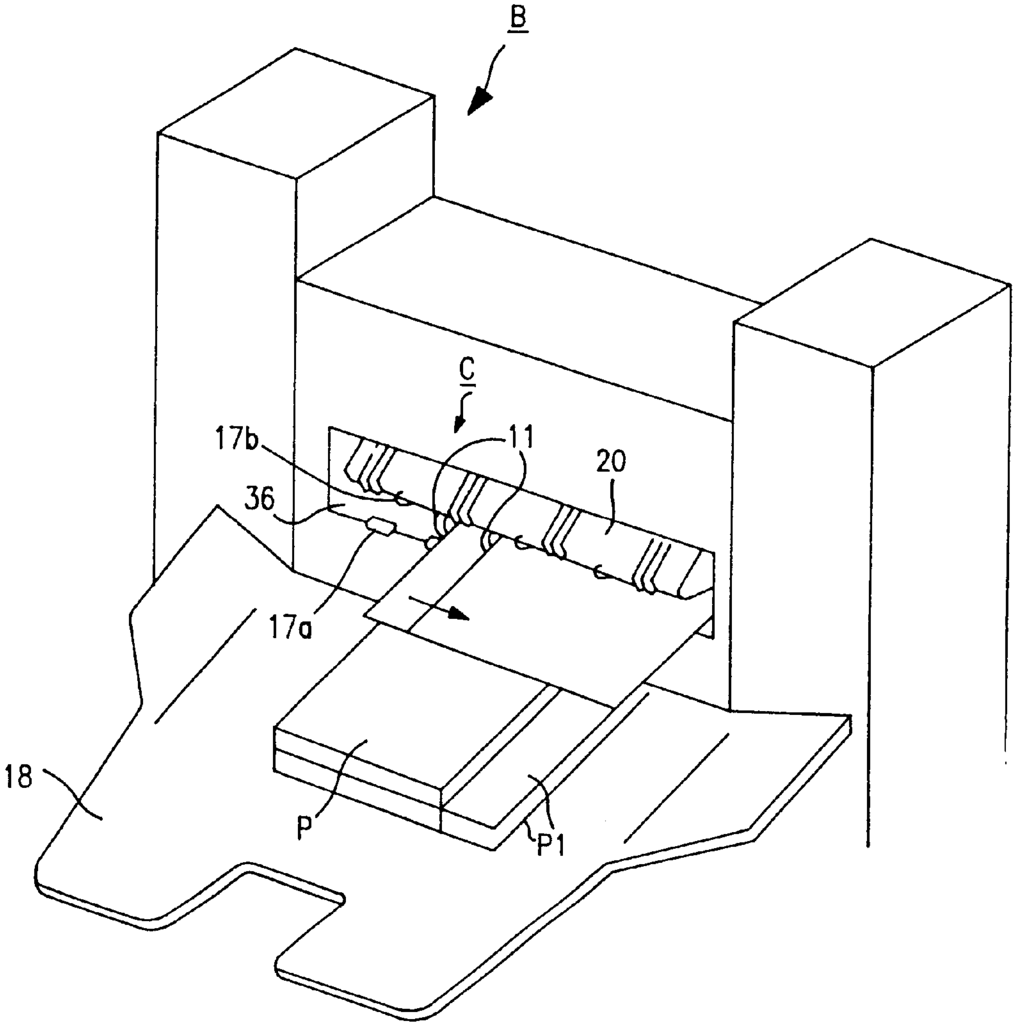
FIG. 4 is a perspective illustration showing a sheet status of a sheet delivered by an offset operation.

The finisher unit C according to this embodiment is capable of sorting the sheets in the offset mode as described above. In this mode, as shown in FIG. 4, all copies are delivered on the single stack tray 18, and where the sheets are delivered on the copy basis, the first sheet P1 is positionally shifted in the sheet width direction with respect to the sheets P of the second and latter, thereby rendering the boundaries of the copies clear.

Figure 5:
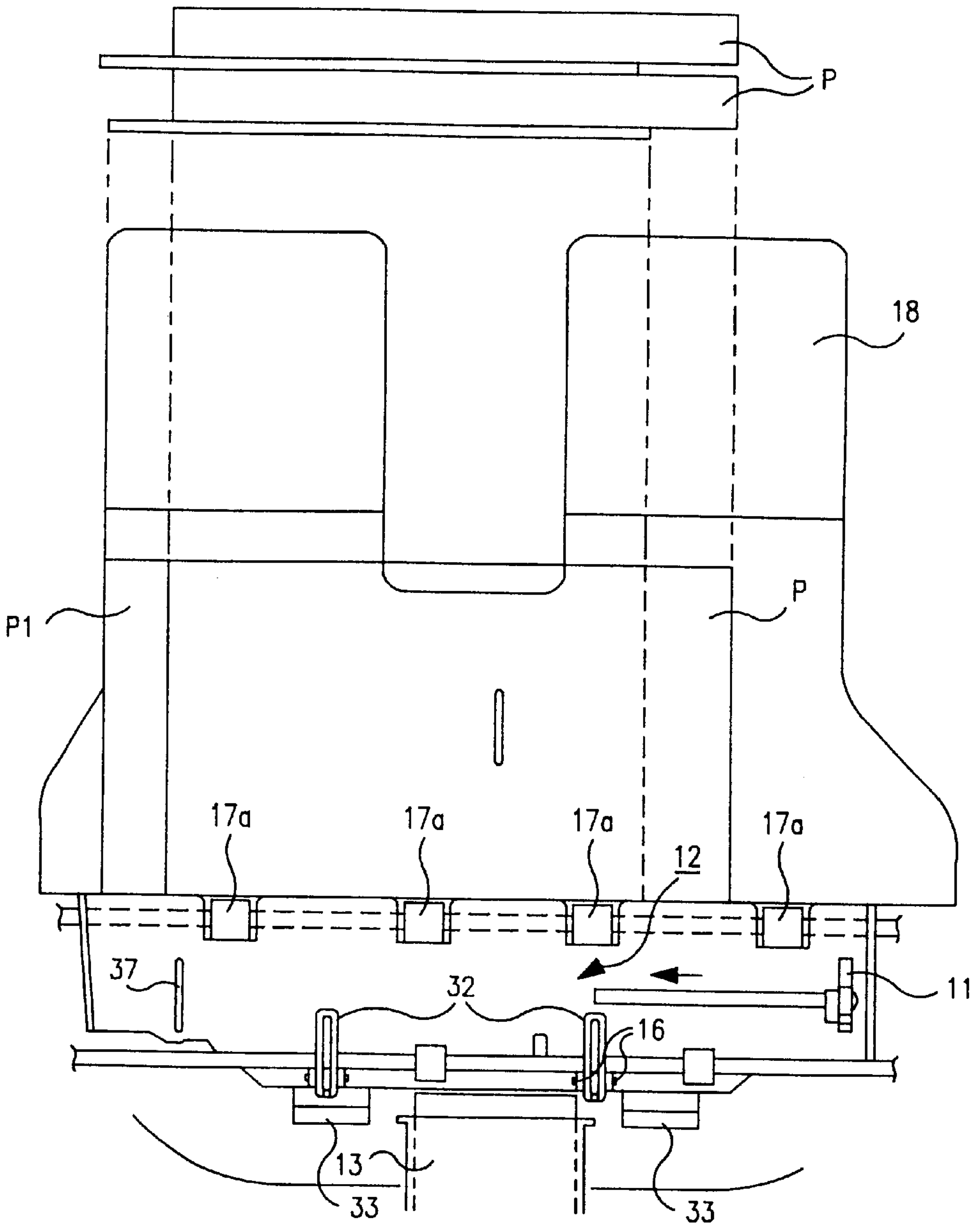
FIG. 5 is an illustration showing squeezing for a sheet delivered by the offset operation and a status of the delivered sheet.

The downstream delivery roller pair 17 is structured having a downstream delivery roller **17*a* formed at a unit body and a movable delivery roller 17*b* attached to a rocking guide 20 which is capable of rocking around a shaft with respect to the unit body. When the rocking guide 20 moves up as to open, each roller of the downstream delivery pair 17 becomes separated from one another as shown in FIG. 4. The side guide 11 is provided movably in the sheet width direction between the upstream delivery roller pair 16 and the downstream delivery roller pair 17, serving as an aligning means guiding one edge of the sheets P in the width direction. During the offset mode, when the first sheet of each copy to be sorted is delivered, the rocking guide 20 is moved up as to open at a time that the rear end of the sheet falls onto the staple tray 12 upon conveyed between the upstream delivery roller pair 16 and the downstream delivery roller pair 17, and subsequently, the side guide 11 is moved in the arrow direction, thereby shifting the first sheet P1 for a prescribed amount. The sheet P1 is then delivered onto the stack tray 18 upon closing the rocking guide 20. Subsequently, the sheets P of the second and latter are delivered in the normal fashion, and the sheets are delivered in a form that the first sheet P1 of each copy is positionally shifted as shown in FIG. 4 and FIG. 5. As described above, where no space in which the sheet is moved by the prescribed amount in the sheet width direction is available, the reference guide 37 is made to escape lower than the staple tray 12**, thereby ensuring the sheet shifting amount adequately.

Double Sheet Delivery Control During Offset

In the offset delivery, when the first sheet P1 of each copy is delivered, the offset processing of the sheet P1 as described above is required, and therefore, the sheets P of the second and latter cannot be delivered until that the processing finishes. Accordingly, the delivery of the second sheet has to be suspended, and the processing time is required to be longer.

The second sheet P is temporarily stored in the buffer path 14 during the offset processing in this embodiment, and the second sheet and the third sheet are delivered at the same time, thereby shortening the processing time by delivering the sheets without suspending the sheet delivery even in the offset mode.

Figure 6:
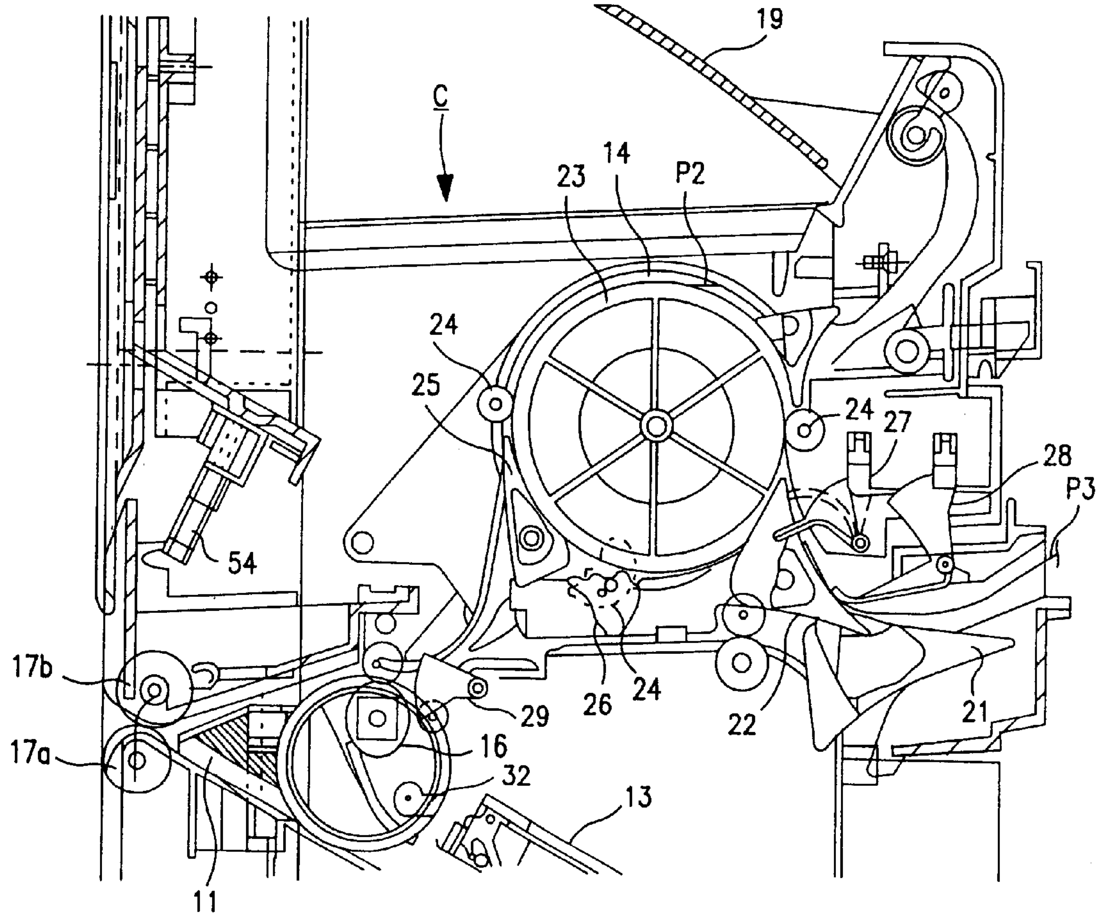
FIG. 6 is an illustration showing a status in which a proceeding sheet is left over in a buffer path in a double sheet delivery control.

The double sheet delivery control for such operation is described. While the first sheet is subjecting to the offset processing, when the second sheet is conveyed to the finisher unit C from the image forming apparatus body A, the second sheet is sent to the buffer path 14 by positioning upstream side ends of a first flapper 21 and a second flapper 22 downward as shown in FIG. 6. The proceeding sheet P2 sent to the buffer path 14 (in the case of the offset mode, the second sheet) is transferred in the shown arrow direction as to wind a buffer roller 23 by means of the buffer roller 23 which is rotatively driving and a buffer roller 24 driven rotatively in pushing the sheet to the buffer roller 23. A third flapper 25 is driven as to send the proceeding sheet P2 in a direction that the sheet is wound around the buffer roller 23.

Figure 7:
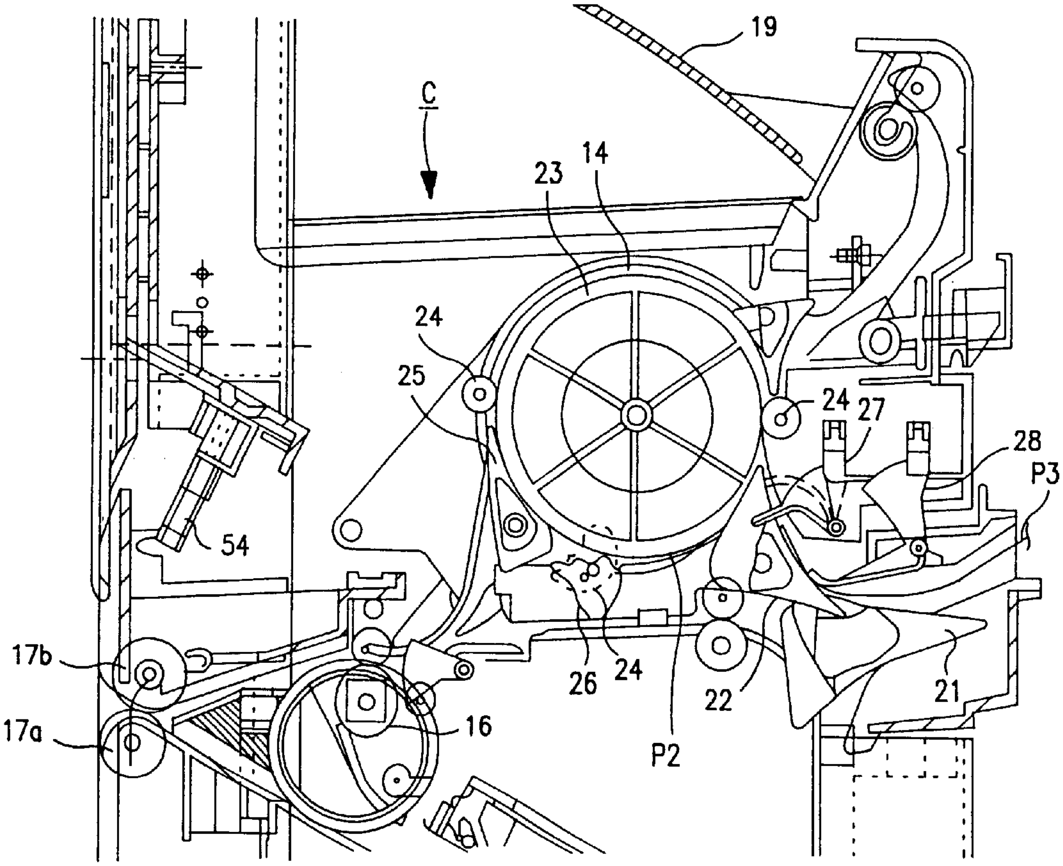
FIG. 7 is an illustration showing a status in which two sheets are conveyed at the same time in the double sheet delivery control.

When a buffer sensor 26 detects the front end of the proceeding sheet P2, and when the front end of the proceeding sheet P2 reaches the prescribed position, the buffer roller 23 is stopped to rotate, and the sheet is stopped in the buffer path 14. As shown in FIG. 6, when the subsequent sheet 13 (in the case of the offset mode, the third sheet) enters, the buffer roller 23 begins to rotate, and as shown in FIG. 7, this unit conveys the proceeding sheet P2 and the subsequent sheet P3 in an overlapped manner. When the rear end of the proceeding sheet P2 passes by the position of the third flapper 25, the third flapper 25 rotates the two sheets P2, P3 in the direction toward the upstream delivery roller pair 16, thereby delivering the sheets P2, P3 as they are stacked onto the stack tray 18.

The double sheet delivery control as described above prevents sheets from being delivered from the upstream delivery roller pair 16 during the offset processing operation, and therefore, the operation of the image forming apparatus body is not necessarily stopped. Accordingly, in the offset mode, the processing time is made not longer, and the sheets can be quickly delivered in the offset manner.

It is to be noted that in this embodiment, the buffer roller 23 winds a single sheet P on the roller, but the roller can wind two or more sheets to deliver three or more sheets at the same time in order to compensate more time for offset processing operation. The sheet wound on the buffer roller 23 is solely delivered or stacked even without any subsequent sheet Although in this embodiment, an example in which the sheet subjecting to the offset is the first sheet of each copy is exemplified, this operation is not limited to such a manner, and this invention is effective even where the last sheet of each copy is positionally shifted. The sheet number subjecting to the offset is not limited to a single number and can be a plural number of sheets.

The double sheet delivery control can be executed not only in the offset processing but also in the staple processing in the staple mode as described below, so that time for the staple processing can be used in an advantageous way.

Sheet Waiting Position of Double Sheet Delivery Control

In the double sheet delivery control described above, the conveyance has to be made so that a positionally shifting amount between the front ends of the proceeding sheet P2 waiting in the buffer path 14 and the subsequent sheet P3 delivered from the image forming apparatus body A becomes constant. To accomplish this, the buffer roller 23 begins to rotate after the subsequent sheet P3 passes the position of an entry sensor 27 shown in FIG. 6 or after predetermined clocks are counted up upon passage of the subsequent sheet P3 at the position of the entry sensor 27, thereby rendering constant the shifting amount between the front ends of the proceeding sheet P2 and the subsequent sheet P3.

However, the conveyance speed of the subsequent sheet P3 delivered from the image forming apparatus body A is changed according to the image formation mode, kinds of sheets, and the like. If the conveyance speed is different between the proceeding sheet P2 and the subsequent sheet P3, positional deviations may occur at the front ends of the proceeding sheet P2 and the subsequent sheet P3 because the starting timing of the buffer roller 23 is the same.

This embodiment is therefore structured in which the front end position of the proceeding sheet P2 to be stored in the buffer path 14 is changed according to the conveyance speed of the subsequent sheet P3 because the conveyance speed of the subsequent sheet P3 depending on the image formation mode, kinds of sheets is retrievable from the image forming apparatus body. More specifically, in FIG. 6, it is set that a conveyance amount of sheets from time when the front end of the proceeding sheet passes the position of the buffer sensor to time when the sheet stops becomes much when the conveyance speed of the subsequent sheet P3 is high and conversely, less when the speed is low. According to this operation, a period from the beginning of rotation of the buffer roller 23 to a time which the front end of the proceeding sheet P2 reaches a meeting point with the subsequent sheet P3 is short when the conveyance speed of the subsequent sheet P3 is fast and long when the conveyance speed is slow. Therefore, even where the starting timing of the buffer roller 23 is constant, the proceeding sheet P2 and the subsequent sheet P3 can be always conveyed with constant shifting amounts between the front ends of the proceeding sheet P2 and the subsequent sheet P3.

It is to be noted that, as a structure for making constant the positions of the front ends of the proceeding sheet P2 and the subsequent sheet P3, this operation can be performed by changing the stating timing of the rotation of the buffer roller 23, in addition to the method for changing the waiting position of the proceeding sheet P2 as described above. For example, while the proceeding sheet P2 is held at a fixed position in the buffer path 14, the buffer roller 23 starts rotating right after the subsequent sheet P3 passes by the entry sensor 27 where the conveyance speed of the subsequent sheet P3 is fast and after predetermined time passes after the subsequent sheet P3 passes by the entry sensor 27 where the conveyance speed of the subsequent sheet P3 is slow. The positionally deviated amount between the front ends of the proceeding sheet P2 and the subsequent sheet P3 can be made constant by changing the conveyance starting timing of the proceeding sheet P2 according to the conveyance speed of the subsequent sheet P3.

It is to be noted that although the conveyance speed of the subsequent sheet P3 can be retrieved from the image forming apparatus body A as described above, it is retrievable by detecting the conveyance speed of the proceeding sheet P2 because the subsequent sheet is generally conveyed with the same speed as that of the proceeding sheet P2.

Delivery Signal Transmission Timing in the Double Sheet Delivery Control

Figure 8:
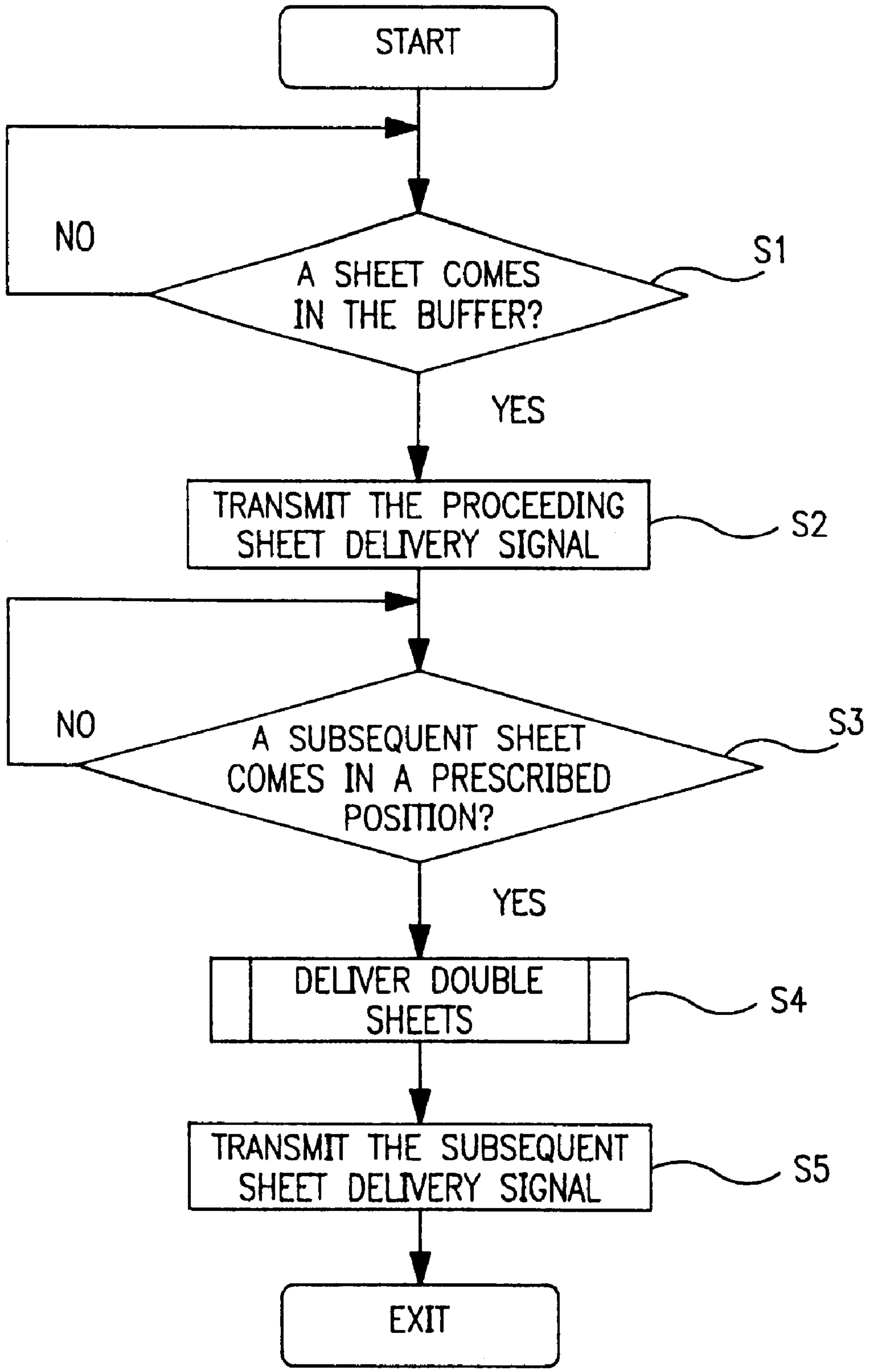
FIG. 8 is a flowchart showing a delivery signal transmission timing for the proceeding sheet in the double sheet delivery control.

A sheet is transferred from the image forming apparatus body A to the sheet processing apparatus B, and the sheet delivery signal is transmitted when a prescribed processing is done. As shown by a flowchart in FIG. 8, in the double sheet delivery control, however, if the apparatus is structured in a way in which a sheet is detected by a loading sensor 28 (see, FIG. 2 and FIG. 6) (S1), in which a delivery signal of the proceeding sheet P2 is transmitted at a time when the proceeding sheet P2 is conveyed in the buffer path 14 (S2), in which the subsequent sheet P3 is then conveyed to a predetermined position, and in which the delivery signal of the subsequent sheet P3 is then transmitted after the double sheet delivery is made (S3 to S5), the proceeding sheet P2 in the buffer path 14 is removed together with the subsequent sheet P3 by paper jam recovering process where the apparatus stops due to paper jamming or the like of the subsequent sheet P3 after the delivery signal is transmitted (between S2 and S3 in FIG. 8). Therefore, when image formation is resumed in a successive manner upon recovery from the paper jamming, though the proceeding sheet P2 is not actually delivered in the stack tray 18 or the like, the apparatus itself recognizes it as the already delivered paper due to the transmission of the delivery signal. Therefore, the processing is made by skipping the page.

Figure 9:
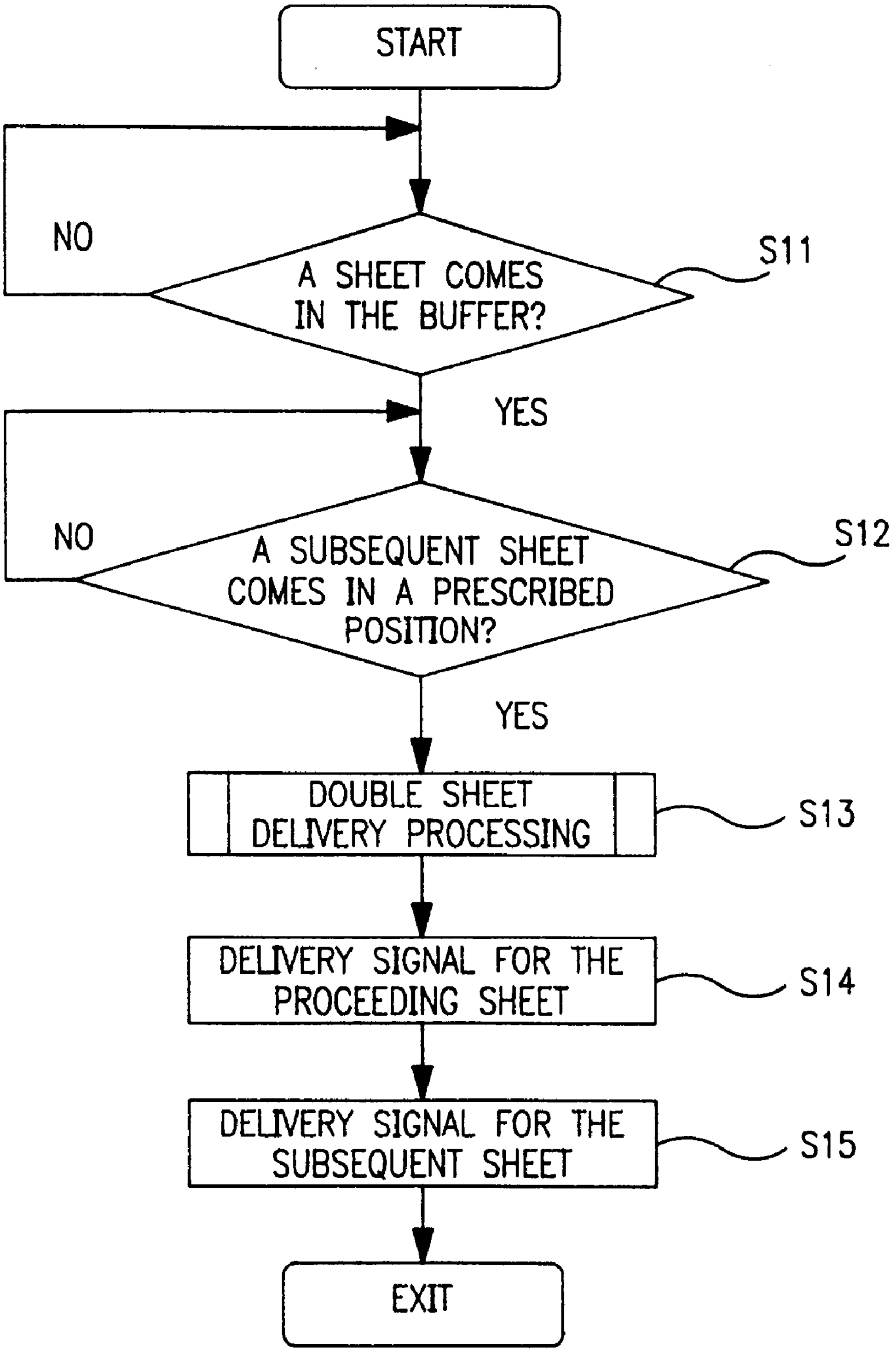
FIG. 9 is a flowchart showing a delivery signal transmission timing for the proceeding sheet in the double sheet delivery control according to this embodiment.

In this embodiment, as shown by a flowchart in FIG. 9, the delivery signal is not transmitted at a time when the proceeding sheet P2 is brought to the buffer path 14, the proceeding sheet P2 is placed as to be overlapped with the subsequent sheet P3 and delivered together from the buffer path 14. The delivery signal of the proceeding sheet P2 and subsequent sheet S3 is transmitted at a time when a delivery sensor 29 (see, FIG. 2 and FIG. 6) located right before the upstream delivery roller pair 16 detects the front ends of both sheets P2, P3 (S1 to S15).

With such a structure, even where the subsequent sheet P3 is jammed to stop the apparatus while the proceeding sheet P2 is waiting in the buffer path 14 (between S11 and S12 in FIG. 9), the delivery signal has not been transmitted yet at that time. If the image formation is resumed upon recovery from the paper jamming after the proceeding sheet P2 is removed from the buffer path 14 during the paper jamming recovery, the images can be formed in restarting with the proceeding sheet P2, so that this apparatus can prevent skipping pages from occurring.

It is to be noted that the double sheet delivery control described above is effective during the offset processing and the staple processing as described below, this double sheet delivery control can be done at processings other than the above. Processings without the double sheet delivery control can be executed as a matter of course.

Shape of the Side Guide

Figure 10A:
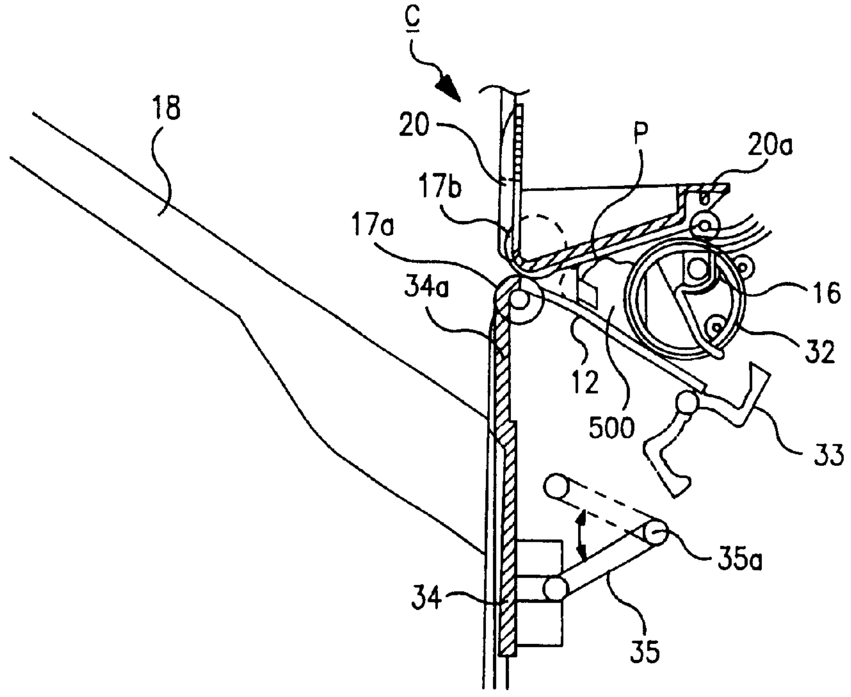
FIG. 10 is an illustration showing a status of a sheet in a case where a side guide top is not used as a guide for sheet delivery.
Figure 10B:
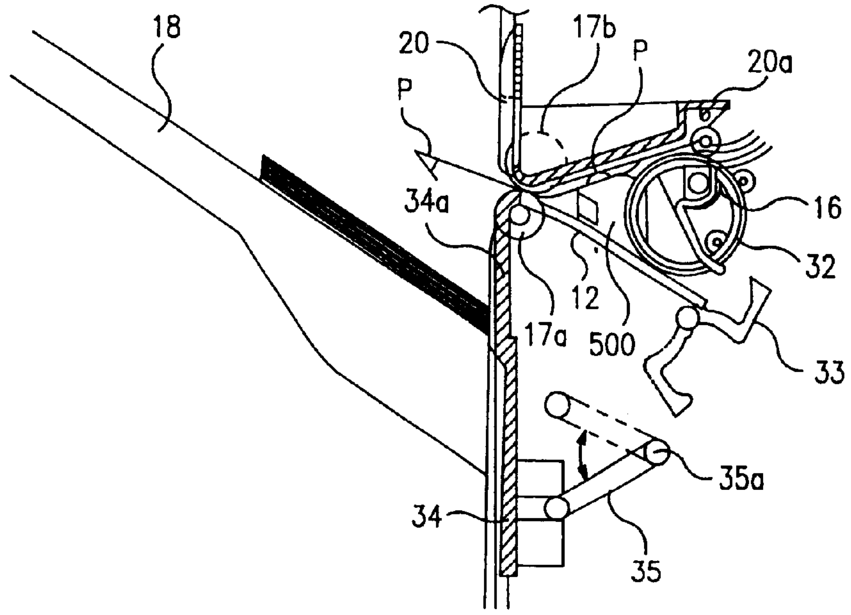

In the double sheet delivery control thus described, or in the normal delivery mode, the sheet is delivered on the stack tray 18 by the upstream delivery roller pair 16 and the downstream delivery roller pair 17 shown in FIG. 2, and the staple tray 12 located between both roller pairs 16, 17 is moved downward (see, FIG. 2). Therefore, the front end of the sheet P to be delivered may hang over the staple tray 12 if curled downward as shown in FIG. 10(*a*), and if the sheet is continuously conveyed as it is, the front end of the sheet may be pulled upon being folded as shown in FIG. 10(*b*) when nipped by the downstream delivery roller pair 17.

Figure 11:
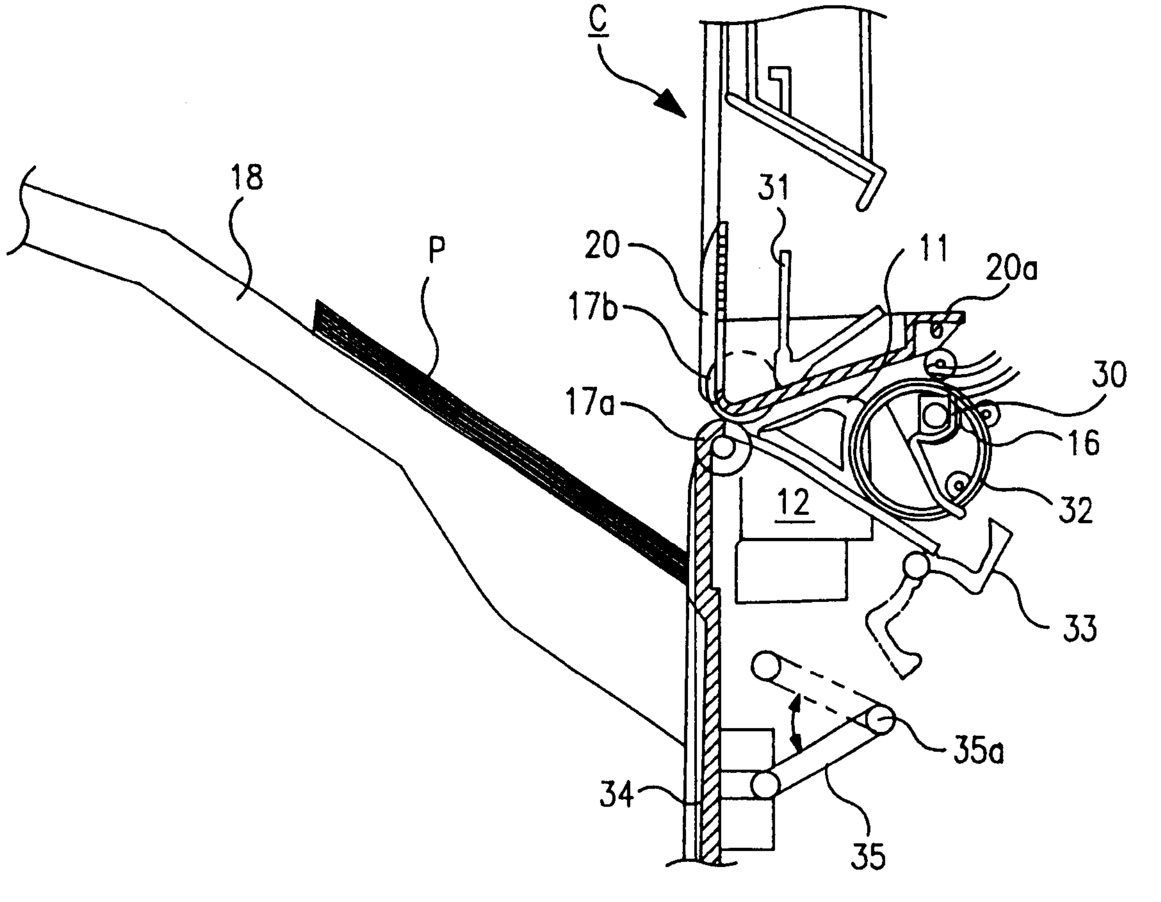
FIG. 11 is an illustration showing a status of a sheet in a case where a side guide top is used as a guide for sheet delivery according to this embodiment.

In this embodiment, as shown in FIG. 11, the shape of the side guide 11 is structured in an approximately triangle shape so that the top does not fall in the staple tray 12. This side guide 11 is made to wait at a position (sheet delivery region) more inside than the width of the sheet to be delivered, thereby conveying the delivered sheet P to the downstream delivery roller pair 17 through guided at a top of the side guide 11 without hanging over the staple tray 12 as shown in FIG. 11. Therefore, the sheet is delivered where the front end of the sheet is without being folded by the downstream delivery roller pair 17 as described above.

It is to be noted that if the side guide is in a shape with a cut in front of the downstream delivery roller pair 17, the sheet P may hang over the staple tray 12 after guiding the sheet P ends at the side guide 500 even where the sheet P is guided at the top of the side guide 500. It is therefore desirable to make the guide, like the side guide 11 in this embodiment, in a shape capable of guiding the sheets P from the upstream delivery roller pair 16 to the downstream delivery roller pair 17 (see, FIG. 11).

Figure 12:
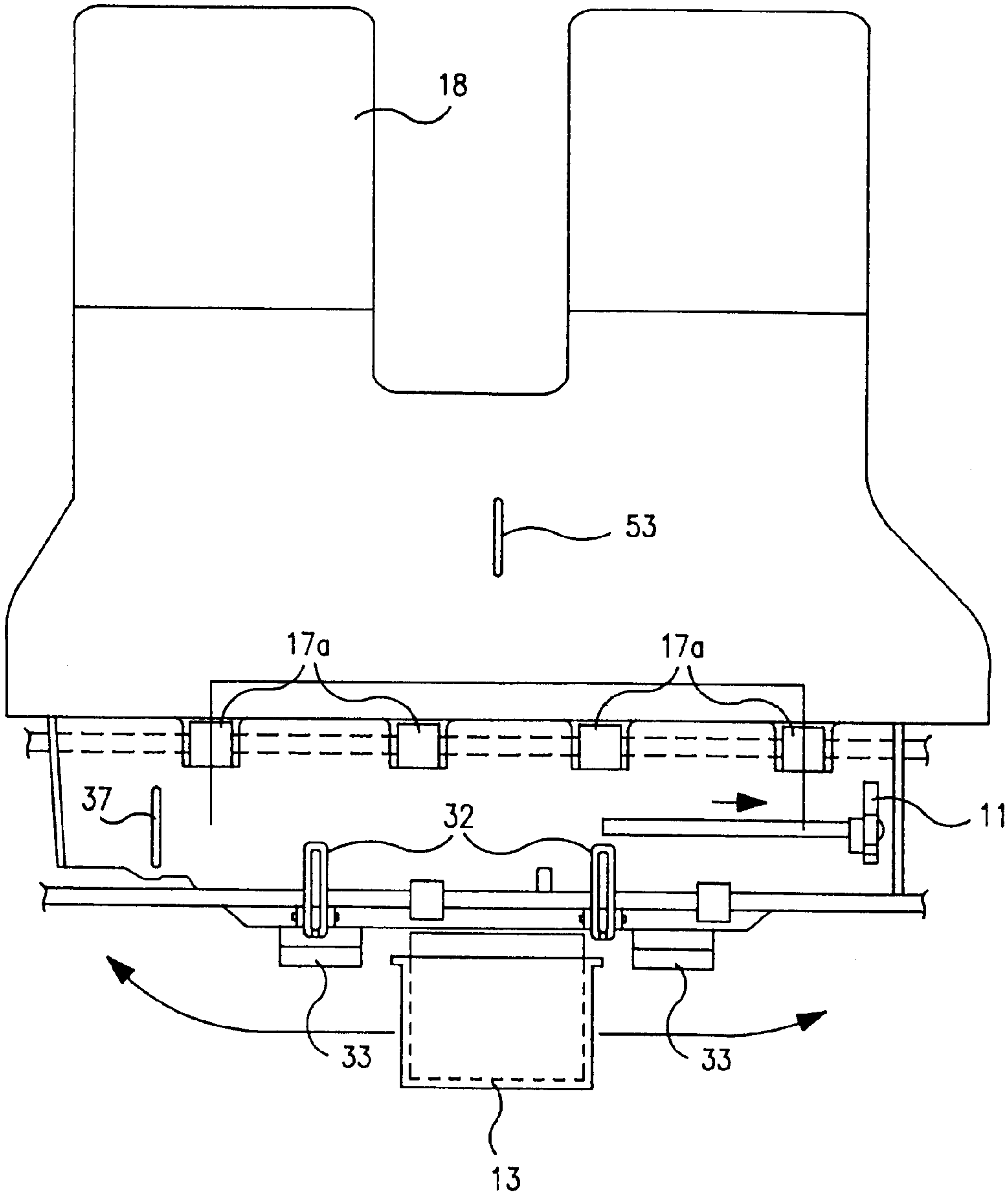
FIG. 12 is an illustration showing a status for escaping the side guide after the front end of the sheet is nipped by a downstream delivery roller pair.

It is also to be noted that if an auxiliary guide 30 is provided for guiding the sheet P between the upstream delivery roller pair 16 and the side guide 11, it is effective for preventing sheets from hanging It is to be noted that although the side guide 11 as described above guides the sheets P by positioning itself at the delivery region of the sheets P, the sheets P are required to be dropped in the staple tray 12 and aligned by pushing the edges in the sheet width direction in the offset mode and the staple mode. Therefore, in the offset mode and the staple mode, the side guide 11 is moved to escape more outside than the sheet width (outside the sheet delivery region) as shown in FIG. 12 right after the front end of the first sheet is nipped by the downstream delivery roller pair 17 (state shown in FIG. 11). This operation also prevents the front end of the sheet from being folded and pulled because the front end of the first sheet has already passed by the downstream delivery roller pair 17, and the side guide 11 can be placed at a position for waiting and aligning the subsequent sheet.

Stacking Operation on the Staple Tray

Figure 14:
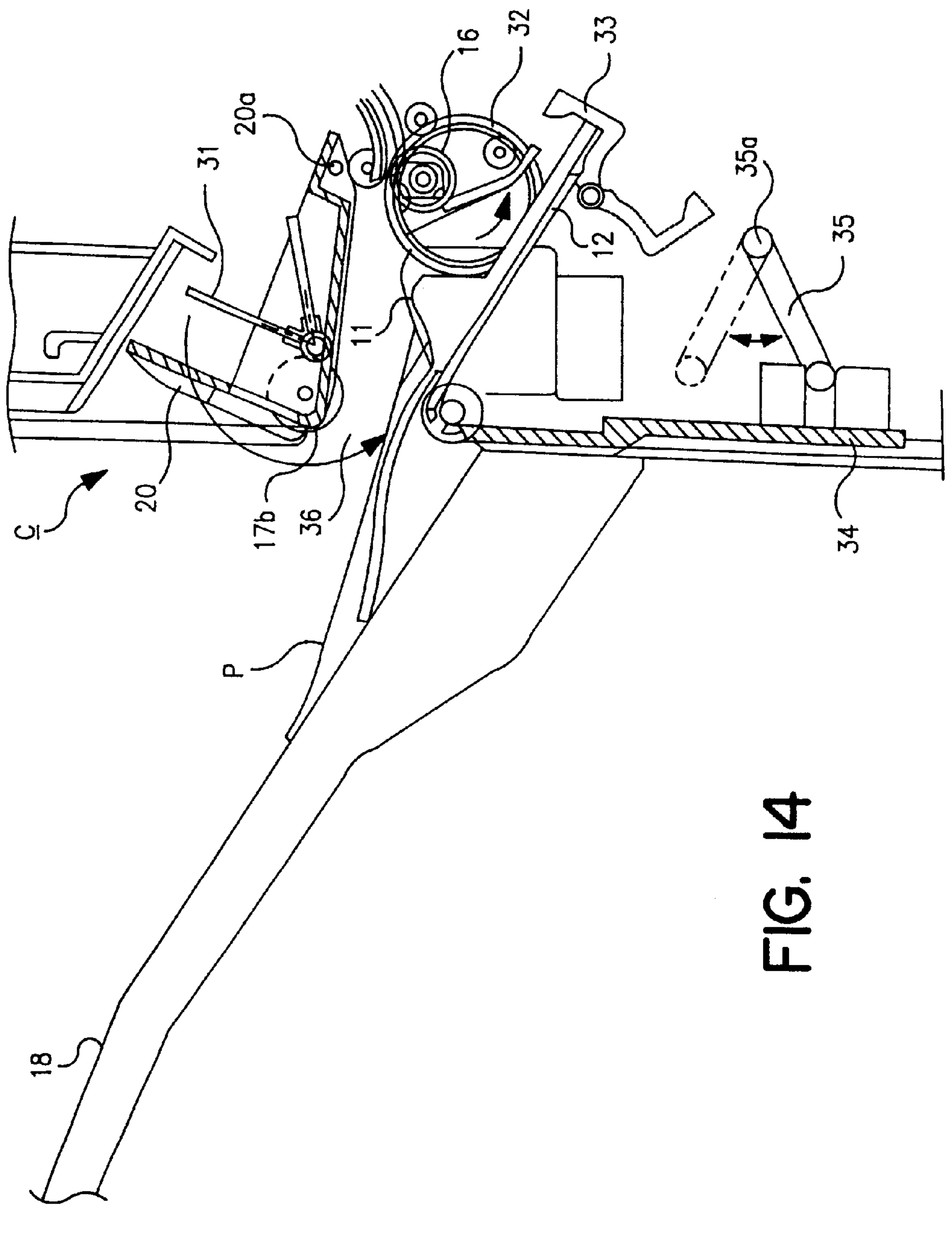
FIG. 14 is an enlarged view showing as the essential portion a status of a rocking guide and a paddle when the sheets are pulled back.

In the staple mode, as shown in FIG. 14, after the rocking guide 20 is made open to deliver the sheet P to the staple tray 12 by the upstream delivery roller pair 16, the sheet P is moved back until the rear end of the sheet P hits a rear end stopper 33 by rotating a knurled teething or knurled belt 32 in the arrow direction which is rotated by drive of a paddle 31 formed on the rocking guide 20 and drive of the upstream delivery roller pair 16. The side guide 11 then pushes the sheet P toward one side to align the sheet P, and the stapler 13 makes the stapling operation.

When the sheet P is delivered to the staple tray 12, if the delivery speed of the upstream delivery roller pair 16 is high, the sheet P may be delivered as projecting after passing by the upstream delivery roller pair 16 because the rocking guide 20 is open, may excessively proceed forward, and may take time for coming back. If the sheet proceeds forward overly, the sheet may not move back to the knurled belt 32 even by pulling the sheet through hitting with the paddle 31, and the sheets may not be aligned on the staple tray 12.

To solve this problem, in this embodiment, the rotation speed of the upstream delivery roller pair 16 is controlled to be a low speed while the rear end of the sheet passes by the upstream delivery roller pair 16 in the staple mode. This operation makes the rear end of the sheet delivered on the staple tray 12 fall near the knurled belt 32, thereby ensuring the sheet P to be pulled by drives of the paddle 31 and the knurled belt 32, and performing the alignment of the rear ends;.

It is to be noted that whether the rear end of the sheet passes by the upstream delivery roller pair 16 can be distinguished by detecting predetermined time after the sheet passes by a prescribed sensor or the motor rotation speed.

After the rear end of the sheet falls in the staple tray 12, the upstream delivery roller pair 16, which has been switched to drive with a low speed, is changed to rotatively drive with a high speed. Because this upstream delivery roller pair 16 is also a drive source for rotating the knurled belt 32, the sheet P fallen on the staple tray 12 is promptly pulled back by the knurled belt 32, and the rear end of the sheet is made to hit the rear end stopper 33.

In the staple mode, as described above, this apparatus can align sheets quickly as a whole by rendering the conveyance speed slower only when the rear end of the sheet passes by the upstream delivery roller pair 16.

Rocking Guide

Figure 13:
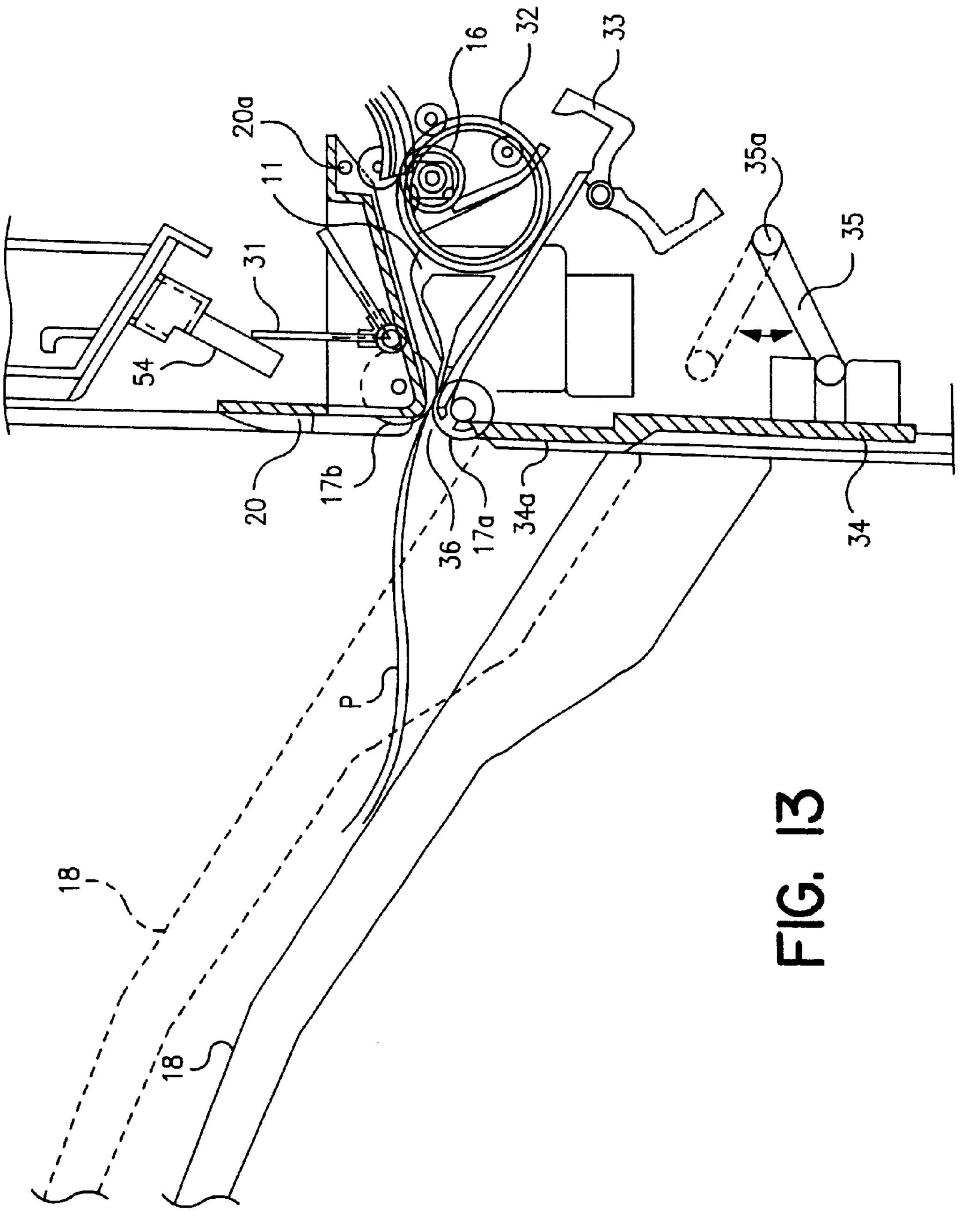
FIG. 13 is a cross section showing a position of the stack tray as the essential portion.

Referring to FIG. 13, the rocking guide 20 is described briefly. The rocking guide 20 rotatively holds the movable delivery roller 17*b*, rocks around a rocking shaft 20*a* as a center by means of a drive mechanism 39 as described below during delivery of the sheet, and pushes the movable delivery roller 17*b* to press the downstream delivery roller 17*a*. In the staple mode, the rocking guide 20 is swingingly moved up around the rocking shaft 20 as the center, thereby moving the movable delivery roller 17*b* away from the downstream delivery roller pair 17. That is, the rocking guide 20 serves as means for switching states for allowing sheet delivery and for inhibiting sheet delivery with the downstream delivery roller pair 17 composed of the movable delivery roller 17*b* and the downstream delivery roller 17*a*.

In FIG. 13, numeral 34 is a stopper having a shutter portion 34*a*. The shutter portion 34*a* formed on the edge is lifted up by a link 35 which is moved pivotally upward around the pivotal shaft 35*a* as a pivotal center during transfer of the stack tray, and thereby, the sheets(sheet bundle) stacked on the stack tray 18 are prevented from going reversely into a delivery opening 36 by covering the delivery opening 36 when the stack tray 18 passes by the delivery opening 36. This stopper 34 opens the delivery opening 36 by moving the link 35 pivotally downward around the pivotal shaft 35*a* as the pivotal center during the delivery of the sheets.

Operation of Stack Tray During the Double Sheet Delivery Control

Referring to FIG. 13, operation of the stack tray 18 when only two sheets P are stapled is described next. FIG. 13 is a cross section showing a position of the stack tray 18 as the essential portion When the staple processing is performed, the plural sheets S delivered sheet by sheet onto the staple tray 12 are normally moved back by the paddle described below and the knurled belt 32 in the reverse direction to the delivery direction and are aligned by the rear end stopper 33 described below upon hit by the stopper 33. The stack tray 18 is lifted up at that time so that the front end side of the sheets P come above the rear end side of the sheets on the staple tray 12 (broken line position in FIG. 13), thereby easily making the sheets pulled back in the aid of the gravity force.

However, if only two sheets P are to be stapled (including the situation of the double sheet delivery control), the lower sheet is pulled back in a direction opposite to the delivery direction on the staple tray 12 by the downstream delivery roller 17*a* which is rotated reversely together with rocking movement of the rocking guide 20 by the drive mechanism 39 described below, and the upper sheet is pulled back similarly in the direction opposite to the delivery direction by the paddle 31 described below and the knurled belt 32. Accordingly, a sole sheet or double sheets can be pulled back and aligned without aid of the gravity force, so that the front end of the sheet is not necessarily lifted up by moving the stack tray 18 up.

Therefore, in this embodiment, if only two sheets P are to be stapled (including the situation of the double sheet delivery control), the stack tray 18 is not moved up. That is, if the three or more sheets are to be stapled, the stack tray 18 is moved up from a solid line position to a broken line position in FIG. 13, but if the sheets P are only two, the stack tray 18 is not lifted up and remains in the solid line position in FIG. 13 to perform the pulling back operation described above.

This apparatus thus structured does not have to move up and down the stack tray 18 when the bundle of two sheets are to be stapled, and therefore, can save time for moving up the stack tray 18 and reduce the processing time greatly.

Rocking Amount of the Rocking Guide and Paddle Shape

Figure 15:
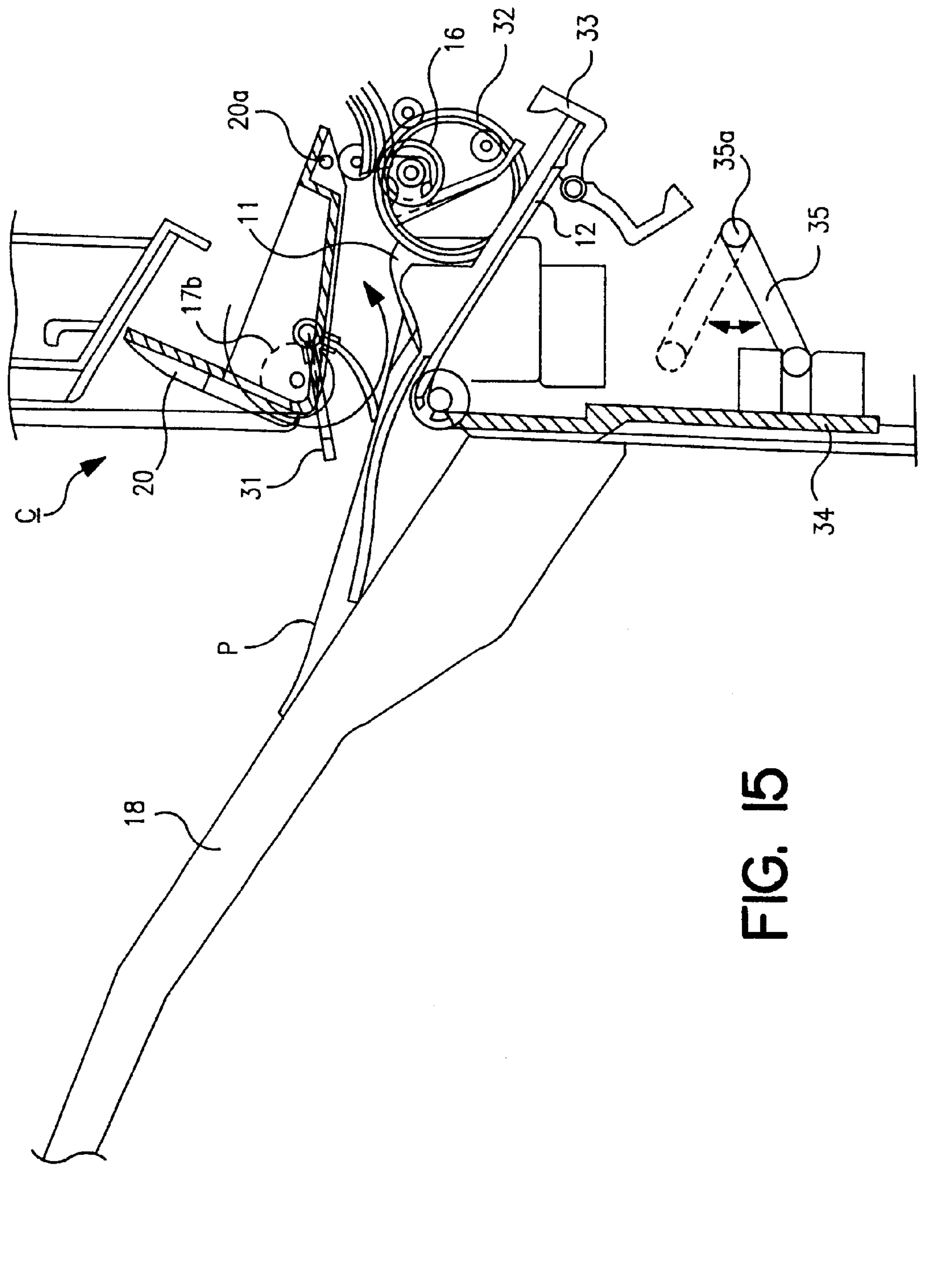
FIG. 15 is an enlarged view showing as the essential portion a status of a rocking guide and a paddle when the sheets are pulled back.
Figure 16A:
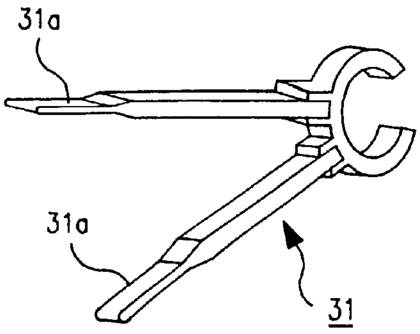
FIG. 16 is a view showing an example of a paddle shape.
Figure 16D:
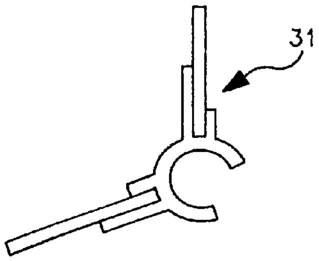
Figure 16B:
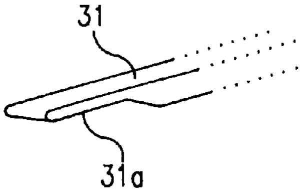
Figure 16E:
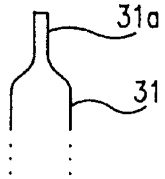
Figure 16C:
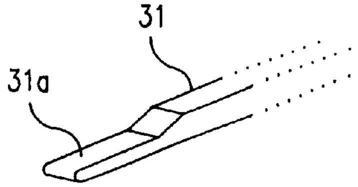
Figure 16F:
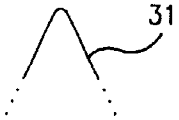
Figure 16G:
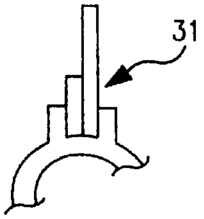

Referring to FIGS. 14 to 16, the paddle 31 for pulling back the sheet P delivered on the staple tray 12 in a direction opposed to the delivery direction, and a rocking amount of the rocking guide 20 supporting the paddle pivotally are described. FIG. 14 and FIG. 15 are enlarged views showing states of the rocking guide and paddle as essential portions in the sheet pulling back operation. FIG. 16 is an illustration showing a shape of the paddle.

The rocking guide 20 has the paddle 31 mounted rotatively for pulling back the sheet P delivered on the staple tray 12 in a direction opposite to the delivery direction. The paddle 31 rotates in the direction opposite to the delivery direction at each delivery of a sheet P on the staple tray 12 where the rocking guide 20 is open, transforms elastically upon contacting to the rear end of the sheet P placed on the staple tray 12, and pulls back the sheet P by frictional force created between the sheet P and itself.

If the paddle 31 pulls back each sheet at every delivery while the rocking guide 20 is swung up and held at a prescribed position, the sheet P may be excessively returned since the contact area and contact pressure of the paddle 31 in contact with the topmost sheet P may change according to the height (level) of the sheets P on the staple tray 12 because the sheets are successively delivered on the staple tray 12.

In this embodiment, to solve this problem, the paddle 31 is structured to keep the contact pressure to the topmost sheet delivered on the staple tray 12 approximately constant. More specifically, the shape of the paddle 31 is formed or molded in a tapered shape whose tip 31*a* is narrowed as shown in FIG. 16. FIG. 16(*a*) indicates a case where the paddle 31 is in a tapered shape with stepwise portions on opposite sides of the tip 31*a* of the paddle 31; FIG. 16(*b*) indicates a case where the paddle 31 is in a tapered shape with a stepwise portion on one surface (sheet contact surface) of the tip 31*a* of the paddle 31; FIG. 16(*c*) indicates a case where the paddle 31 is in a tapered shape with a stepwise portion on the other surface (sheet noncontact surface) of the tip 31*a* of the paddle 31 It is to be noted that the tapered shape of the tip 31*a* of the paddle 31 is Dot limited to those shown in FIGS. 16(*a*) to 16(*c*)

Where the paddle 31 is thus formed, the paddle tip serving as a portion contacting to the sheet becomes easily elastically transformed when contacting with the sheet, so that the apparatus can obtain stable returning force notwithstanding the number of the accumulated sheets and have an improved durability.

In this embodiment, the plural paddles 31 are provided in the rotational direction, and the paddles 31 come in contact with the sole sheet multiple times per rotation. This structure allows one time rotation of the paddles 31, when the paddles 31 pull back a relatively large sheet by contacting to the sheet twice, to pull back adequately the sheet, and therefore, the processing time can be shortened in comparison with two time rotation of a single paddle 31. It is to be noted that in FIG. 16(*a*), a case where two paddles 31 are arranged in the rotational direction or a case of a twin paddle, the feature is not limited to this. The paddle 31 can be formed in shapes shown in FIG. 16(*d*), FIG. 16(*e*), FIG. 16(*f*), and FIG. 16(*g*) to obtain substantially the same effects.

The paddle 31 can be so structured that the contact area of the paddle 31 with the sheet P delivered on the staple tray 12 is kept constant. More specifically, the apparatus is structured so as to change the swinging amount when the rocking guide 20 is opened (swung upward) according to the height (level) change of the sheets P on the staple tray 12. Further specifically, for example, according to increase of the number of the delivered sheets P on the staple tray 12, the rocking guide 20 is swung upward to keep the contact area of the paddle 31 to the topmost sheet P constant.

As shown in FIG. 15, a thickness I of the bundle of the sheets P is expressed by "$t=r\sin\theta$" wherein: "r" denotes the distance between the rocking center (rocking shaft 20*a*) of the rocking guide 20 and the rotary center of the paddle 31; "$\theta$" denotes the rocking angle of the rocking guide 20; "t" denotes the thickness of the bundle of the sheets P. Based on this formula, it is suitable that the rocking amount (rocking angle $\theta$) of the rocking guide 20 is changed according to the change of the thickness t of the bundle of the sheets P.

This structure keeps the contact area between the topmost sheet P on the staple tray 12 and the paddle 31 always constant notwithstanding the number of stacked sheets P, so that the apparatus can gain stable returning force, and so that the apparatus can prevent the sheets P from being excessively returned due to changes of the contact area of the paddle 31 to the sheet P.

Operation Timing of the Paddle

The operation timing of the paddle 31 starts as shown in FIG. 15 after the rear end of the sheet P gets settled as shown in FIG. 14 where as shown in FIG. 14 the upstream delivery roller pair 16 on the upstream side over the staple tray 12 releases the rear end of the sheet P. More specifically, the paddle 31 is rotated in the reverse direction to the sheet delivery direction after a prescribe time passes after the rear end of the sheet P passes by the delivery sensor provided on the upstream side of the upstream delivery roller pair 16.

Rotation Number of the Paddle According to the Sheet Size

The drive number of the paddle 31 is described next. For example, with a structure that the paddle 31 is drive to rotate at a fixed rate regardless the size of the sheets, a large size sheet is not easily pulled back due to its large mass, and therefore in some case, cannot be pulled back to the knurled belt 32 even if hit in the same manner as done for small size sheets, thereby inviting failures in alignment of sheets.

In the embodiment, the drive number of the paddle 31 varies according to sheet sizes. More specifically, the drive number of the paddle 31 is made larger when the sheet has a relatively long length in the sheet conveyance direction. That is, for example, as shown in FIG. 17, in the cases of sheets having relatively larger sizes such as A3, B4, LGL, and LDR, the paddle 31 is driven two times, and in the case of sheets having relatively smaller sizes such as A4, LTR, B5, A4R, and LTRR, the paddle 31 is driven one time.

This structure surely pulls back the sheet to the knurled belt 32 even though having a large mass, thereby improving the alignment of the sheets.

It is to be noted that although in this embodiment the rotation number is changed according to the sheet size, substantially the same control can be done for designation of thicker papers or special papers (e.g., having a low surface frictional coefficient).

Traveling Speed of the Side Guide According to the Sheet Size

The traveling speed of the side guide for performing alignment of the sheets in the sheet width direction is described next. Where the sheet P is stacked on a staple tray 12, the sheets are aligned in the sheet conveyance direction by the paddle 31 and the knurled belt 32 as described above, and concurrently, the sheets P are aligned in the sheet width direction by moving the sheets P in the width direction toward the reference guide 37 located on the opposite side with respect to the sheets by pushing the rear end of the sheets (side edges on a side of the rear end stopper 33) by means of the side guide 11. If the sheets have a larger size, because the center of the gravity is far from the pushing position by the side guide 11 and because the sheets have a high inertial moment where having a large mass, the front ends of the sheets cannot follow travelling of the side guide 11 in the sheet width direction, so that alignment failure of the sheets may be invited.

In this embodiment, to solve this problem, the side guide 11 changes the traveling speed in the sheet width direction according to the sheet size. More specifically, the side guide 11 is moved with a low speed where the sheet has a relatively long length in a direction (sheet conveyance direction) perpendicular to the traveling direction (sheet width direction) of the side guide 11. That is, for example, as shown in FIG. 17, in the cases of sheets having a relatively short length in the sheet conveyance direction such as A4, LTR, B5, and sheets in which the guide moves in a smaller amount in the sheet width direction such as A3, and LDR, the side guide is made to travel with a high speed, and in the case of sheets other than above, having a relatively longer length such as B4, LGL, and sheets in which the guide moves in a larger amount in the sheet width direction such as A4R, and LTRR, the side guide 11 is made to travel with a low speed.

With such a structure, the apparatus can reduce influence of the inertial moment, and can improve alignment operation in the width direction even though it is a sheet having a large size (having a long size in the conveyance direction). This is also effective for sheet sizes needing a large traveling amount in the sheet width direction.

Rear End Stopper

Figure 18A:
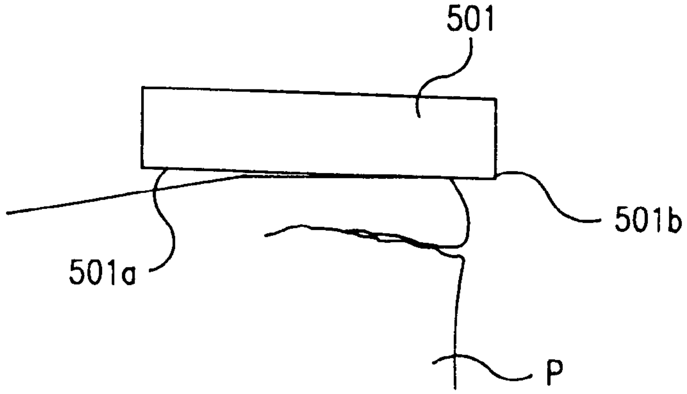
FIG. 18 is an illustration showing a rear end stopper.
Figure 18B:
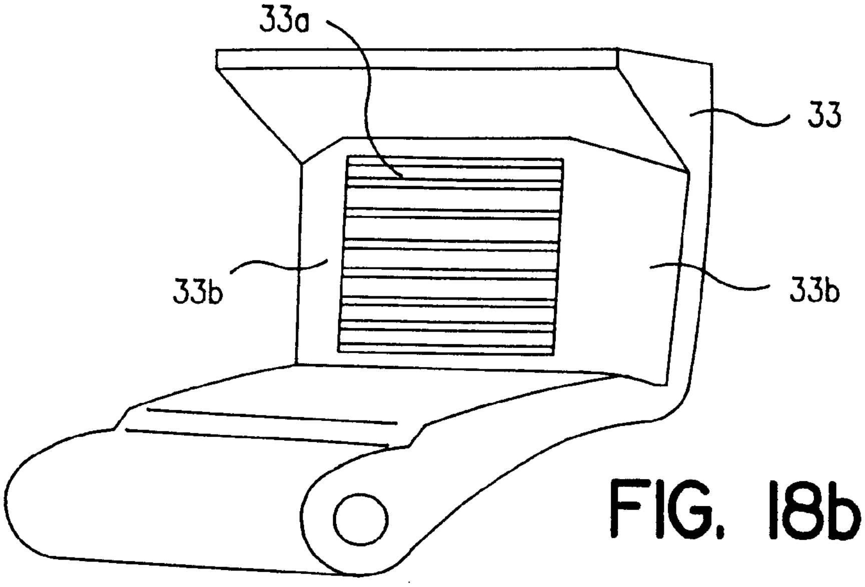
Figure 18C:
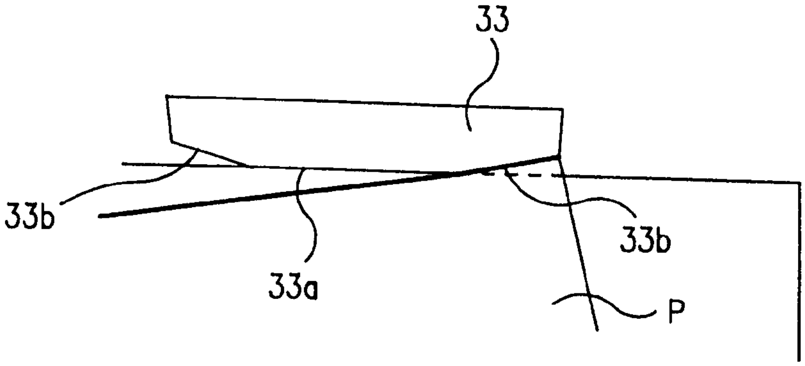
Figure 19:
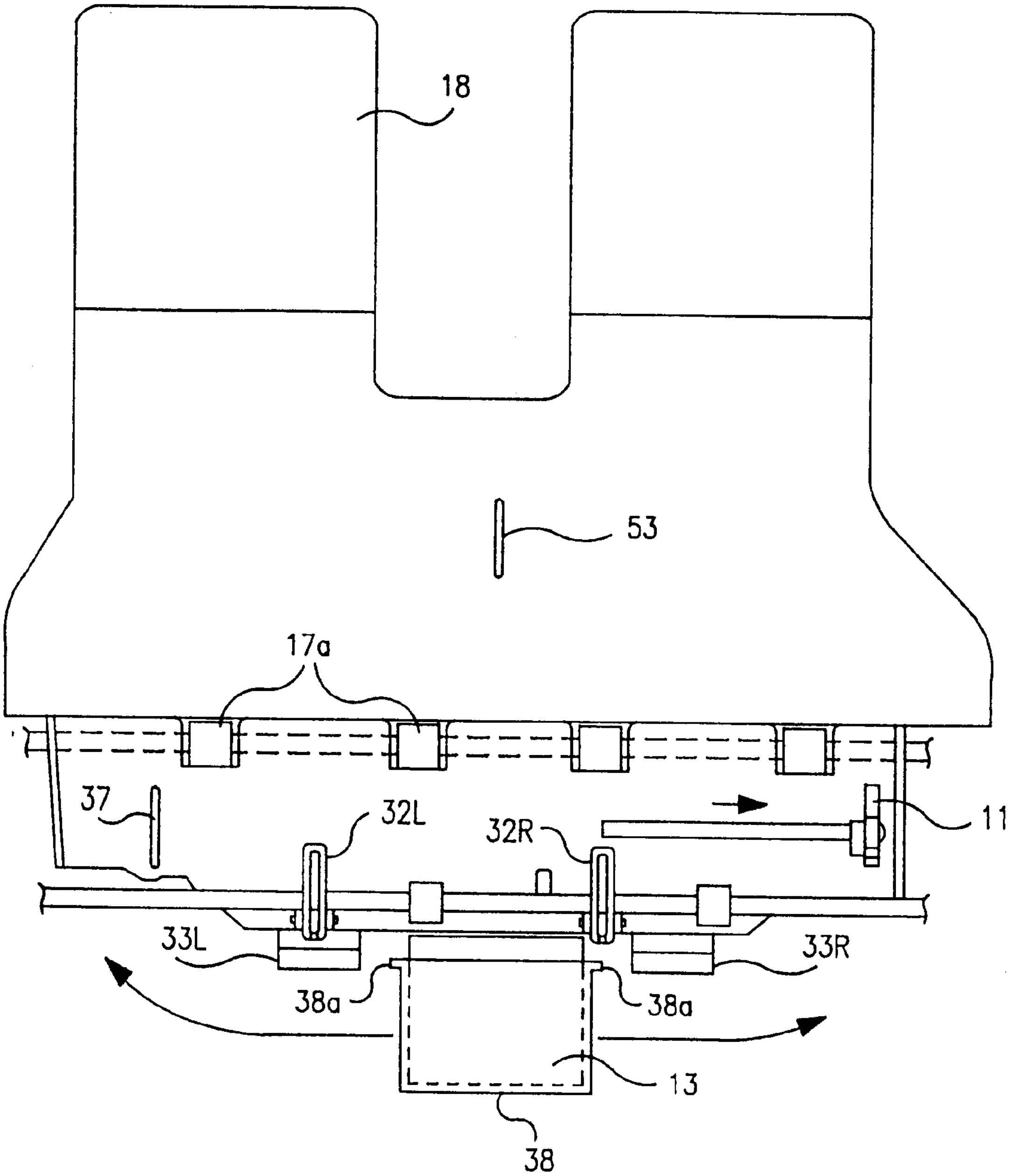
FIG. 19 is a diagram showing a waiting position when the stapler serves as a rear end stopper.

Referring to FIGS. 18, 19, the rear end stopper 33 for hitting the rear end of the sheets P when the sheets P are aligned in the conveyance direction is described next. The sheets P delivered on the staple tray 12 are conveyed in the direction opposite to the delivery direction by the paddle 31 and the knurled belt 32 and the like as described above, and the sheets are aligned in the sheet conveyance direction upon hit by the rear end stopper 33 arranged with a predetermined space in the sheet width direction.

For example, if a sheet hitting surface 501*a* of the rear end stopper 501 is flat as shown in FIG. 18(*a*), the sheet P may be bent or go below the surface when the sheet P enters more or less in an oblique manner with respect to the sheet hitting surface 501*a*, or the sheet end may be damaged by hit with the corner (edge) in the width direction of the sheet hitting surface 501*a*.

In this embodiment, as shown in FIG. 18(*b*), the opposite side portions in the width direction of the sheet hitting surface 33*a* of the rear end stopper 33 are formed in a tapered shape (tapered portion 33*b* ).

This structure as shown in FIG. 18(*c*) can prevent the sheets P from bending (or going below) by both tapered portions 33*b* even if the sheets P enter obliquely with respect to the sheet hitting surface 33*a*, and further can prevent the sheet ends from sustaining damages.

As shown in FIG. 19, although the one rear end stopper 33L corresponds to the knurled belt 32L on one side of the sheet width direction, since the other knurled belt 32R corresponds to the other rear end stopper 33R with a slight shift in the width direction, the sheet end between the rear end stoppers may be pulled overly by the other knurled belt 32R where the sheet corner vicinity is hit by the other rear end stopper 33R (particularly, in the case of the R (Reduction) type sheets, in which sheet longitudinal direction is the sheet conveyance direction.), and the sheet corner vicinity may become flexible and be bend.

During the sorting processing in the offset mode, though the side guide 11 is needed to travel in the sheet width direction, since the movable area is near the knurled belt 32R, and as shown in FIG. 19, the other knurled belt 32R and the rear end stopper 33R as described above are structured to be shifted to each other in the sheet width direction With such a structure, the sheets of the B5R size having a shorter length in the sheet width direction can be subjecting to the offset processing, and the entire apparatus can be made compact.

In this embodiment, as shown in FIG. 19, the stapled 13 is made to wait between the rear end stopper 33L, 33R (or the center in this embodiment) for aligning the sheets upon hitting the rear end of the sheet bundle during the stapling operation for sheet bundles (particularly, stapling at a single portion of the R type sheets), thereby functioning the stapler 13 in the same way as the rear end stoppers 33L, 33R. More specifically, a rib 38 is formed to limit the rear end of the sheet bundle at a cover member 38 of the stapler 13.

This structure prevents the sheet from being pulled excessively because the sheets are regulated by the stapler 13 (or rib 38*a*) waiting between the rear end stoppers even if the sheet is pulled inside by the other knurled belt 32R when the sheet corner vicinity hits the other rear end stopper 33R, so that this apparatus prevents sheets from being bent.

Pressing Control of the Side Guide

Alignment of the sheets P in the sheet width direction by the side guide 11 is described next. The alignment of the sheets P in the sheet width direction is performed as described above by moving the sheets in the width direction in pushing the one edge on a rear end side of the sheets by means of the side guide 11 and by hitting the other side ends of sheets onto the reference guide 37 on the opposite side. At that time, the sheets P moved in the width direction by the side guide 11 are in contact with the knurled belt 32. Therefore, the knurled belt 32 may be twisted according to the sheets P transferred in the width direction by the side guide 11, and the sheets P may not reach the reference guide 37 by influence with the knurled belt 32, thereby possibly causing failure of alignments.

Figure 20:
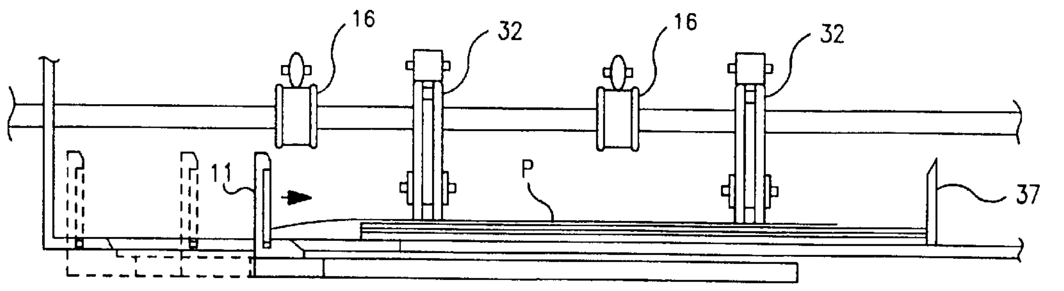
FIG. 20 is a diagram showing a width alignment status by the side guide.
Figure 21:
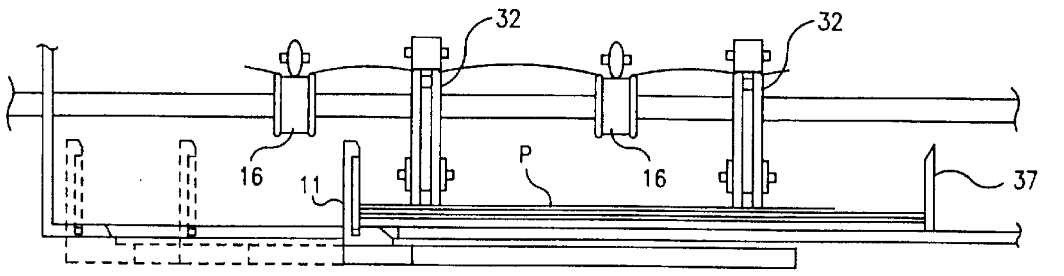
FIG. 21 is a diagram showing a width alignment status by the side guide.

In this embodiment, as shown in FIG. 20 and FIG. 21, when the side guide 11 aligns the sheets P in the width direction (particularly in a case of sheets of the R type having a large width alignment amount), the side guide 11 is pushed stepwise, and the sheets are aligned in releasing influences from the knurled belt 32. That is, where the side guide 11 is pushed stepwise, the twisted width of the knurled belt 32 can be a minimum even the knurled belt 32 is twisted during pressing, and thereby the knurled belt 32 can back easily to the normal position (situation shown in the drawing) as well as with a shorter returning time.

Moreover, the stepwise pressing control for sheets by the side guide 11. during the alignment in the sheet width direction is changed according to the sheet size. More specifically, the first sheet of A4, LTR, B4, and LGL sizes and the sheet of the second or latter of LTR and B5 sizes are pushed by two-time pressing.

The two-time pressing herein means operation in which pressing temporally stops after the first pressing and the second pressing is made subsequently. It is to be noted that the number of pressing times is not limited to this. The side guide 11 after the last pressing, as described below, has a structure functioning as a guide located at the pressing position until when the front end of the subsequent sheet comes over the downstream delivery roller pair 17 or for a prescribed period, and more specifically, the sheets are in a state that the sheets are pressed by the side guide 11.

The side guide 11 temporally stops at each pressing of the sheets when the sheets are pushed multiple times stepwise and starts pressing the subsequent sheets after a prescribed time passes for returning the knurled belt 32 to the normal position (recovery of twists).

Therefore, the alignment in the width direction by pressing the sheets stepwise by means of the side guide 11 as described below makes the influence from the knurled belt 32 release quickly and is done quickly and precisely.

Shape of the Knurled Belt

Figure 22:
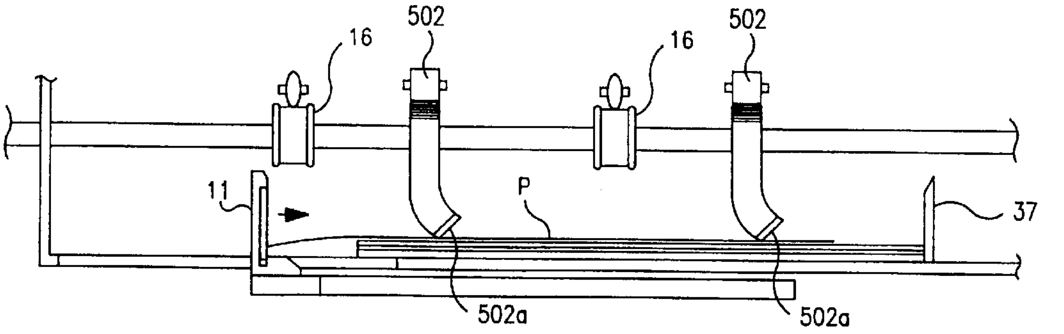
FIG. 22 is a diagram showing a status of a knurled belt during the sheet width alignment by the side guide.
Figure 23A:
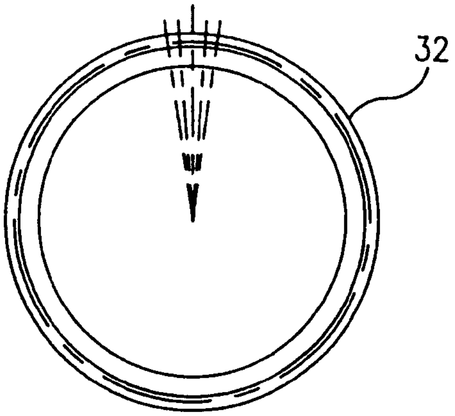
FIG. 23 is a view showing an example of a knurled belt shape.
Figure 23B:
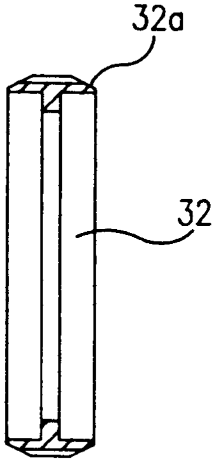
Figure 23C:
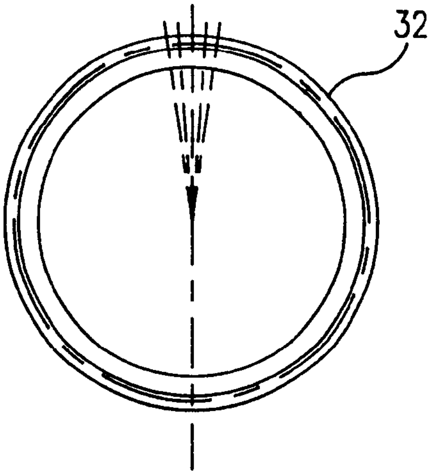
Figure 23D:
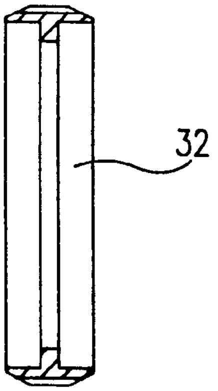
Figure 24:
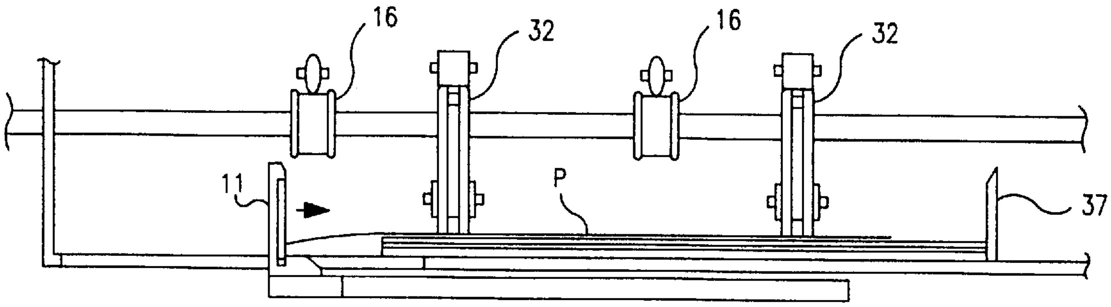
FIG. 24 is a diagram showing a width alignment status by the side guide.

Referring to FIGS. 22 to 24, the shape of the knurled belt 32 is described. The knurled belt 32 pulls further back the sheets, which are pulled back by the paddle 31 as described above in the opposite direction to the sheet delivery direction, and aligns the sheets in the sheet conveyance direction by hitting the sheets P to the rear end stopper 33. As shown in FIG. 22, if the contact surface of the knurled belt 502 with the sheets P are molded to be flat, an edge 502*a* of the knurled belt 502 may be trapped at the sheets S traveling in the width direction, thereby possibly causing failures in alignment of sheets.

In this embodiment, as shown in FIG. 23(*a*), an edge portion 32*a* of the knurled belt 32 is molded in a tapered shape, or as shown in FIG. 23(*b*), an outer round surface of the knurled belt 32 is molded in a shape having a cross section with curvature.

Those molded shapes make small resistance to the sheets P travelling in the width direction by the side guide 11 during the alignment, thereby being capable of reducing failures in alignment of the sheets due to trapping at the edge portion.

Recovery of the Knurled Belt

As described above, the alignment of the sheets in the width direction is performed by moving the sheets in the width direction upon pressing the one side end on the rear end side of the sheets by means of the side guide 11 and by hitting the other side end of the sheets to the reference guide 37 located on the other side. At that time, the sheets P moved in the width direction by the side guide 11 are in contact with the knurled belt 32. Consequently, the knurled belt 32 may be twisted according to the sheets P moved in the width direction by the side guide 11, the sheets P may be moved in association with recovery of the twist in the knurled belt 32 when the side guide 11 moves (escapes) in a direction opposite to the sheet pressing direction, thereby possibly causing failures in alignment.

With this embodiment, after the sheets are pressed by the side guide 11, the side guide 11 continuously presses the sheets until the knurled belt 32 returns to the normal position (recovering the twist) and releases the pressing on the sheets after the knurled belt 32 returns to the normal position.

The side guide 11 functions as a guide for the subsequent sheet upon continuously pressing the sheets at a position shown in FIG. 21, but the knurled belt 32 returns to the normal position during this continuous pressing even if twisted as described above. After the front end of the sheet P under being guided comes over the downstream delivery roller pair 17, the side guide 11 escapes to an escape position outside the sheet delivery region.

With this structure, failures in alignment of the sheet due to influence from the knurled belt 32 can be prevented.

At a Time when the Downstream Delivery Roller Rotates in the Reverse Direction while the Rocking Guide is Open The state of the downstream delivery roller 17*a* when the rocking guide 20 is open and the state of the side guide 11 are described. The downstream delivery roller 17*a* is structured to rotate in a direction opposite to the sheet delivery direction by the drive mechanism 39 as described below when the rocking guide 20 is opened. The side guide 11 usually aligns the sheets in the sheet width direction upon finishing the reverse conveyance of the downstream delivery roller 17*a*.

However, the first sheet (or the second sheet during the double sheet delivery control) is in contact with the downstream delivery roller 17*a* by the weight of itself, and this may become resistance during alignment in the width direction and cause failures in alignment of sheets. The frictional resistance between the sheet and the downstream delivery roller 17*a* is smaller when the roller rotates than that when the roller is still.

In this embodiment, the side guide 11 finishes the alignment operation in the sheet width direction by the end of the reverse operation of the downstream delivery roller 17*a* for pulling back the first sheet.

This structure allows the influence from the frictional resistance between the first sheet and the downstream delivery roller 17*a* to be reduced at a time that the first sheet is aligned in the width direction by the side guide 11, thereby improving the alignment property for the sheets.

Lock of the Downstream Delivery Roller while the Rocking Guide is Held

If the downstream delivery roller 17*a* is stopped in a free state (rotatable state) when the subsequent sheets are stacked on the staple tray 12 and aligned, the lowermost sheet may be shifted on the staple tray 12 while the sheets are aligned.

To solve this problem, in this embodiment, the drive mechanism 39 as described below locks the downstream delivery roller 17*a* to render the roller not rotatable while the sheets are stacked on the staple tray 12 and aligned. This structure can reduce shifts of the sheets due to collisions or the like during the paddle operation while the sheets are stacked on the staple tray 12 and aligned.

Reverse Operation of the Downstream Delivery Roller when the Rocking Guide is Closed When the sheets of a bundle is stacked and aligned on the staple tray 12, the sheet bundle is sandwiched and fixed where the rocking guide 20 is closed, and then the stapler 13 makes the stapling operation.

In such a situation, the lowermost sheet of the sheet bundle may be shifted more or less on the staple tray 12 while the sheets are aligned by the paddle 31, the side guide 11, and the like.

With this embodiment, while the sheet bundle is sandwiched and fixed upon closing the rocking guide 20, the downstream delivery roller 17*a* is reversed in a prescribed amount (or more or less) by the drive mechanism 38 as described below, thereby providing conveyance force in a direction opposite to the delivery direction to the lowermost sheet of the sheet bundle on the staple tray 12.

This structure makes possible the alignment in correcting shifts even where the lowermost sheet of the sheet bundle is shifted more or less while the sheets are aligned by the paddle 31, the side guide 11, and the like.

Drive Mechanism for the Rocking Guide and the Downstream Delivery Roller

Figure 25:
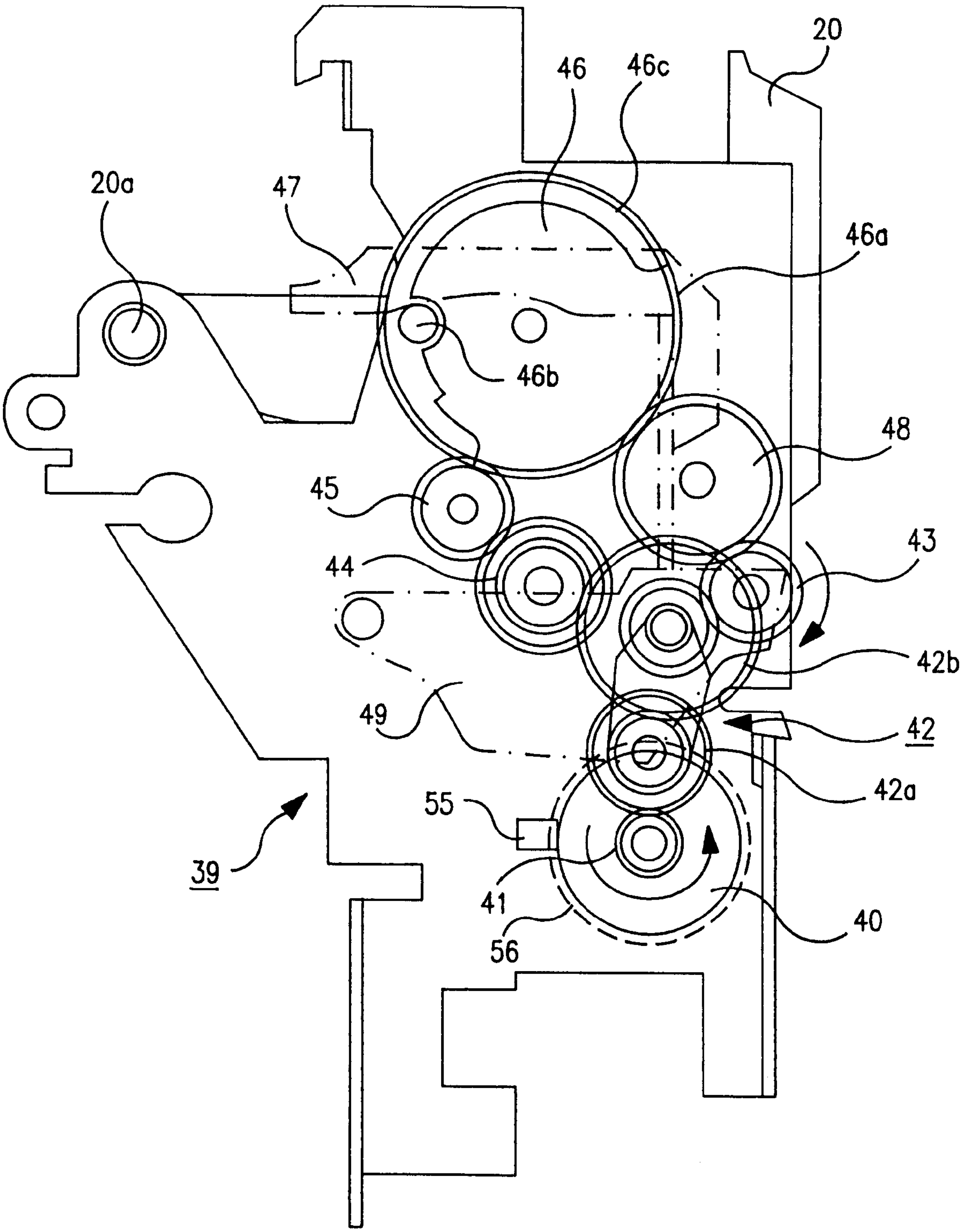
FIG. 25 is an illustration showing an operation status or a rocking guide and a drive mechanism of a downstream delivery roller.
Figure 26:
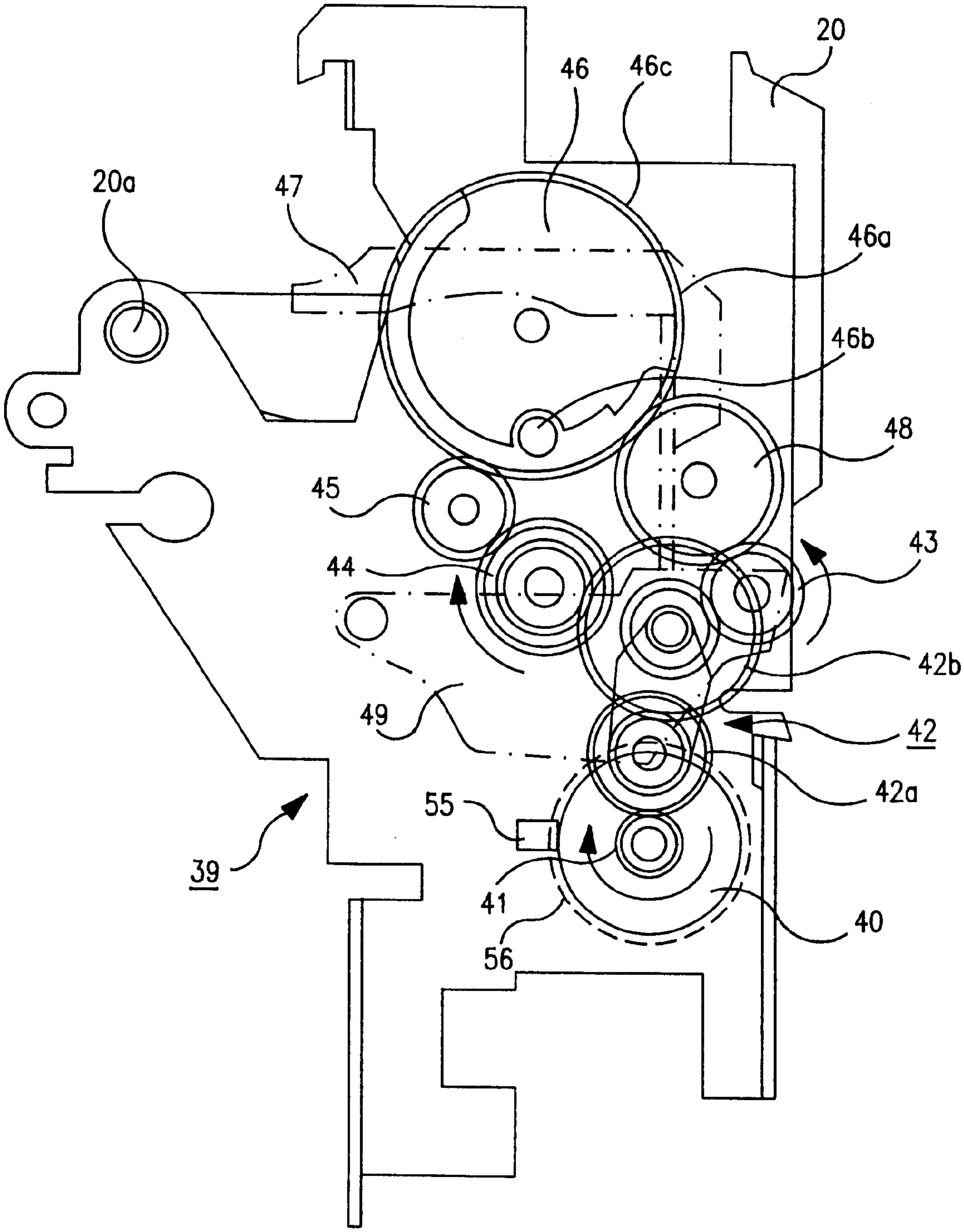
FIG. 26 is an illustration showing an operation status of the rocking guide and the drive mechanism of the downstream delivery roller.
Figure 27:
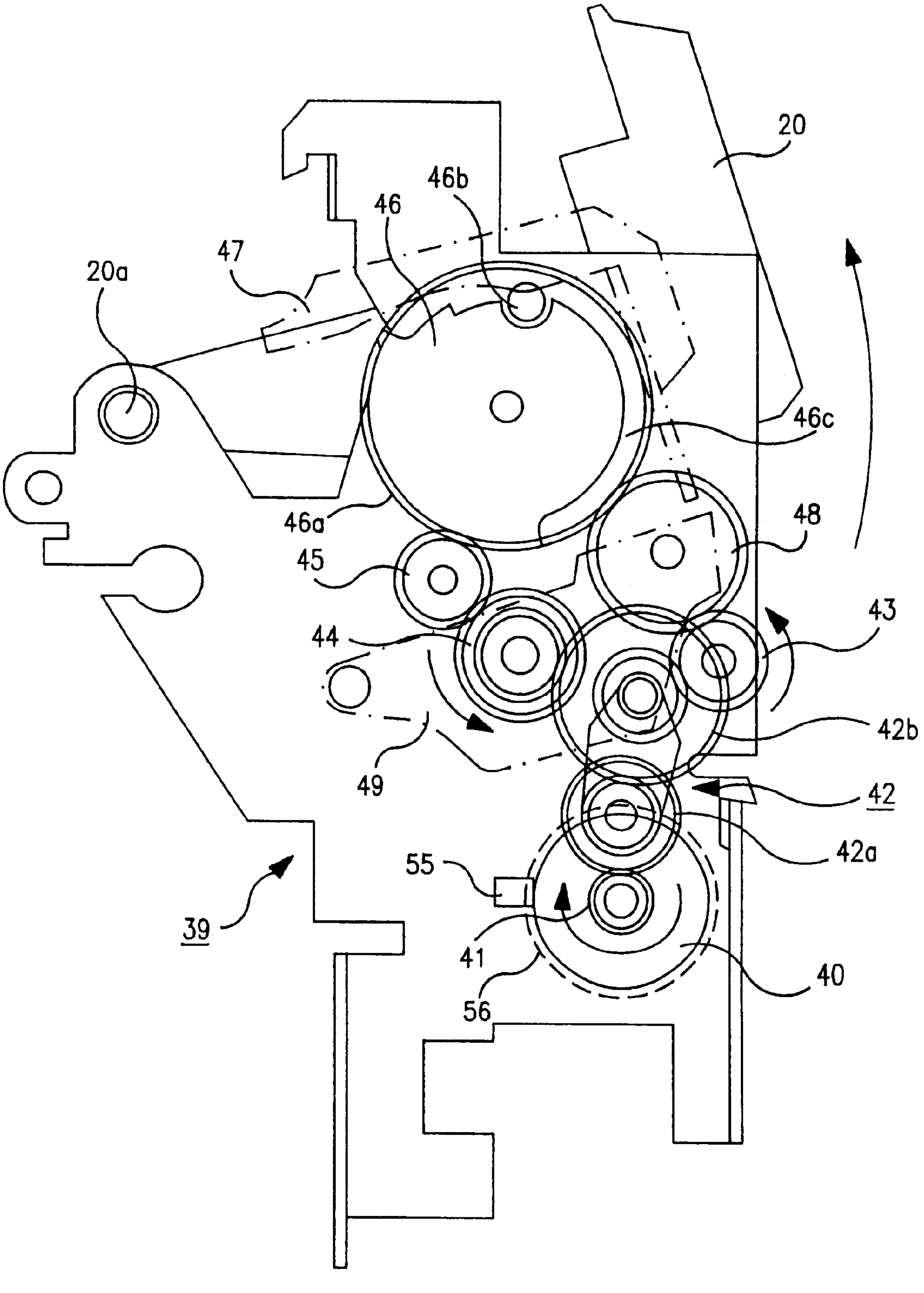
FIG. 27 is an illustration showing an operation status of the rocking guide and the drive mechanism of the downstream delivery roller.

Referring to FIGS. 25, 26, and 27, the drive mechanism 39 for the rocking guide 20 and the downstream delivery roller 17*a* are described In the drawings, the numeral 39 represents the drive mechanism and performs to open and close the rocking guide 20 and to drive in normal and reverse directions the downstream delivery roller 17*a*. This drive mechanism 39 is constituted of a drive motor 40 as a drive source and a gear series transmitting the drive force from the motor 40.

The drive motor 40 is formed with an encoder 56 for detecting the rotation number and a drive motor rotation detecting sensor 55, which detect the rotation speed of respective rollers and traveling amount of the rocking guide.

This drive mechanism 39 performs to rotate the downstream delivery roller 17*a* in the normal direction (rotation in the sheet delivery direction) while the drive motor 40 rotates normally, to open the rocking guide 20 as well as to rotate in the reverse direction (rotate in a direction opposite to the sheet delivery direction) the downstream delivery roller 17*a* while the rocking guide 20 is made open where the drive motor 40 rotates in the reverse direction, to close the rocking guide 20 as well as to rotate in the reverse direction the downstream delivery roller 17*a* while the rocking guide 20 is made closed, and to hold the rocking guide 20 while the drive motor 40 stops temporarily well as to lock the downstream delivery roller 17*a* when the rocking guide 20 is held. Hereinafter, the structure of the drive mechanism is described in detail along the stream of operation.

As shown in FIG. 25, when the drive motor 40 is rotated in the normal direction, drive force is transmitted to a fixed gear 42*a* of a pendulum gear unit 42 of the meshing a pinion gear 41 on the motor 40 to rotate the gear. A rocking gear 42*b* is swung to a shown position to mesh a delivery gear 43 of the downstream delivery roller 17*a*, and the sheets S are delivered and conveyed where the downstream delivery roller 17*a* rotates in the sheet delivery direction (normal direction: in the arrow direction in the drawing).

As shown in FIG. 26, when the drive motor 40 is rotated in the reverse direction, drive force is transmitted to the fixed gear 42*a* of the pendulum gear unit 42 of the meshing the pinion gear 41 on the motor 40 to rotate the gear. The rocking gear 42*b* meshes an intermediate gear 44 upon swung to the shown position, and an operational gear 46 rotates in the arrow direction via an intermediate gear 45 meshing the intermediate gear 44. The operational gear 46 includes a gear portion 46*a* meshing the intermediate gear 45, a projection 46*b* to open and close the rocking guide 20 in contact with an opening and closing arm 47 attached to the rocking guide 20 as a united body, a partially toothless gear portion 46 capable of meshing the intermediate gear 48 in mesh with the delivery gear 43.

Therefore, when the operational gear 46 rotates in the arrow direction, the partially toothless gear portion 46*c* meshes the intermediate gear 48 to rotate the delivery gear 43 meshing the intermediate gear 48 in the arrow direction in the drawing, and while the downstream delivery roller 17*a* rotates in the direction (the arrow direction in the drawing) opposite to the sheet delivery direction to start pulling back the sheets P, the rocking guide 20 is pushed up in the arrow direction in the drawing where the projection 46*b* pushes up the opening and closing arm 47 in contacting with the arm 47.

Where the rocking guide 20 reaches the position shown in FIG. 27, the drive of the drive motor 40 is stopped temporarily, and the rocking guide 20 is held as in the closed state. At that time, since the partially toothless portion 46*c* of the operational gear 46 is stopped in mesh with the delivery gear 46 via an intermediate gear 48, the downstream delivery roller 17*a* is locked and not rotatable.

It is to be noted that the holding position of the rocking guide 20 is changeable as described above according to the height (level) of the sheets, to keep constant the contact area of the paddle 31 to the sheet delivered on the staple tray 12.

Then, stacking and aligning operation for the sheets on the staple tray finishes, and the drive motor 40 is rotated again in the reverse direction. The delivery gear 43 rotates only for a portion meshing the partially toothless gear 46*c* of the operational gear 46, and the sheets P are pulled back by rotation of the downstream delivery roller 17*a* in the direction opposite to the sheet delivery direction in a prescribed amount (meshed portion as described above). The rocking guide 20 is made closed at the same time, and after closed, the guide prepares for the subsequent processing.

With such a structure, the drive mechanism for driving the rocking guide 20 and the downstream delivery roller 17*a* is not required to be installed individually, so that this apparatus can reduce the costs and be simplified.

Closing Operation of the Rocking Guide

As described above, the rocking guide 20 is pivotable around the rocking shaft 20*a*, and as shown in FIG. 27, when the operational gear 46 rotates in the arrow direction, the projection 46*b* formed on the operational gear 46 pushes up the opening and closing arm 47 attached to one end of the rocking guide 20 to open the rocking guide 20. When the operational gear 46 further rotates in the arrow direction in FIG. 27, the rocking guide 20 begins closing, and when the operational gear 46 more rotates, the rocking guide 20 is closed upon falling by its weight where the projection 46*b* is disengaged with the opening and closing arm 47.

If the operational gear 46 is rotated with a high speed when the rocking guide 20 is closed, and if the initial speed of the closing operation is made faster, the rocking guide 20 falls by its weight with large impacts, and the aligned sheets may be disturbed. Such impacts also adversely affect the durability of the apparatus.

Figure 28:
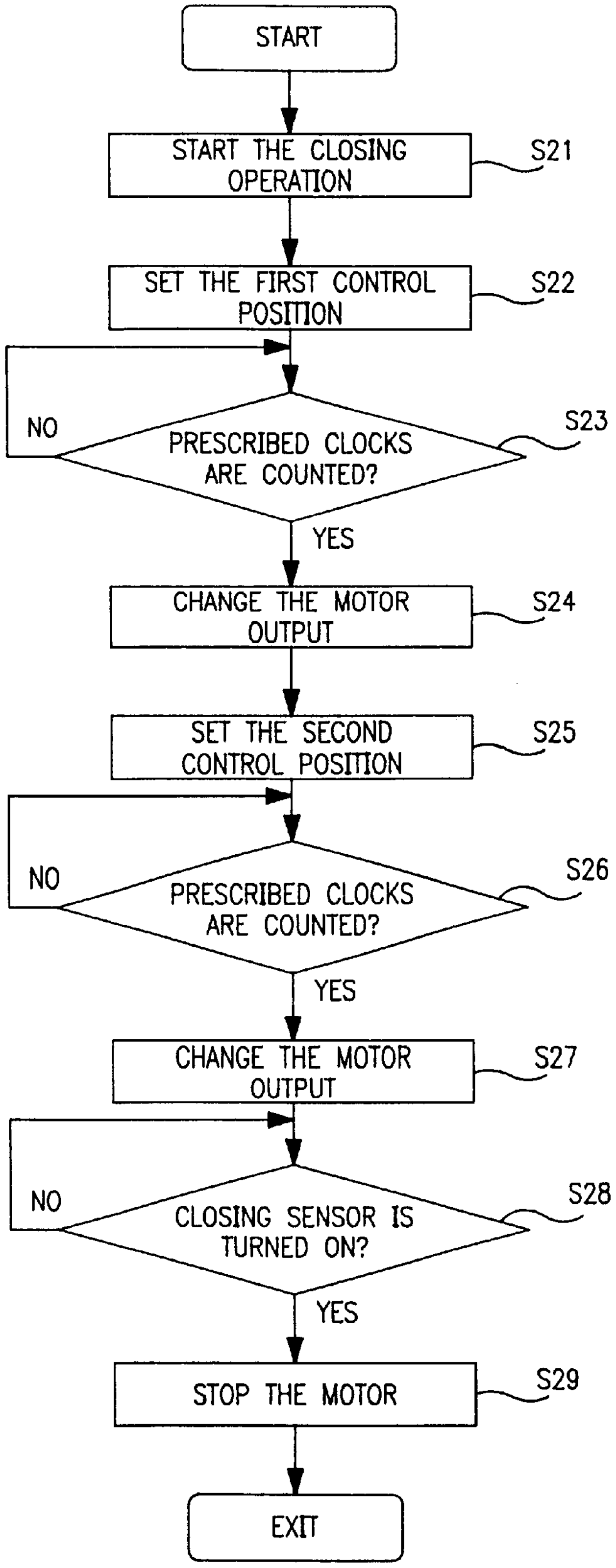
FIG. 28 is a flowchart showing a flow of position control when the rocking guide is made closed.

In this embodiment, to solve such problems, as shown in a flowchart of FIG. 28, during motor control for closing the rocking guide 20, after the motor starts, the rocking guide 20 is made closed with a high speed until the prescribed position No. 1 (S21), but when the rocking guide 20 is closed up to the prescribed position No. 1 (S22, S23), the motor output is changed (S24), and it is structured that the closing operation of the rocking guide 20 becomes slower. When the rocking guide 20 is further closed up to the prescribed position No. 2 (S28, S26), the motor output is changed again (S27), and the motor drive is stopped after the closing of the rocking guide 20 is detected (S28, S29).

This makes the rocking guide 20 rotate slowly right before falling by its weight and makes the initial speed for falling by its weight slow. Therefore, the impacts of the rocking guide 20 falling by its weight become smaller, thereby not disturbing the aligned sheets, making the impact sound smaller, and preserving the durability of the apparatus without affected adversely.

It is to be noted that, when the rocking guide 20 is made closed, the rocking guide 20 completes the closing operation after a prescribed time passes after the motor starts, and as shown in FIG. 26, the opening and closing arm 47 moves pivotally a sensor flag 49 to turn on the closing sensor not shown. The apparatus recognizes, by this operation, that the rocking guide 20 is closed.

Therefore, if the closing sensor is not turned on even after the prescribed time passes, an error presumably occurs. However, such a situation may be brought by, as a matter of facts, stopping of rotation of the drive motor due to impact resistance between the projection 46*b* of the operational gear 46 and the opening and closing arm 47 and deviations of loads to the coupled gears. In such a case, the operational gear 46 is rotated by transmitting the large rotational force, thereby continuously and smoothly performing the work.

Figure 29:
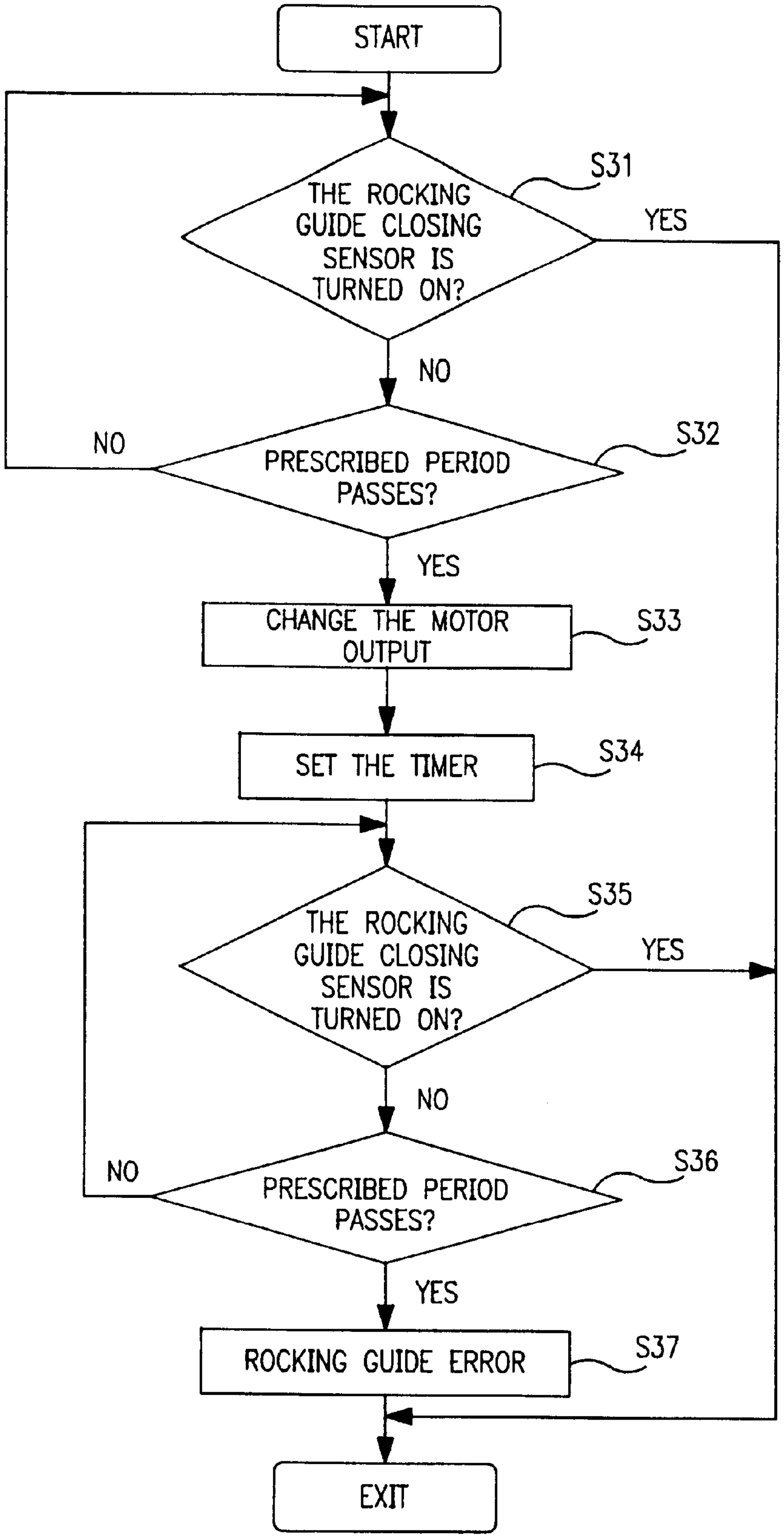
FIG. 29 is a flowchart showing a flow of an extraordinary completion processing when the rocking guide is made closed.

That is, in this embodiment, as shown in the flowchart in FIG. 29, where the rocking guide 20 is made closed (S31 to S37), if the closing sensor is not turned on even where the prescribed time passes after the motor states (S32), the motor output is changed to transmit a further larger rotational force (S33). Then, where the closing sensor is not turned on even if the prescribed time passes, the apparatus displays an error indication of the rocking guide 20 and stops the operation.

Where the closing state of the rocking guide 20 cannot be detected in the first closing operation as described above, the apparatus can reduce occurrences of stop due to errors by performing the closing operation again by enlarging the motor output and can do the sheet post processing continuously and smoothly.

Switching Control of the Rotational Direction

To switch the pendulum gear unit 42 upon driving the drive motor 40 in the reverse direction, since the rocking gear 42*b* is rotatively driven in accordance with the rotation of the fixed gear 42*a*, the rocking gear 42*b* does not easily mesh the delivery gear 43 and the intermediate gear 44 when rotated rapidly and may skip the teeth to be meshed. This may cause noises and reduce the durability and the reliance of the apparatus upon unnecessarily abrading the gears.

Figure 30:
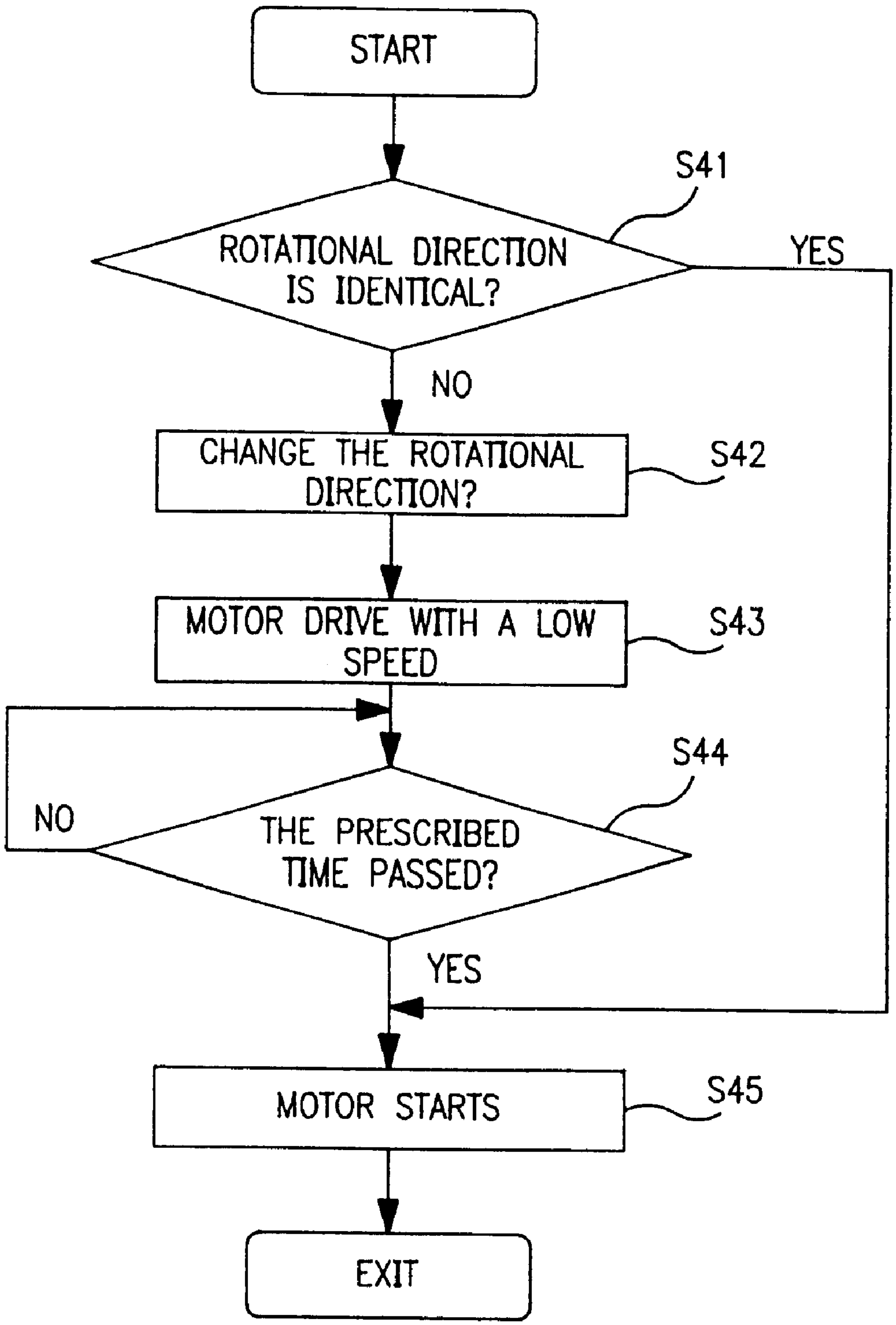
FIG. 30 is an illustration showing a low speed drive control when the rotational direction of a drive motor is switched.

In this embodiment, as shown in FIG. 30, the apparatus judges as to whether the rotational direction of the drive motor 40 is switched according to the control of the apparatus (S41), and if the rotational direction is not identical (S42), the drive motor 40 is controlled to drive with a low speed (S43). When an adequate prescribed time passes for switching the direction (S44), the drive motor is driven with a speed of the normal control (S45).

With such a structure, the rocking gear 42*b* can be meshed surely with the delivery gear 43 and the intermediate gear 44, thereby preventing the gear tooth skipping or noises, and the apparatus can have a good durability.

Staple Operation

As described above, the bundle of the sheets P staked on the stack tray 12 are nipped by the downstream delivery roller pair 17 secured by the delivery gear 43 and are stapled in this state. The stapled position, though various combinations are conceivable, can be selected as shown in FIG. 31 in this embodiment from a mode that a corner is stapled at a single location or mode that an edge is stapled at two locations.

When the stapler 13 is not located at a prescribed staple position, the stapler 13 is required to move, but this may cause the sheet bundle stacked on the staple tray 12 to move. Therefore, when the stapler 13 is made to travel, the side guide 11 presses the end of the sheet bundle. This operation prevents the alignment of the stacked sheets P from becoming disordered.

However, if the staple operation is performed while the sheets are pressed by the side guide 11, failure of the staple operation may occur because the sheet bundle may be bent in the width direction due to pressing of the side guide 11.

Figure 31:
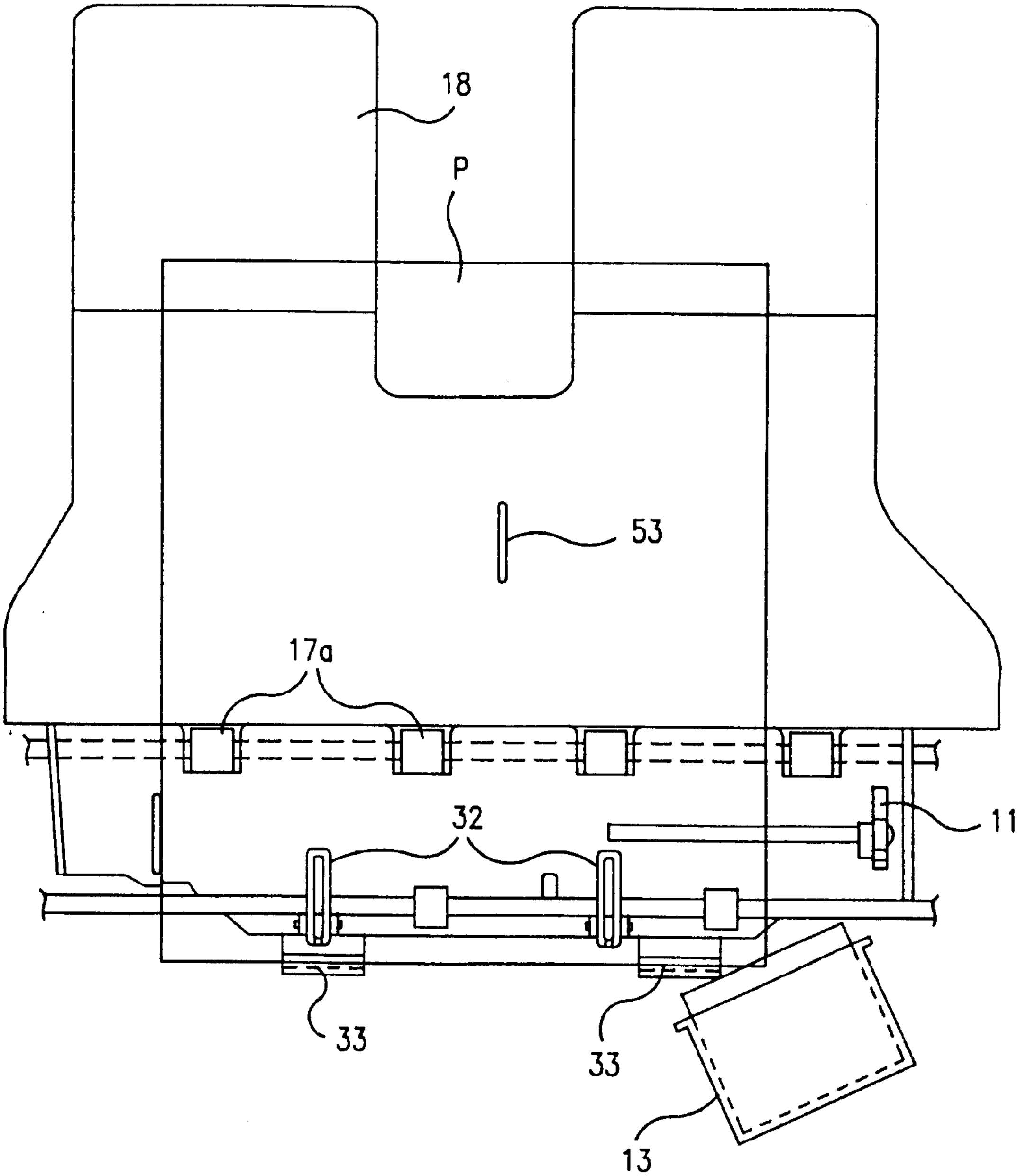
FIG. 31 is an illustration showing a staple operation according to this embodiment.

When the sheets are stapled, pressing of the side guide 11 is released as shown by a solid line in FIG. 31 to separate the side guide 11 from the bundle of the sheets P, and the staple operation is performed in a state that the sheets are nipped by the downstream delivery roller pair 17. This can release bending of the sheet bundle caused by the pressure of the side guide 11, thereby preventing possible staple failures.

Replacement of the Staples

Figure 32:
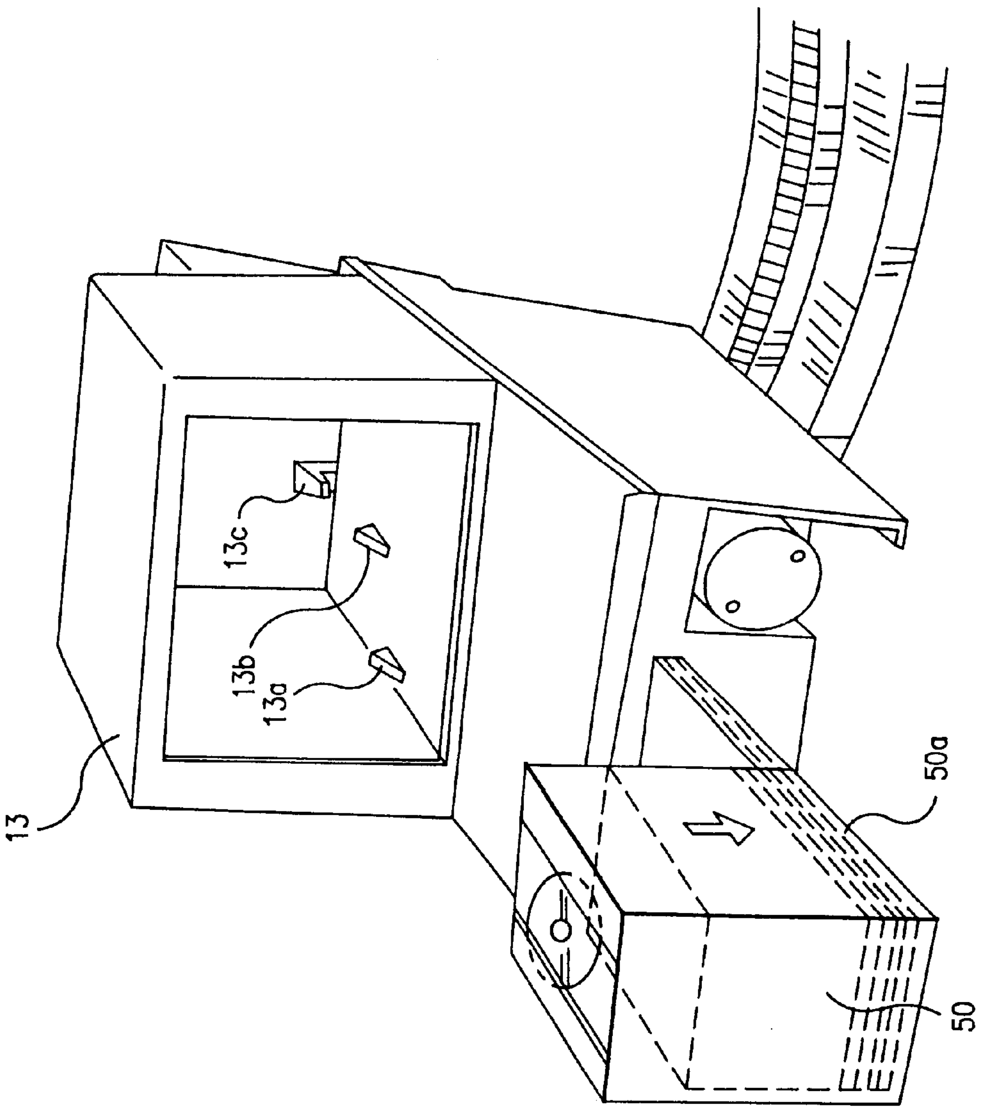
FIG. 32 is an illustration showing a stapler and a staple cartridge

As shown in FIG. 32, the stapler 13 is structured to attach a staple cartridge 50, and to exchange the staple cartridge 50 is replaced when the staples are supplemented. In the staple cartridge 50, plural staple plates 50*a* constituted in connecting plural staples with each other can be loaded.

Inside the stapler 13, formed are a staple cartridge sensor 13*a* for detecting the frame of the staple cartridge 50, a staple detection sensor 13*b* for directly detecting the staple exposed at a lower surface of the staple cartridge 50, and a starting staple detection sensor 13*c* formed at the tip of the stapler 13.

Figure 33:
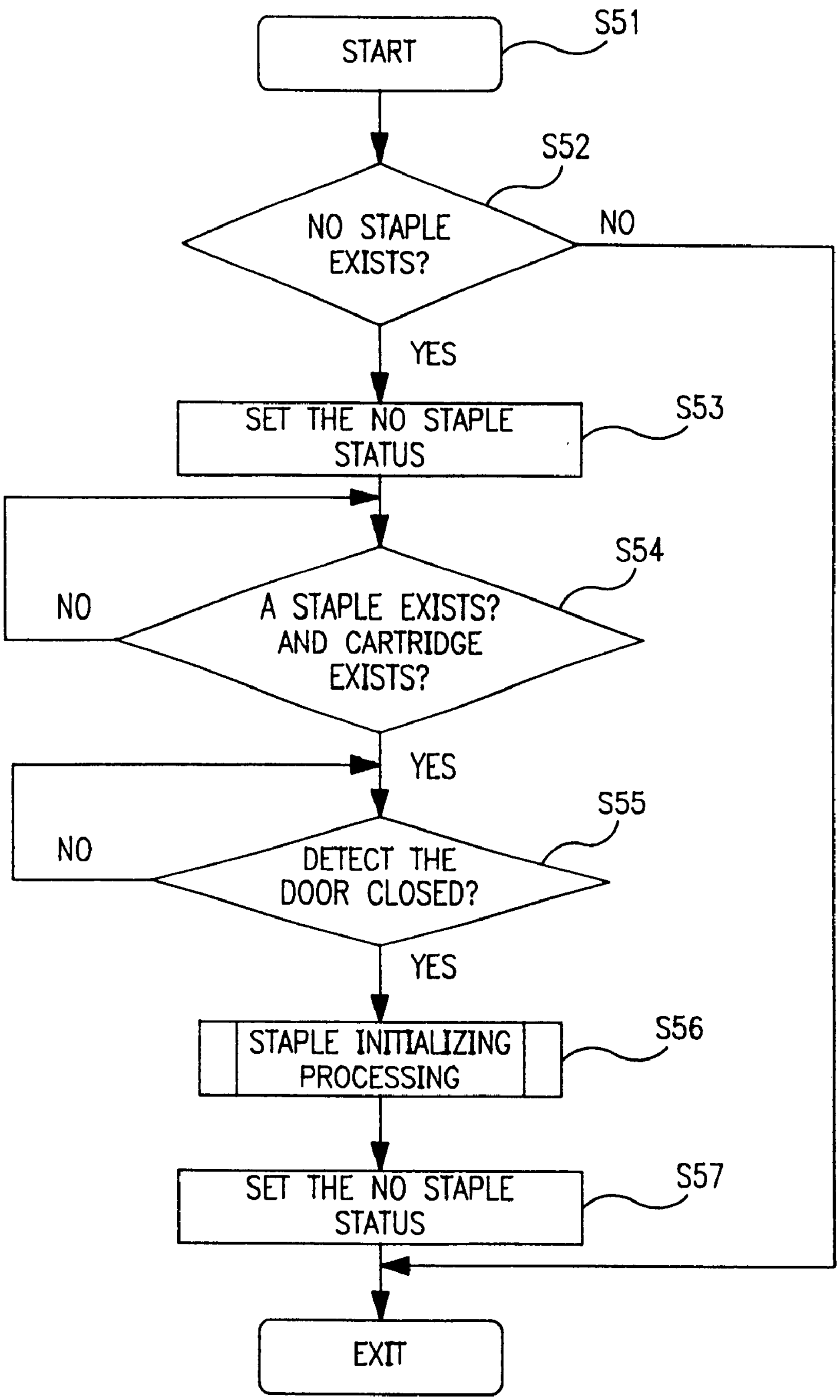
FIG. 33 is a flowchart illustrating staple cartridge exchange processing.

Control for replacing the staple cartridge 50 is shown in a flowchart in FIG. 33. When a job accompanied with the staple processing (S51), or when no staple state is detected during continuation (S52), the apparatus informs the user of no staple state and ask replacement of the staple cartridge 50 (S53). The user opens a stapler door 51 (see, FIG. 1) on a front surface of the finisher unit C, and loads the staple cartridge 50 in which staple plates 50*a* are filled to the stapler 13.

Though the stapler 13 detects by the sensor that the staple cartridge 50 has been attached, the staple detection sensor 13*b* judges, at a time when staples are inserted to some extent, that there are staples by detecting the lower surface of the staple cartridge 50. At this time, the cartridge is not attached or secured to a prescribed position yet, so that the staples may not be able to be fed or hit.

Therefore, in this embodiment, the apparatus judges whether both of the staple cartridge sensor 13*a* and the staple detection sensor 13*b* are turned on (S54), and if so, the apparatus recognizes that there are staples. This makes the apparatus capable of not only detecting the existence of the staples but also recognizing a state ready for striking the staples, thereby performing surely the staple replacement work.

Initializing Processing for Staples

When the apparatus detects that there are staples (S54) and that the staple door 51 is closed (S55), an initializing processing for staples begins (S56). Conventionally, for making staples ready, it was done by empty shots for certain times. However, such a system cannot recognize the staples even if the staple plates 50*a* already reaches the front end of the staple cartridge 50, and those were wasteful shots.

In this embodiment, the stapler 13 has a staple head detection sensor 13*c* , which is arranged at a position opposing to the front end of the staple cartridge 50. This staple head detection sensor 13*c* detects the end of the initializing processing, and consequently, the apparatus is not required to blindly make wasteful shots of staples any more. On the other hand, with control that empty shots are made until the staple head sensor detection sensor 13*c* detects the staples, such empty shots may be continued endlessly even where staple jamming occurs in the staple cartridge 50 because there is no limitation to the number of the empty shots.

Figure 34:
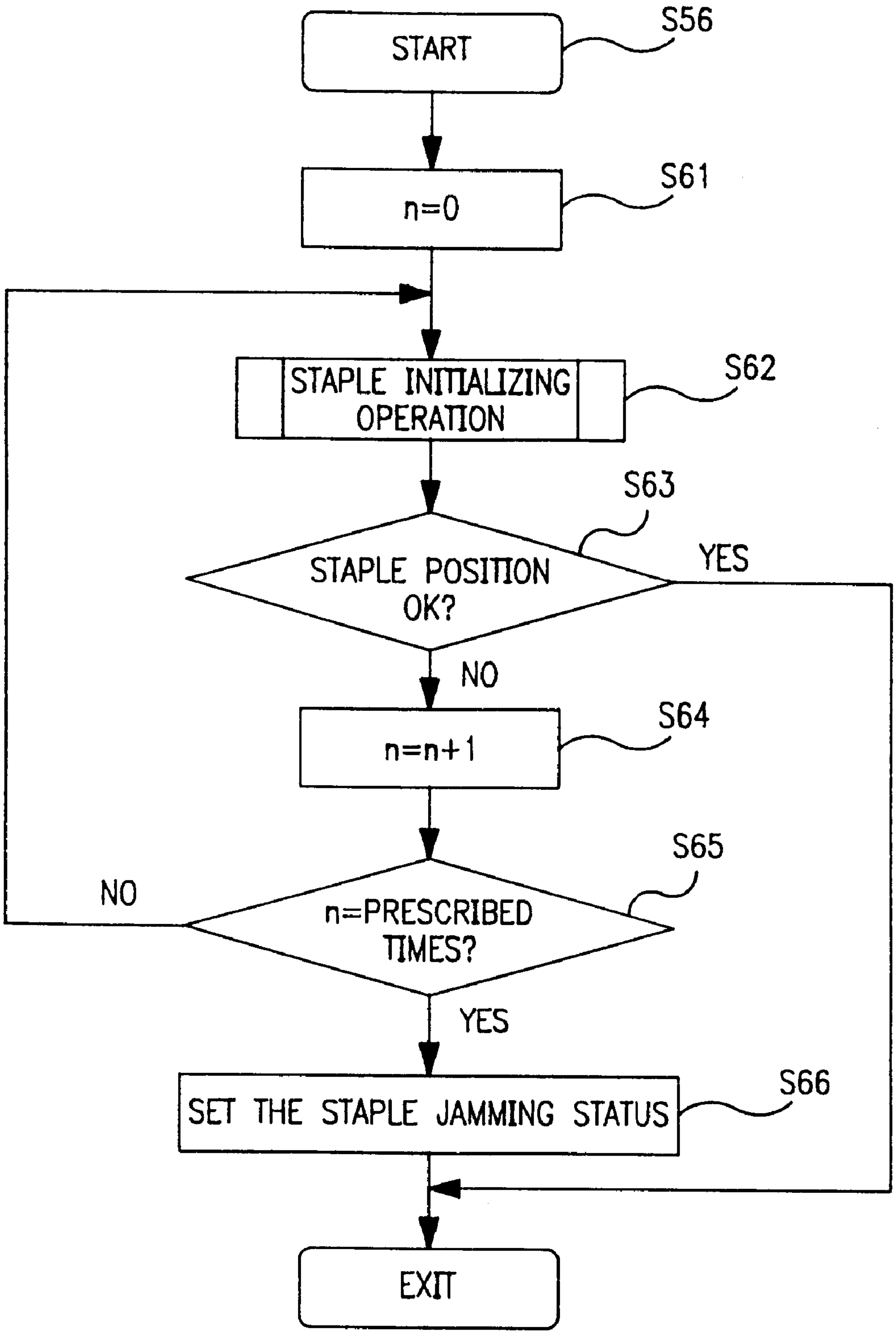
FIG. 34 is a flowchart illustrating staple initialization processing.

To solve such a problem, as shown in FIG. 34, when the initializing processing (S56) starts, a counter n is first reset (S61). The staple plate 50*a* is fed by a single staple upon doing an empty shot (S62). If the staple bead detection sensor 13*c* detects the staple (S63), the processing ends, and if the sensor does not detect, the counter n is counted up by one (S64). It is then judged as to whether the counter n reaches the prescribed number (S65). If it is within the prescribed number, further empty shots are repeated, and if it exceeds the prescribed number, the apparatus informs the user of occurrence of staple jamming (S66).

By thus imposing a limitation on the empty shot number with the staple head detection sensor 13*c* when staples are detected, the apparatus can avoid the endless loop of the initializing processing. If staple jamming occurs (S66) during the initializing processing (S56), it is recognized as no staple state in the cartridge replacement processing.

Staple Jamming Processing

Figure 35:
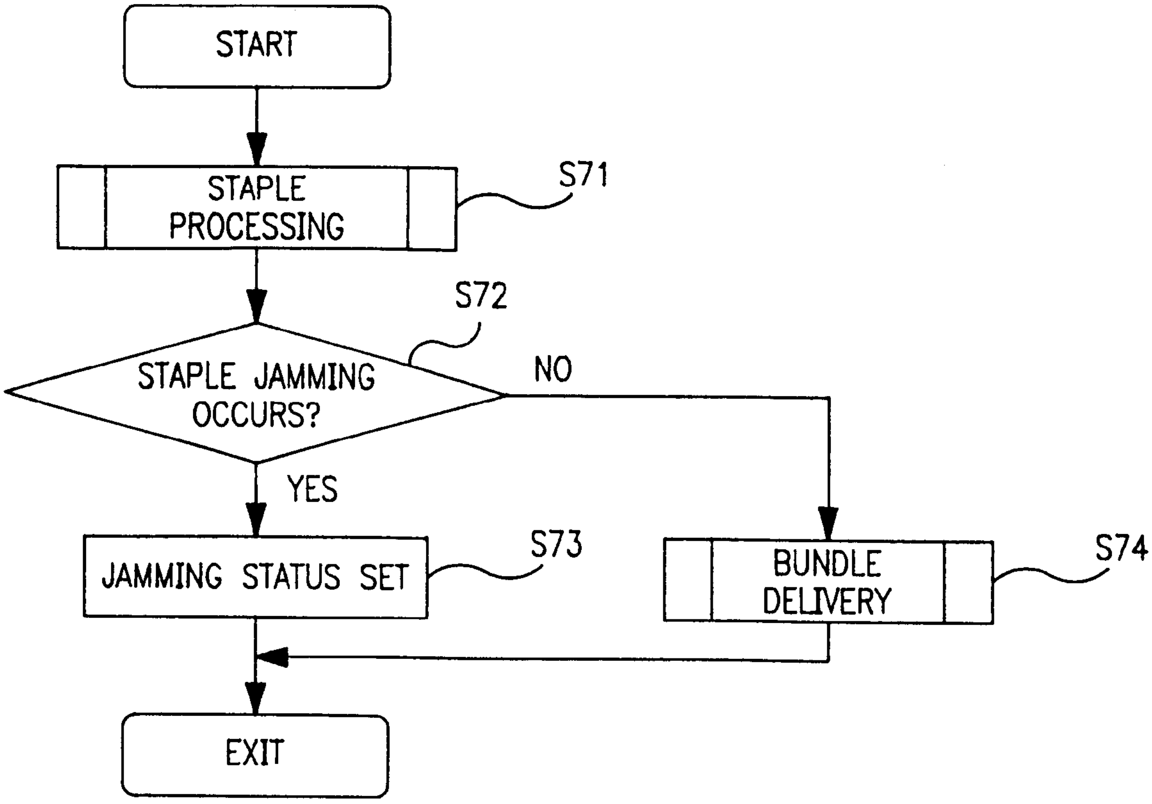
FIG. 35 is an illustration of a conventional control when staple jamming occurs.

In some case, staple jamming occurs while the staple operation is going on When the finisher unit C detects staple jamming, in a conventional apparatus, as shown in FIG. 35, it is judged as to whether staple jamming occurs (S72) after the staple processing (S71) is performed. If no staple jamming occurs, the sheet bundle is delivered (S73) to continue the processing, and if the staple jamming occurs, the apparatus informs the user of this occurrence (S74) and interrupts the processing. However, this operation makes the stapler 13 stay at a position where the staple operation is executed, and even if the user wants to clear up the jamming by opening the stapler door 51, the user's hand may not reach there.

Figure 36:
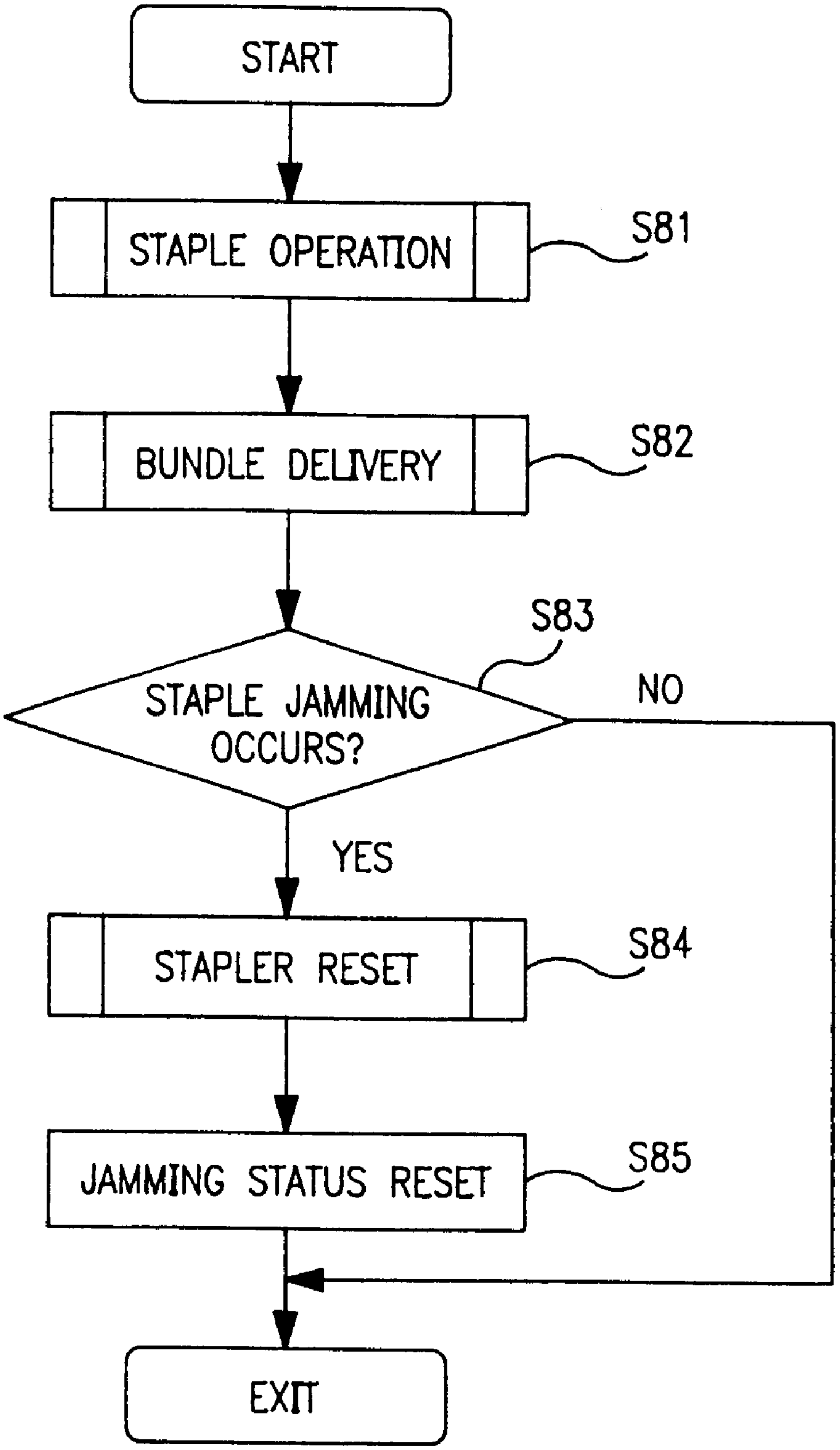
FIG. 36 is a diagram showing a control when staple jamming occurs according to this embodiment.

In this embodiment, as shown in FIG. 36, the sheet bundle is first delivered (S83) after the staple processing (S81) is executed, and it is judged as to whether the staple jamming occurs (S83). If no staple jamming occurs, the processing is going on as it is, and if the staple jamming occurs, the apparatus informs the user of the jamming after the stapler 13 is moved to an initial position near the stapler door 51 (S84) and then stops the processing. The initial position is the vicinity of the stapler door 51 and the easiest position for clearing the jamming by the user when the user opens the door. The reason that the sheet bundle is delivered is that a remaining bundle may receive damages upon contacting with the stapler 13 while the stapler 13 is moved to the initial position.

Moving of the stapler to the initial position, even where stapler jamming occurs, can avoid a situation that the user may not reach the stapler easily, thereby making the maintenance of the apparatus easy.

Stapler Initializing Operation During Stapler Jamming

The stapler door 51 of the finisher unit C is made open and closed at a time that the staples are replaced as described above, but if the sheet under carried causes jamming, there is no need for opening and closing the door. However, the user may open and close the door, and at that time, it is foreseeable that the user may inadvertently move the stapler.

The position control of the stapler is controlled by a travelling amount from the initial position, and the present position is not confirmed by means such as a sensor or the like. Therefore, the position of the stapler is moved during recovery from paper jamming, the apparatus cannot recognize this, and the stapler may make stapling at a wrong place if the staple operation starts as it is.

Figure 37:
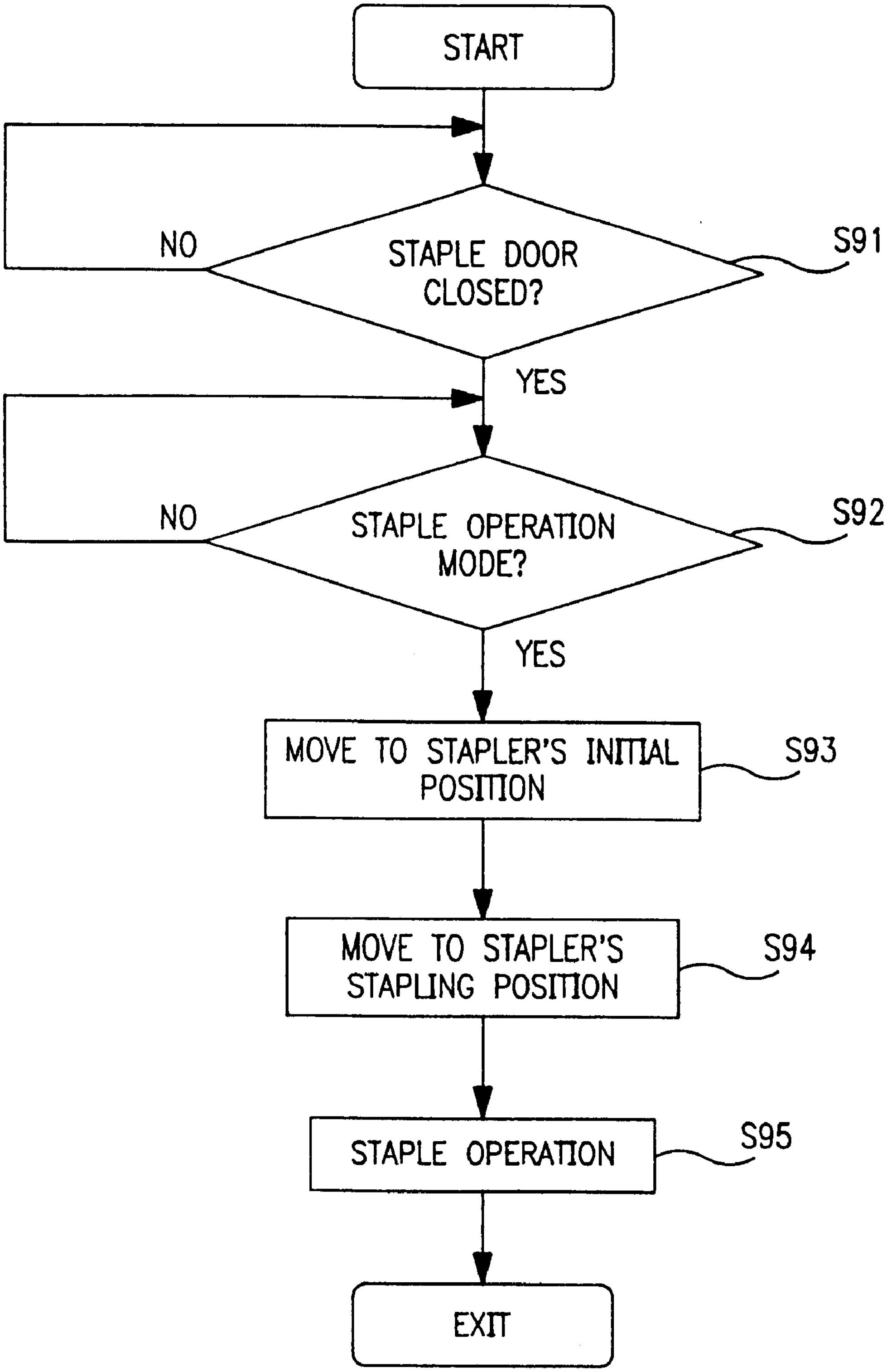
FIG. 37 is an illustration showing a stapler initialization when a stapler door is closed.

In this embodiment, as shown in FIG. 37, where opening and closing of the stapler door 51 is detected (S91) and where the stapling processing is performed (S92), the stapler 13 is returned once to the initial position before the staple operation is executed (S93), and is then moved again to the stapling position to execute the staple operation (S95). Because the apparatus is structured to execute the staple operation after the position of the stapler 13 is thus confirmed, staples may not be placed at wrong locations even where the user moves the stapler 13.

Delivery of Sheet Bundle

As described above, when the staple operation ends, the drive motor 40 rotates in the normal direction to render the pendulum gear unit 42 in mesh with the delivery gear 43, and the bundle of the sheets P is delivered on the stack tray 18 upon rotation of the upstream delivery roller pair 17 in the conveyance direction.

Where a sheet bundle whose one corner is subjecting to the staple operation is delivered, an edge surface on the side opposite to the side where the staple operation is made is easily disordered. This phenomenon occurs with influences according to the size and number of the sheets, and such disorder becomes more remarkable, since the friction between sheets becomes smaller as the sheet size is smaller.

In the conventional apparatus, the control in which the downstream delivery roller pair 17 delivers the sheet bundle is unchanged, and as shown in FIG. 38(*a*), the control of the drive motor 40 is done by the output of 100%. For example, where the delivery speed is set again in reference to the sheet bundle of sheets of a medium number under this circumstance, excessive conveyance force may be given to the sheet bundle having a small number and easily cause such disorders, and on the other hand, the delivery speed may be reduced because the mass of the sheet bundle may be larger where the number of the stacked sheets becomes larger.

In this embodiment, to solve this problem, the stack tray 18 is moved up where the sheet bundle whose one location is subject to the staple operation is delivered, and the apparatus delivers the sheets where the stacking surface of the stack tray 18 is made closer to the downstream delivery roller pair 17. This makes resistance between the sheet bundle and the stacked surface of the stack tray 18 smaller and suppresses occurrences of such disorders.

Furthermore, the stack tray 18 located closer to the downstream delivery roller pair 17 is dissented for a fixed amount right before the rear end of the sheet bundle passes by the downstream delivery roller pair 17. This prevents the sheets from proceeding in the reverse way due to contacts or the like of the rear end of the sheet bundle with the downstream delivery roller pair 17.

As shown in the drawing, the setting up speed of the drive motor 40 during delivery is controlled to be slow according to the sheet size and sheet number, and thereby the apparatus corresponds to the sheet bundles having different sheet sizes and sheet numbers. That is, the apparatus starts with drive force of about 80% to the sheets of a large size and with drive force of about 60% to the sheets of a small size.

More specifically, as shown in FIG. 38(*b*), when the sheet size is the small size, the setting up speed is made slower than that of the large size, thereby preventing disorders which otherwise occurs due to quick acceleration. When the stacked number is large, the drive torque at the setting up time is made lower than the time when the number is smaller, and the torque from the drive roller is controlled as to transmit to the lowermost sheet of the sheet bundle adequately and evenly. The drive shifts to have gradually the normal conveyance speed and the normal drive torque, and finally, any sheet bundles even having the different size and number are delivered with substantially the equal speed.

From those operations, this apparatus can improve the stacking property on the stack tray 18 in preventing the disorder in the edge surface on a side where no staple is made even when the sheet bundle whose one location is subjecting to the staple operation is delivered, and can deliver the sheets with the same speed regardless the size and number of the bundle. The drive motor 40 is not drive with the 100% output, so that this apparatus has an effect to reduce the operating sounds generated from the apparatus.

By making closer the stack tray 18 to the downstream delivery roller pair 17, the sheet bundle to be delivered is prevented from being bent, so that the lowermost sheet of the sheet bundle is prevented from bending.

Detection of Stacking Mixed Sheets

Where the stacked sheets on the stacking tray 18 are delivered with control for sheet size or sheet processing mode, which is different from the stacked sheets, the apparatus is required to impose some limitation on the sheet number to be stacked as a special handling for mixed sheets because the stacking property becomes impaired in comparison with the sheet stacking in the same size or sheet stacking for the same processing.

A stack sensor 53 is therefore provided at about a center of the stacking tray 18 for detecting whether the sheet is stacked on the tray, and if the sheet P is stacked on the stacking tray 18, the apparatus executes the handling program for mixed sheets with the following conditions.

(1) Where the sheet P stacked on the tray is not a sheet delivered and stacked on the finisher unit C.

(2) Where a sheet P having the different sheet size is delivered and stacked on the stack tray 18 by the finisher unit C.

(3) Where a sheet is delivered and stacked with the different processing mode by the finisher unit C.

In the finisher C according to this embodiment, a detection signal from stack sensor 53 is monitored when image formation starts, and the signal is not monitored after the image formation has already started. This is because the first delivered sheet may be misidentified as a sheet of mixed sheets if the detection signal from the stack sensor 53 is monitored even after the sheet is delivered after the image formation has already started.

Detection of the Stacked Amount

A measuring sensor 54 arranged on a top of the rocking guide 20 detects the level of the sheets stacked on the stack tray 18 or the topmost surface of the sheet bundle. The measuring sensor 54 includes a light emitting portion radiating light such as infrared ray to sheet bundles and a photo receiving portion for receiving light reflected irregularly at the sheet bundle. The sensor 54 detects the level by measuring the angle of the reflected light.

Figure 39A:
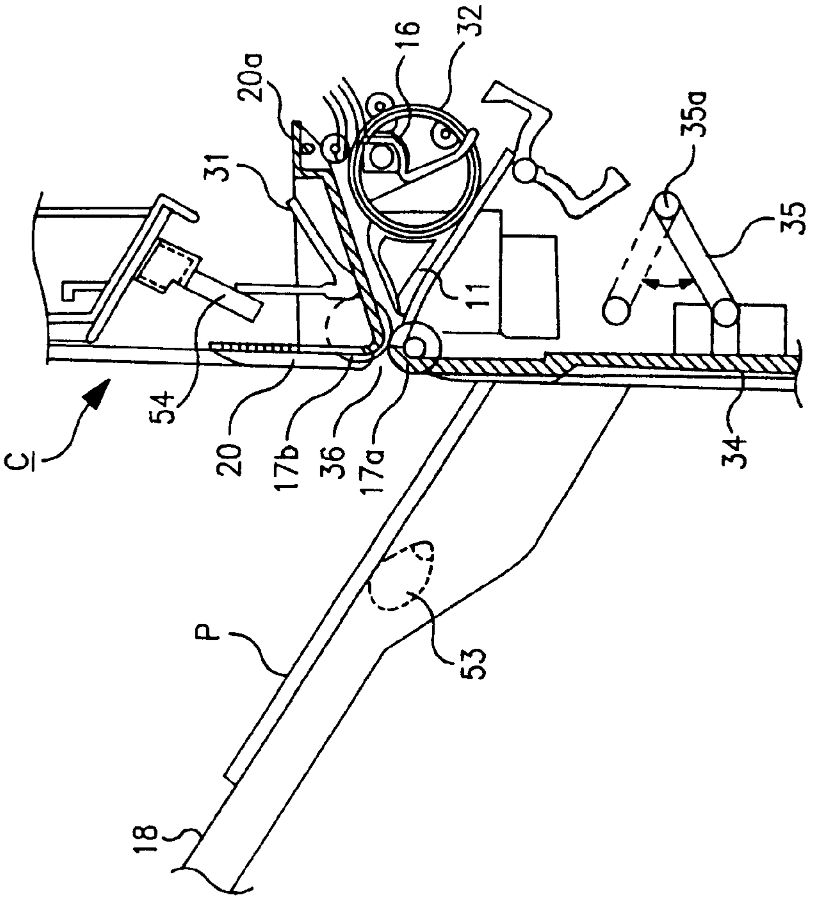
FIG. 39 is an illustration showing a status that the sheet is delivered to the stack tray and a perspective view showing a schematic structure of an essential portion of a tray unit portion.
Figure 39B:
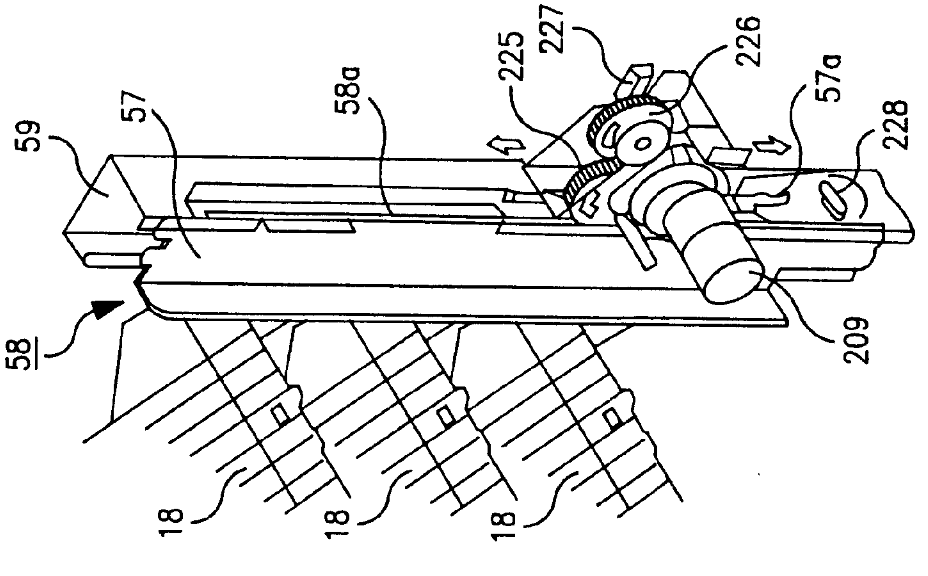

When the sheets are delivered on the stack tray 18, as shown in FIG. 39(*a*), the sheet P may not fall because the rear end of the sheet P is trapped at the finisher unit C. If the level detection is implemented in such a circumstance, the level may not be detected accurately. Therefore, this apparatus has a structure that when the sheet P is delivered the stack tray 18 moves down once and up again to render the sheet P settled on the stack tray 18.

It is desirable that the measuring sensor 54 detects the level when the stack tray 18 moves up where the level of the sheets P stacked on the stack tray 18 is detected. However, because the subsequent sheet P is in fact already delivered when the stack tray 18 moves up, the sensor cannot detect the sheet on the stack tray 18 due to interference from the delivered sheet.

This apparatus is structured to get the detected result if data within the permissive error range are brought successively where the level is detected twice or more with a prescribed time interval, because the sheets may not be settled yet at a moment where a level detection is performed during dissenting of the stack tray 18. The apparatus can detect the established actual level and maximizes the productivity of the apparatus.

The position of the stack tray 18 after moved up is controlled so that the stacked surface becomes always constant based on the data obtained by the level detection (paper surface level control).

Here, a structure for recognizing the sheet stacking amount (the level of the stacked sheets) on the stack tray 18 is briefly described using FIG. 39(*b*). It is to be noted that the detailed structure is disclosed in Japanese Unexamined Patent Publication (KOKAI) Heisei No. 9-48549. FIG. 39(*b*) is a perspective view showing a schematic structure, as the essential portion, of the tray unit, a driver for the tray unit, and a position detecting portion of the tray unit.

In this embodiment, a tray unit 58 is structured by securing three stack trays 18 to respective tray frames 57, and the three stack trays 18 can move up and down as a united body with respect to the finisher frame 59 of the finisher unit C. Moving up and down of the tray unit 58, or namely, the stack trays 18, is structured by moving up and down of the tray unit itself with respect to the finisher frame 59 where the normal and reverse rotational drive of a stacker motor 209 is transmitted to a rack portion 58*a* formed at a portion of the tray unit 58 via a pinion gear 225.

An encoder 226 is mounted on an output shaft of the stacker motor 209. Where the pulse amount from the encoder 226 is detected with a stacker motor clock sensor 227, the apparatus can detect how far pulses the tray unit 58 moves from a home position as the initial position, or the traveling amount of the tray unit 58. It is to be noted that the detection whether the stack tray 18 is in the home position is made by detection of a tray unit flag 57*a* provided at a lower portion of the tray frarne 57 by a tray home position sensor 228.

After the tray unit 58 is detected as in the home position from a copy operation signal or the like (or the tray home position sensor 228 detects the tray unit flag 57*a*), the stack trays 18 are set at the predetermined positions with respect to the downstream delivery roller pair 17 based on the detection signal of the measuring sensor 54, and the stack trays 18 receive the sheets delivered from the downstream delivery roller pair 17.

This apparatus also has a structure that the stack tray 18 is moved down by a prescribed amount at each stack of the sheet or sheet bundle to maintain the topmost level of the sheet on the stack tray 18 at a position of the prescribed amount from the downstream delivery roller pair 17.

In this apparatus, an MPU 200 (see, FIG. 42) in the finisher unit C as described below can recognize what amount of clocks the tray unit 58 travels from the home position or namely, the traveling amount of the stack tray 18.

The apparatus thus structured, can determine the positions of the stack tray 18 and the topmost surface of the sheets on the stack tray 18 and can recognize the stacked amount of the stacked sheets on the stack tray 18 (the height of the stacked sheets).

As described above, the apparatus recognizes that sheets are fully stacked if it is over the predetermined amount based on the processing mode and the sheet size upon detecting the position of the stack tray 18 and the stacked amount of the sheets P stacked on the stack tray 18 through the level detection in a manner.

However, even if the fully stacked state is detected, the sheets P, in some case, may be not settled yet due to curling or a state of the trapped rear end of the sheets P on the stack tray 18. Therefore, the apparatus may stop the operation in judging as it is the full stacked state though in fact not fully stacked, thereby possibly reducing the productivity.

In this embodiment, the apparatus stops the operation upon judging that the sheets are fully stacked only when detecting that the topmost sheet on the stacked tray 18 is at a prescribed level or higher, or when detecting plural times that the stacked amount of the sheets on the stack tray 18 exceeds the prescribed amount. More specifically, the apparatus stops the operation upon moving up and down the stack tray 18 and judging that the sheets are fully stacked only when detecting plural times (three times in this embodiment) that the stacked amount of the sheets on the stack tray 18 exceeds the prescribed amount upon detecting the sheet stacked amount on the stack tray 18 at every operation (or after completion of the operation).

Moreover, in this embodiment, the apparatus performs detection of the fully stacked state as described above at every sheet delivery of a prescribed number (e.g., five sheets) onto the stack tray 18.

This apparatus thus can detect as to whether the sheet stacked amount exceeds the prescribed amount after solving curling or a state of the trapped rear end of the sheets P occurred on the stack tray 18, can prevent erroneous recognition in the detection of the fully stacked sheets because the apparatus judges that the sheets are fully stacked only when detecting successively that the sheet stacked amount exceeds the prescribed amount and stops the operation, and can provide adequate productivity.

It is to be noted that the apparatus has a structure for suggesting to the user that the stacked sheet (or sheet bundle) should be removed from the stack tray 18 when the apparatus detects the fully stacking of the sheets and stops its operation.

System Stop Timing During Detection of Fully Stacked Sheets

However, if image formation is stopped upon detection that the sheets are fully stacked as described above even while the sorting operation is going on, the sheet bundle in a midway of the sorting operation is stacked on the stack tray 18, and removal of this may make complicated handling of the stacked sheets because the sorting operation ends. On the other hand, a margin to some extent may usually be set for detection of the fully stacked sheets on the stack tray 18, and even where the sheets are detected as full, further sheets can be stacked thereon.

Figure 40:
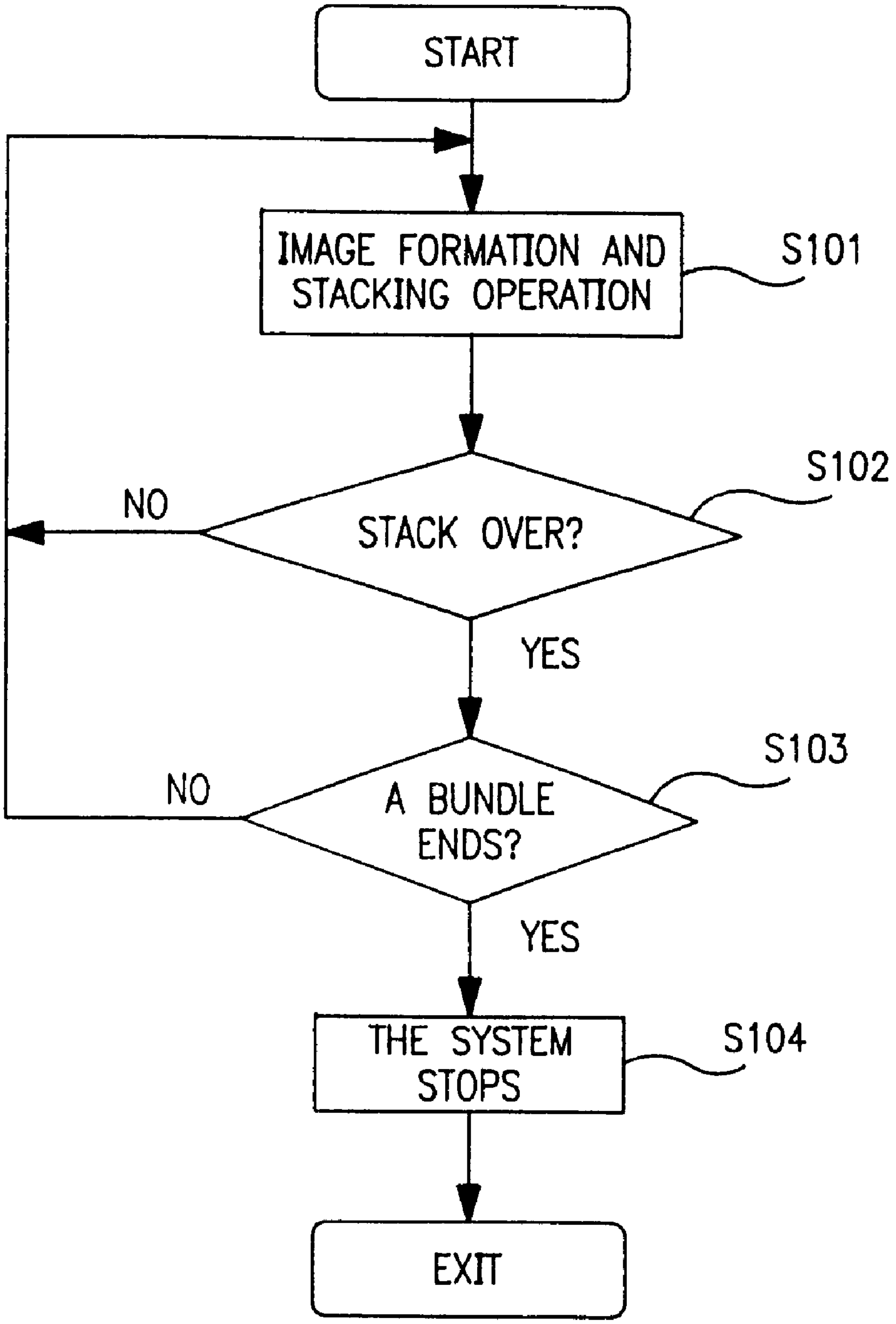
FIG. 40 is a flowchart showing a control when full stacking is detected.

In this embodiment, as shown in FIG. 40, if the fully stacked state is detected (S102) in a midway of the image formation and stacking operation (S101), the apparatus judges whether a single bundle is completed (S103), and if image formation of the single bundle is not yet completed, the image formation is continued as it is without stopping the formation. This structure avoids a sheet bundle in a midway of the sorting operation even where the sheet bundle is removed from the stack tray 18 and makes easier the handling.

Subsequently, the measuring sensor 54 detects the fully stacked state, and the apparatus stops the image recording as in the fully stacked state while it is not in the sorting operation (S104).

Special Sheets

If sheets delivered and stacked on the stack tray 18 are special sheets, particularly, OHP sheets, because the light emitted from the measuring sensor 54 does not reflect irregularly so much on the OHP sheet surface but reflect mostly in a mirror fashion, errors of distances of 20 to 30 mm (experimental values) may occur in comparison with measurements to the ordinary sheets. If the ordinary control is made, the stack tray 18 is moved up since the apparatus recognizes that the stacked top surface is far (low) that the actual one where detecting the fully stacked state or controlling the stacked height, and in some case, the stacked sheet may be trapped at the delivery opening, so that failures in stacking such that sheets are damaged by collisions of the delivered sheets to the stacked sheets may occur.

Figure 41:
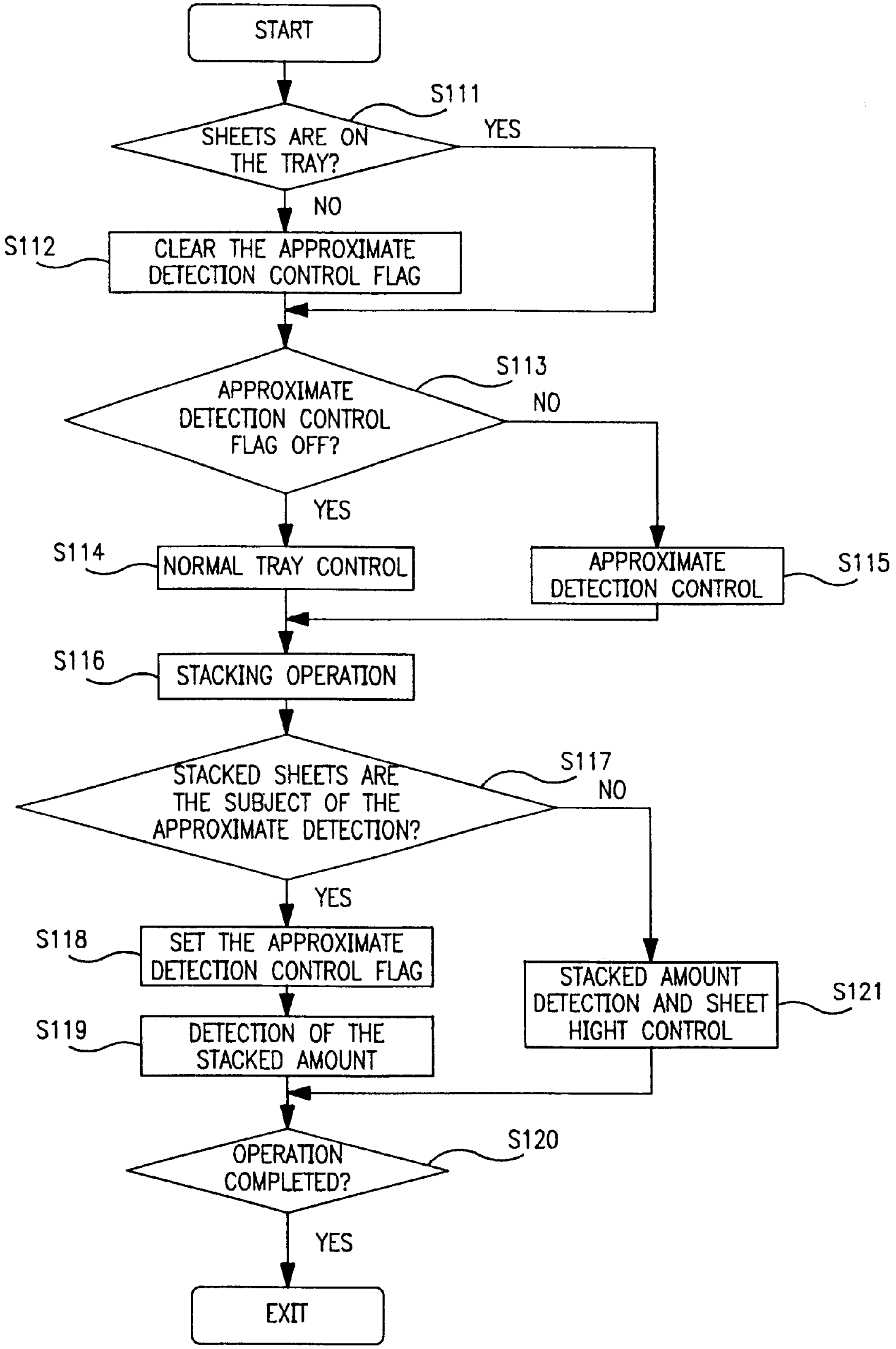
FIG. 41 is a flowchart showing a full stacking detection for special sheets.

In this embodiment, as shown in FIG. 41, the apparatus judges whether the stacked sheets containing the sheets fed from the apparatus multi-tray (manual feeding tray) are removed from the sheets on the stack tray 18 (S111), and if such sheets are removed, an approximate detection flag is cleared (S112), or namely, it is detected as not the approximate detection.

If the approximate detection flag is off (S113), the normal tray control is performed (S114) as presuming that no sheet is stacked or sheets having no error in detection of the measuring sensor are stacked. If the approximate detection flag is on (S113), the apparatus does the approximate detection control (S115).

The approximate detection control herein presumes errors in advance and amend them where the surface level of the delivered stacked sheets on the stack tray 18, which is measured by the measuring sensor 54, is not trustful due to special sheets or the like. In this embodiment, it indicates a possibility that the sheets fed from the apparatus multi-tray (manual feeding tray) are stacked on the stack tray 18.

The approximate detection control also indicates that based on the errors in the sensor, it is controlled to be lower than the predetermined stacked surface level, more specifically, about 30 mm lower.

After the delivered sheets are stacked on the stack tray 18 (S116), the apparatus judges whether the stacked sheets are the subject matter of the approximate detection (S117). This judgment is made in the same way depending on whether the stacked sheets are fed from the apparatus multi-tray (manual feeding tray).

According to this judgment, when the sheets are of the subject matter of the approximate, detection, the approximate detection flag is set (S118), and in the subsequent tray control, the approximate detection control enters (S115).

If the sheets are not of the subject matter of the approximate detection, the apparatus implements the stacked amount detection and the sheet height control (S121), but if they are of the subject matter of the approximate detection, the apparatus implements only the stacked amount detection (S119).

In the above embodiment the control is described in which all the sheets fed from the apparatus manual feeding opening are processed entirely as special sheets. Herein, a control for turning on and off the approximate detection flag in judging whether the stacked sheets are special.

This judgment is made by a calculation of a distance by the measuring sensor 54 at two points where the stack tray 18 is moved at the two points having the different heights at which a traveling amount is known in advance. On the other hand, the distance that the stack tray 18 is moved is measured by a traveling amount detecting means not shown. If the differential between the measured value and the difference of the distances measured by the measuring sensor is equal to or more than a prescribed amount (in general, the measure value by the sensor is larger), the apparatus judges that the stacked sheets are the subject matter of the approximate detection.

By this operation, even if the sheets to he conveyed are special sheets such as the OHP sheets that the measuring sensor 54 cannot measure easily, or even if the sheets are changed to special sheets in a midway, the apparatus can do the sheet processing substantially the same as the normal sheets.

The measurement of the OHP sheets done by the measuring sensor creates a shift of a certain amount (20 to 30 mm) in comparison with plain paper as described above, but the deviations in the measure values according the sheet number are in the same way as the plain paper. Therefore, if the delivered sheets are recognized as the OHP sheets, the apparatus can do the detection of the fully stacked state and control for stacked height in use of the measuring sensor 54 in the same manner as the normal cases by shifting in a certain amount the stack tray 18 downward.

Structure of the Control System for the Finisher Unit

Figure 42:
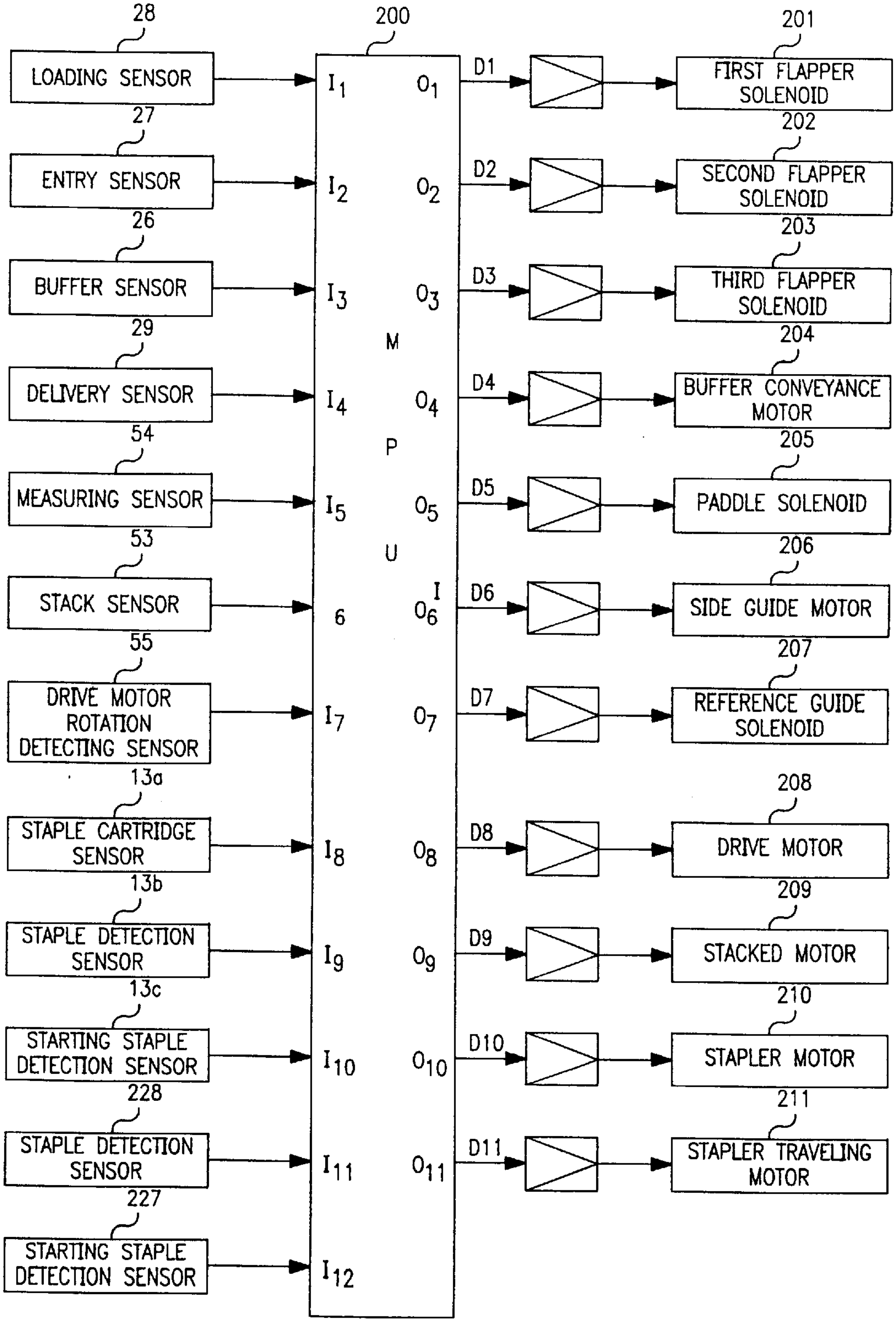
FIG. 42 is a block diagram showing an outline of a control system for finisher unit.

Referring to FIG. 42, the structure of the control system for the finisher unit C of the sheet processing apparatus B is briefly described.

In FIG. 42, numeral 200 represents the MPU as a control means. The MPU 200 receives input signals from the loading sensor 28, the entry sensor 27, the buffer sensor 26, the delivery sensor 29, the measuring sensor 54, the stack sensor 53, the drive motor rotation detecting sensor 55, the staple cartridge sensor 13*a* , the staple detection sensor 13*b*, the starting staple detection sensor 13*c* , the stacker motor clock sensor 227 for detecting the pulse amount of the encoder 226 provided on the output shaft of the stacker motor 209, the tray home position sensor 228 detecting the home position of the tray unit 58 (or its stack tray 18), and the like.

Based on the above signals, the apparatus drives, through respective drivers D1 to D11, a first flapper solenoid 201 switching the first flapper 21, a second flapper solenoid 202 switching the second flapper 22, a third flapper solenoid 203 switching the third flapper 23, the buffer roller 23, the downstream delivery roller pair 16, and the knurled belt 32, and moves up and down the shutter portion 34 by the reverse rotation. The apparatus also controls a paddle solenoid 206 for engagement and disengagement of the drive force from the buffer conveyance motor 204 to rotate the paddle 31, a side guide motor 207 for moving the side guide 11 in sliding the side guide 11, a reference guide solenoid 208 for escaping the reference guide 37 from the staple tray 12 during the sheet shift, the drive motor 40 for rocking the rocking guide 20 and driving rotatively the downstream delivery roller 17*a* in the normal and reversc directions, the stacker motor 209 for moving up and down the stack tray 18, a stapler motor 210 for staple operation of the stapler 13 and feeding of the staples, a stapler traveling motor 211 for moving the position of the stapler 13, and so on.

The respective motors control the traveling amount, speed, and so on according to the control input pulse and the input from the encoder detecting the rotation amount.

Stitcher Unit

Respective structures of portions in the stitcher unit D in the sheet processing apparatus B is described in detail next. As described above, the stitcher unit D as shown in FIG. 3 delivers sheets in providing the folding operation after the sheets delivered from the image forming apparatus body A are conveyed in the vertical path 60 composed of path guides 60*a*, 60*b* and are stapled at the center of the sheets by means of the stapler unit 61.

The sheets P delivered from the image forming apparatus body A are fed to the vertical path 60 of the stitcher unit D in cooperation with the first flapper 21, and are stacked and aligned while the lower end of the sheets is in contact with the stopper 62. An upper roller pair 63 is provided as a conveying means at an upper portion of the vertical path 60, and plural flappers 64 are formed on the downstream side of the pair. In this embodiment, the flappers 64 are constituted of a first flapper 64*a* and a second flapper 64*b*, which allow to change selectively the conveyance route according to the size of the sheets P.

A movable guide 65 is provided around the flappers 64. The guide 65 is urged toward the flapper 64 by an urging means 65*a* to constitute a part of the conveyance route of the vertical path 60. This movable guide 65 can expose the inside of the vertical path 60 near the flappers 64 by pivotally movement by gripping a handle 65*b*, thereby allowing recovery for sheets when jamming occurs.

Plural sheet sensors 66 are arranged at positions opposing to the flapper 64 with respect to the vertical path 60. A first upper sensor 66*a* is placed between the upper roller pair 63 and the first flapper 64*a*; a second upper sensor 66*b* is placed at a position opposing to the first flapper 64; and a third upper sensor 66*c* is placed at a position opposing to the second flapper 64*b*. Those sheet sensors 66 can detect existence of the passing sheet and the front end or rear end of the sheet.

Lower Roller Pair

The stapler unit 61 as describe below is arranged around the center of the vertical path 60, and an anvil 61*d* is placed at a position opposing to the stapler unit 61 with respect to the vertical path 60. A lower roller pair 67 is formed as a conveying means on a downstream side of the stapler unit 61, and the pair 67 includes a drive roller 68 as a drive rotary body for transmitting the drive force from the drive source not shown, and a pickup roller 69 as a movable rotary body driven to rotate in pushing the sheet to the drive roller 68.

Figure 43A:
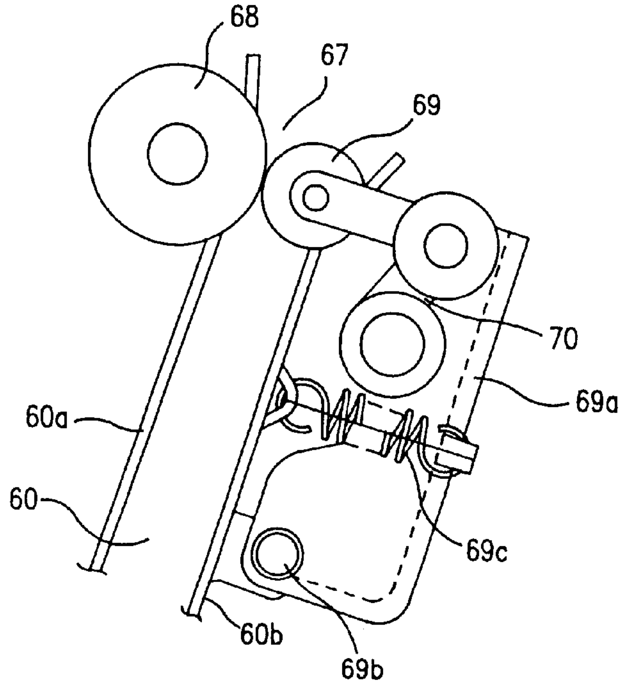
FIG. 43 is a partially enlarged view showing a structure of a pickup roller.
Figure 43B:
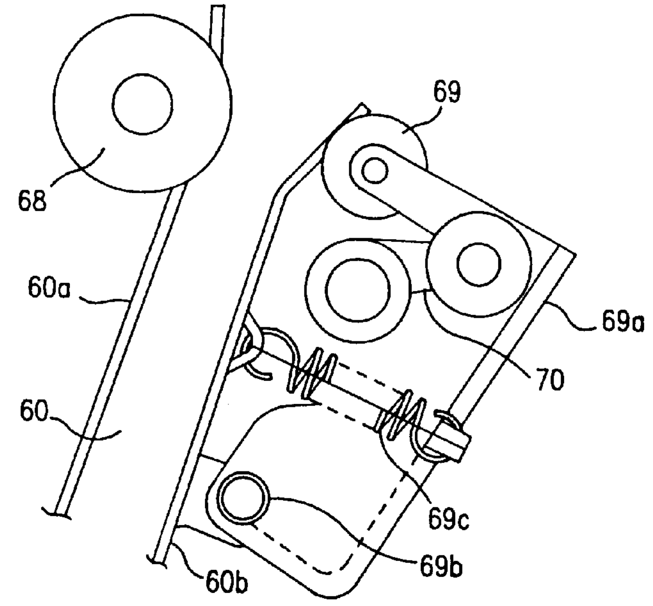

As shown in FIG. 43, the pickup roller 69 is mounted at one end of a conveyance roller arm 69*a*, and the other end of the conveyance roller arm 69*a* is rotatively supported to the path guide 60*b* of the vertical path 60 through a pivotal shaft 69*b*. An elastic member 69*c* is attached around the center of the conveyance roller arm 69*a*, thereby urging the pickup roller 69 to the drive roller 68. Meanwhile, a pressing releasing arm 70 driven by a solenoid not shown is formed at the conveyance roller arm 69*a*, and the arm 70 is able to separate the pickup roller 69 from the drive roller 68. Therefore, the pickup roller 69 can change its position between the pressing position for pushing the sheet to the drive roller 68 and the separation position for separating the roller 69 from the drive roller 68.

Pressing of the Pickup Roller

Figure 44A:
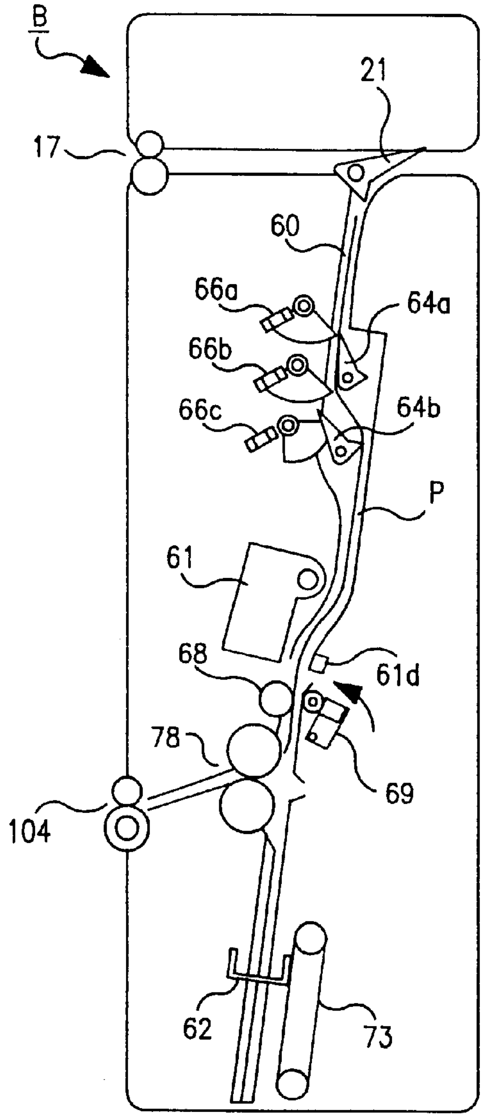
FIG. 44 is an illustration showing operation of the pickup roller.
Figure 44B:
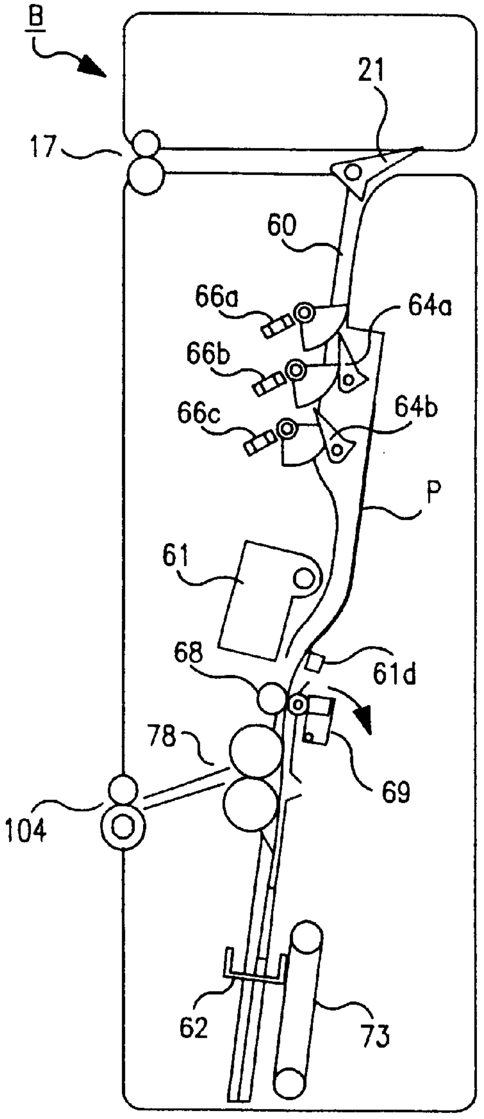

When the sheet P is conveyed by the lower roller pair 67, the roller 69 is pressed as shown in FIG. 44(*a*) on the sheet after the front end of the sheet passes by the position of the pickup roller 69, and the sheet P is carried while nipped by the pickup roller 69 and the drive roller 68. The subsequently fed sheet proceeds at that time toward the drive roller side of the already stacked sheets P, and is conveyed in skidding together with the already stacked sheets.

If the pickup roller 69 is normally in pressed contact with the drive roller 68, the roller may exert conveyance force to the sheets P that have reach the stopper 62 and been stacked there and may fold the sheets. In this embodiment, the pickup roller 69 comes in pressed contact with the roller 68 only when necessary, so that the sheets are aligned well and can be stacked precisely to the vertical path 60.

Separation of the Pickup Roller

As shown in FIG. 44(*b*), the pickup roller 69 is separated at a position where the front end of the sheet P come close to a prescribed position from the stopper 62. In this embodiment, the prescribed position from the stopper 62 is set for 10 mm in this embodiment, and after the pickup roller 69 is separated, the sheet P is conveyed to the stopper 62 from the inertial moment prior to this moment and the weight of the sheet itself. It is to be noted that the position of the front end of the sheet P is recognized by a conveyance distance after the front end of the sheet passes by the sheet sensor 66.

If the sheet is conveyed while the pickup roller 69 is in pressed contact with the drive roller 68 until the sheet P reaches the stopper 62, the sheet may be bent or may impair proper alignment due to occurrences of rebounding when the pickup roller 69 is separated. In this embodiment, the pickup roller 69 is separated at an early stage, thereby preventing the sheets from overly conveyed and avoiding the above problem.

Drive Roller when the Pickup Roller is Separated

As described above, if the pickup roller 69 is separated before the sheet P is stacked on the stopper 62, the sheet P may proceed with great force in the vertical path 60 where the stacked number is not so large, and rebounding of the sheet may create disorder in alignment. If the stacked number is large, the friction opposing to smooth passage may increase due to narrower space in the vertical path 60, so that the sheet may not reach the stopper 62.

This embodiment is structured that the drive roller 68 keeps drive rotation even after the pickup roller 69 is separated. The sheet P conveyed at that time receives only weak conveyance force from contact force because the sheet is not in pressed contact with the drive roller 68. Accordingly, the sheet P is surely conveyed to the stopper 62, and can be aligned certainly because pushed.

Vertical Path Shape

The sheet P stacked upon hitting the stopper 62 is aligned in the width direction by an alignment member 71. At that time, the sheet P is in an upright state, and if the sheet is flexible, the sheet is folded. In this embodiment, to solve such a problem, a projection 60*c* projecting in the conveyance route of the vertical path 60 is formed at the path guide 60*a*, thereby bending the stacked sheets horizontally, or namely creating rigidity in the vertical direction. Accordingly, the sheets P can be stacked without folding of the sheets.

Figure 45:
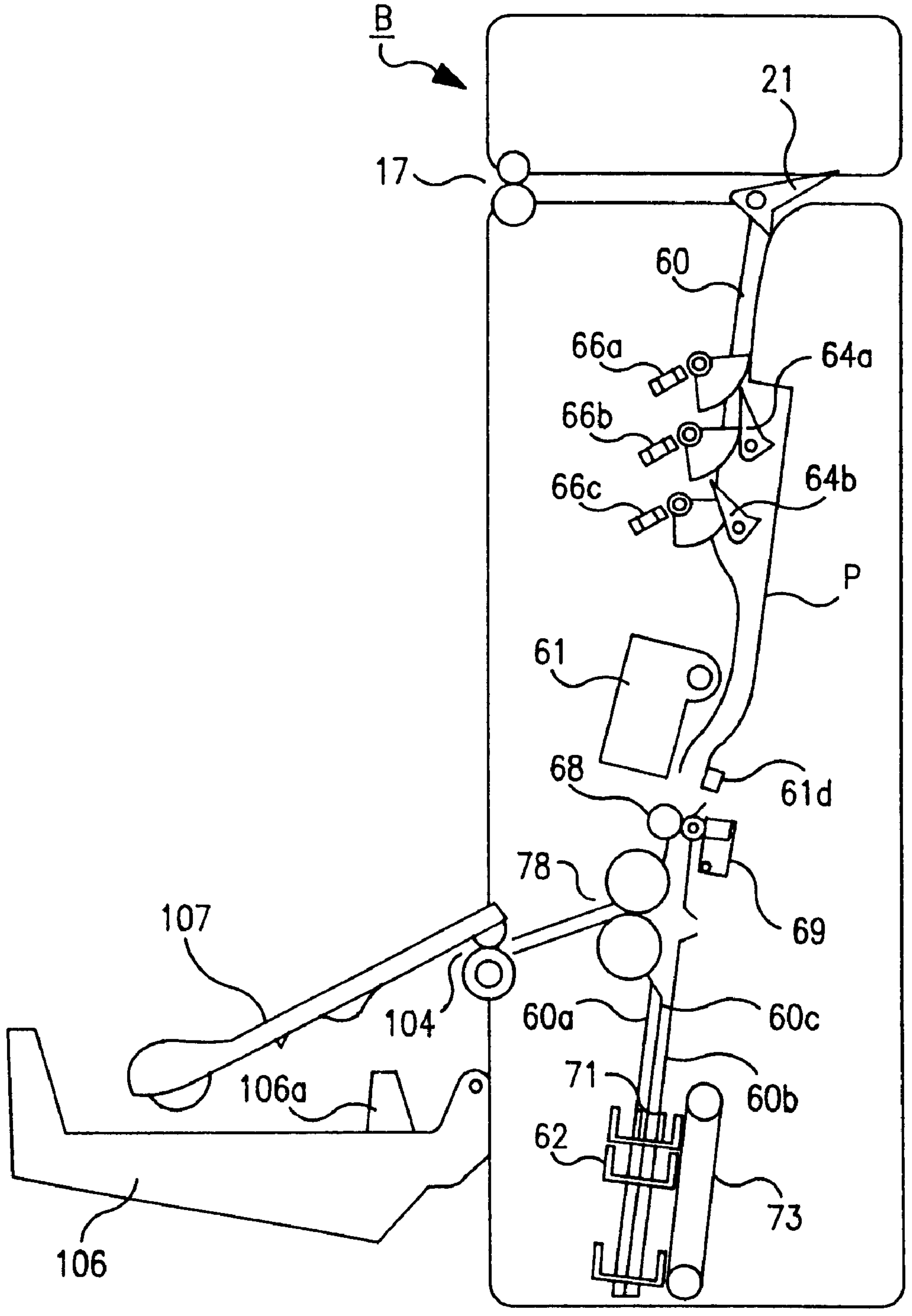
FIG. 45 is a view showing a shape of a vertical path.
Figure 46:
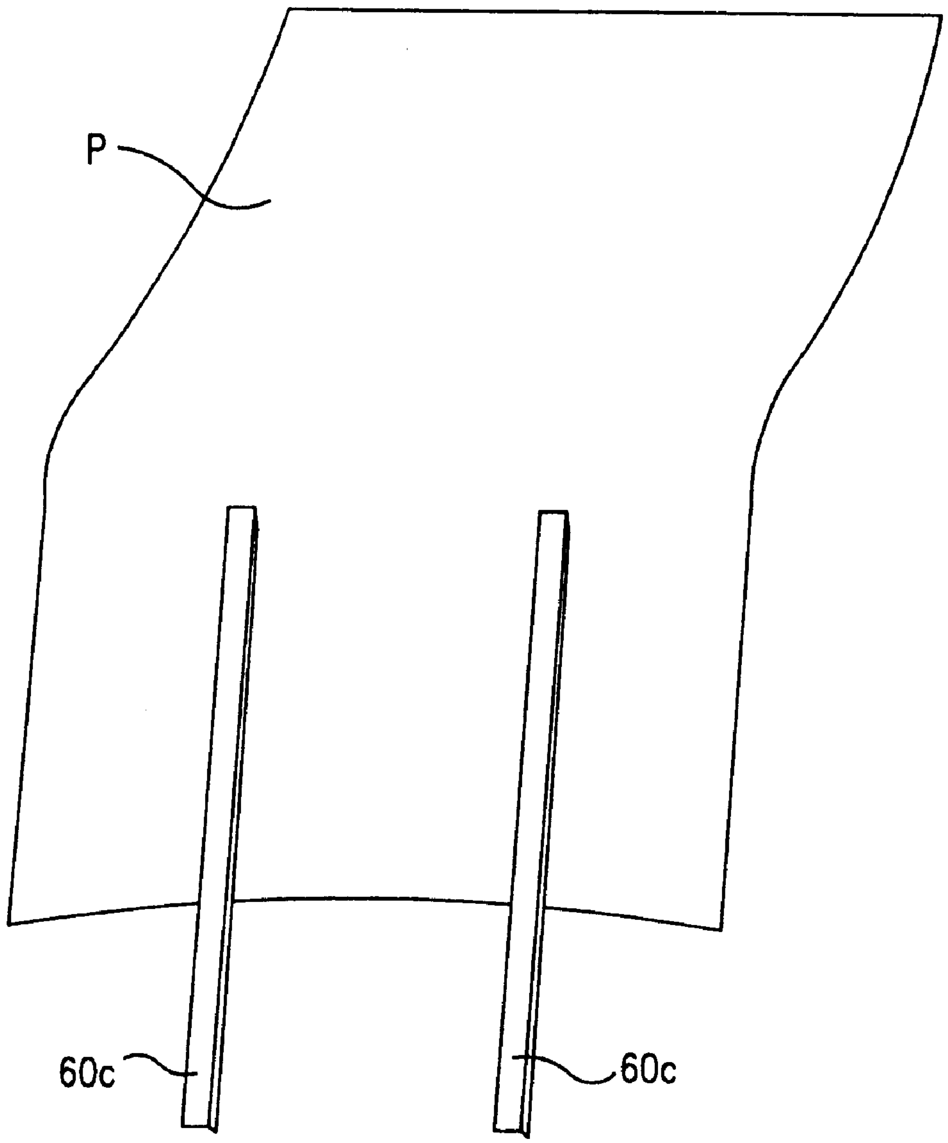
FIG. 46 is a diagram showing a shape of staked sheets.

On the other hand, if the sheets remain bent in the horizontal direction, it is not favorable when the stapler unit 61 makes the stapling operation. In this embodiment, as shown in FIG. 45, the vertical path 60 is bent between the upper portion and the lower portion of the stapler unit 61, thereby making the sheets P bent around the center to the vertical direction. That is, the sheets P are stacked where the lower portion is bent in the horizontal direction and where the center portion is bent in the vertical direction. This structure can stack the sheets without folding the sheets and can make the position for executing the staple operation flat.

Stopper Mechanism

Figure 47:
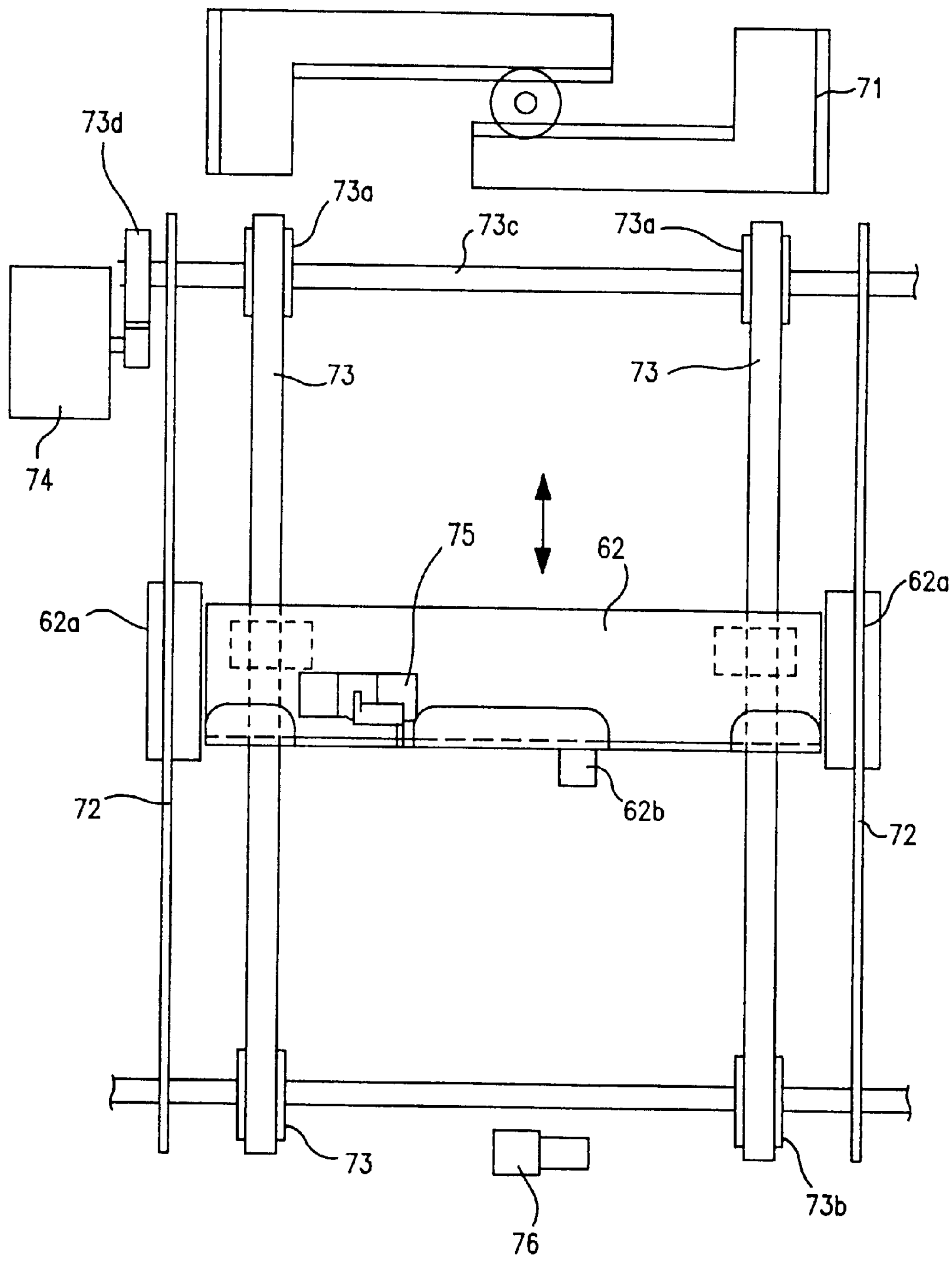
FIG. 47 is an illustration showing a drive mechanism for stopper.

Referring to FIG. 47, a drive mechanism for the stopper 62 is described. Sliding members 62*a* are mounted on both ends of the stopper 62 and supported slidably along a stopper frame 72. The stopper 62 is securely coupled to a stopper drive belt 73 wound around a drive pulley 73*a* and idler pulley 73*b* . A drive gear 73*d* is fixed to a rotary shaft 73*c* of the drive pulley 73*a* and is connected to a stopper drive motor 74. That is, if the stopper drive motor 74 rotates, the stopper drive belt 73 rotates upon receiving the drive force and can drive the stopper 62 up and down.

A stopper sensor 75 is provided on a sheet stacking surface of the stopper 62 and can detect the sheet P where the front end of the sheet P hits the stopper 62. A flag 62*b* is formed at the lower portion of the stopper 62, and a stopper home sensor 76 detects the stopper 62 when the stopper 62 reaches the home position.

Stapler Unit

A mechanism of the stapler unit as a sheet stapling means for rendering the staple operation of the sheet bundle is described next.

Figure 48:
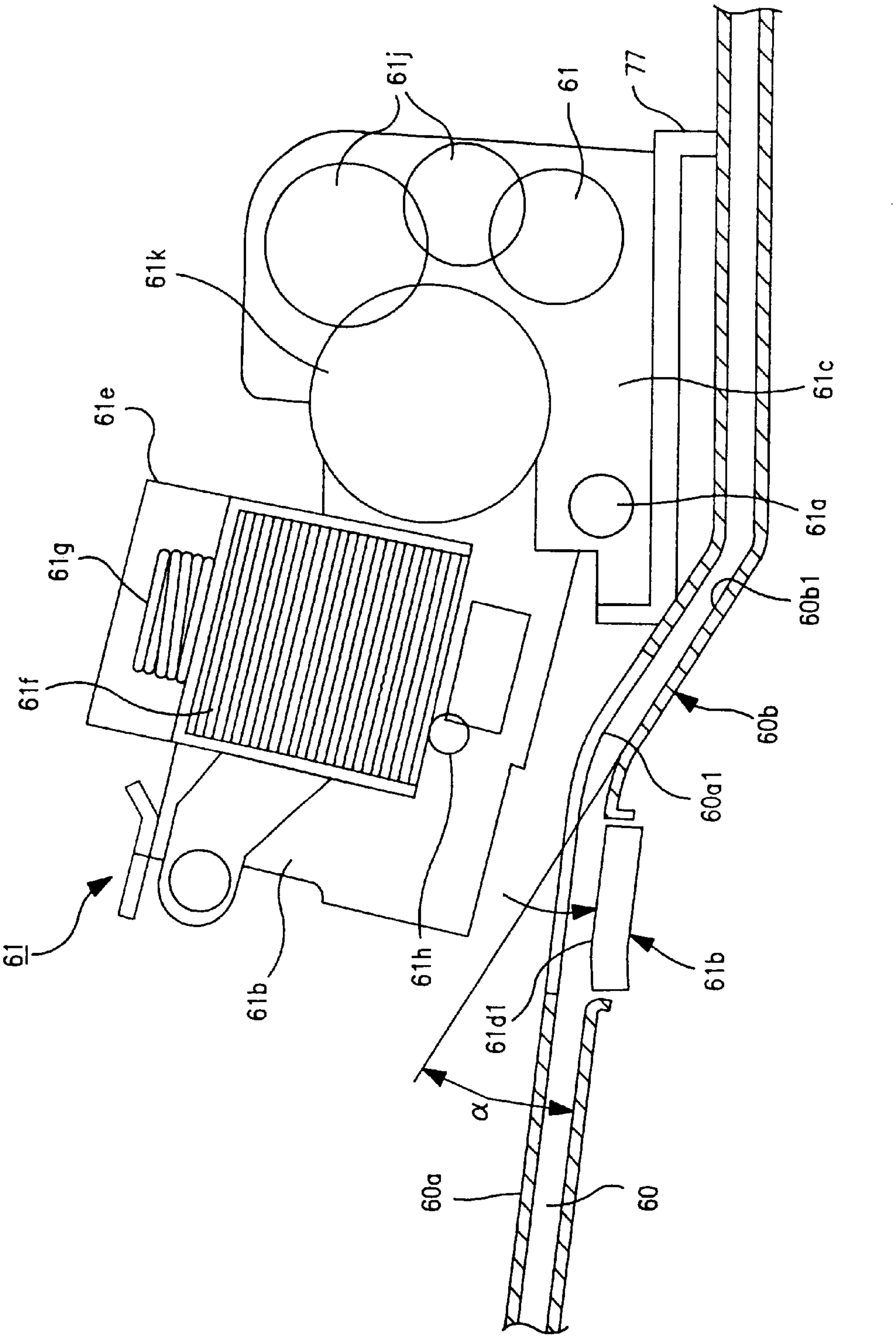
FIG. 48 is an illustration showing a structure of the stapler unit.

As shown in FIG. 48, the stapler unit 61 is mounted at two locations symmetrically in the horizontal direction with respect to the center in the sheet width direction by a support plate 77 secured to the frame at a center position in the conveyance direction of the sheet bundle aligned by the vertical path 60.

In FIG. 48, the stapler unit 61 is constituted of a forming portion 61*b* serving as a staple shooting means located on an upper side and supported pivotally around a rotary shaft 61*a*, a drive unit 61*c*, and a anvil 61*d*.

The vertical path 60 extends below the stapler unit 61 to guide the sheet bundle by the path guides 60*a*, 60*b* and the anvil 61*d*. The vertical guide 60 is structured so that a guide surface 60*b*1 of the path guide 60*b* for guiding the sheet bundle and a stapling surface 61*d*1 of the anvil 61*d* for stapling the guided sheet bundle are angled with alpha to each other. The path guide 60*a* with the angle alpha on the upper surface side for forming the vertical path has a cutoff hole 60*a*1 of a size not interfering with the forming portion 61*b* when the forming portion 61*b* of the stapler unit 61 is moved pivotally.

A staple cartridge 61*e* is detachably attached to the forming portion 61*b*, and in the staple cartridge 61*e*, the staples 61*f* connected as a plate form are filled in a number of about 2000 to 5000. The staples 61*f* in the plate form filled in the staple cartridge 61*e* are urged downward by a spring 61*g* provided at a topmost end of the staple cartridge 61*e*, and the spring 61*g* gives the conveyance force to a staple feeding roller 61*h* disposed on a lowermost side.

The staples 61*f* fed by the staple feeding roller 61*h* are formed individually into a rectangular letter-U shape by rocking the forming portion 61*b* around the rotary shaft 61*a* as the center in the arrow direction (the counterclockwise direction in FIG. 48). That is, when a stapler motor 61*i* starts moving, an eccentric cam gear 61*k* rotates through a gear series 61*j*. By operation of an eccentric cam mounted to the eccentric cam gear 61*k* as a united body, the forming portion 61*b* performs the stapling operation (clinching operation) by its rocking movement in the arrow direction in FIG. 48 (toward the anvil 61*d*), thereby stapling the sheet bundle by folding the hit staple 61*f* at the anvil 61*d* located at the lower surface of the sheet bundle.

A flag not shown is disposed coaxially with the eccentric cam gear 61*k*, and the apparatus detects the flag with a stapler sensor not shown to monitor whether the stapler unit 61 is in a clinching state, ends the clinching operation (or it is before clinching start).

Filling of the Staples

In the staple operation as described above, if no staple exists in the staple cartridge 61*e* as a staple filling member, the cartridge 61*e* has to be replaced. Now, filling of staples for the stapler unit 61 is described.

Figure 49:
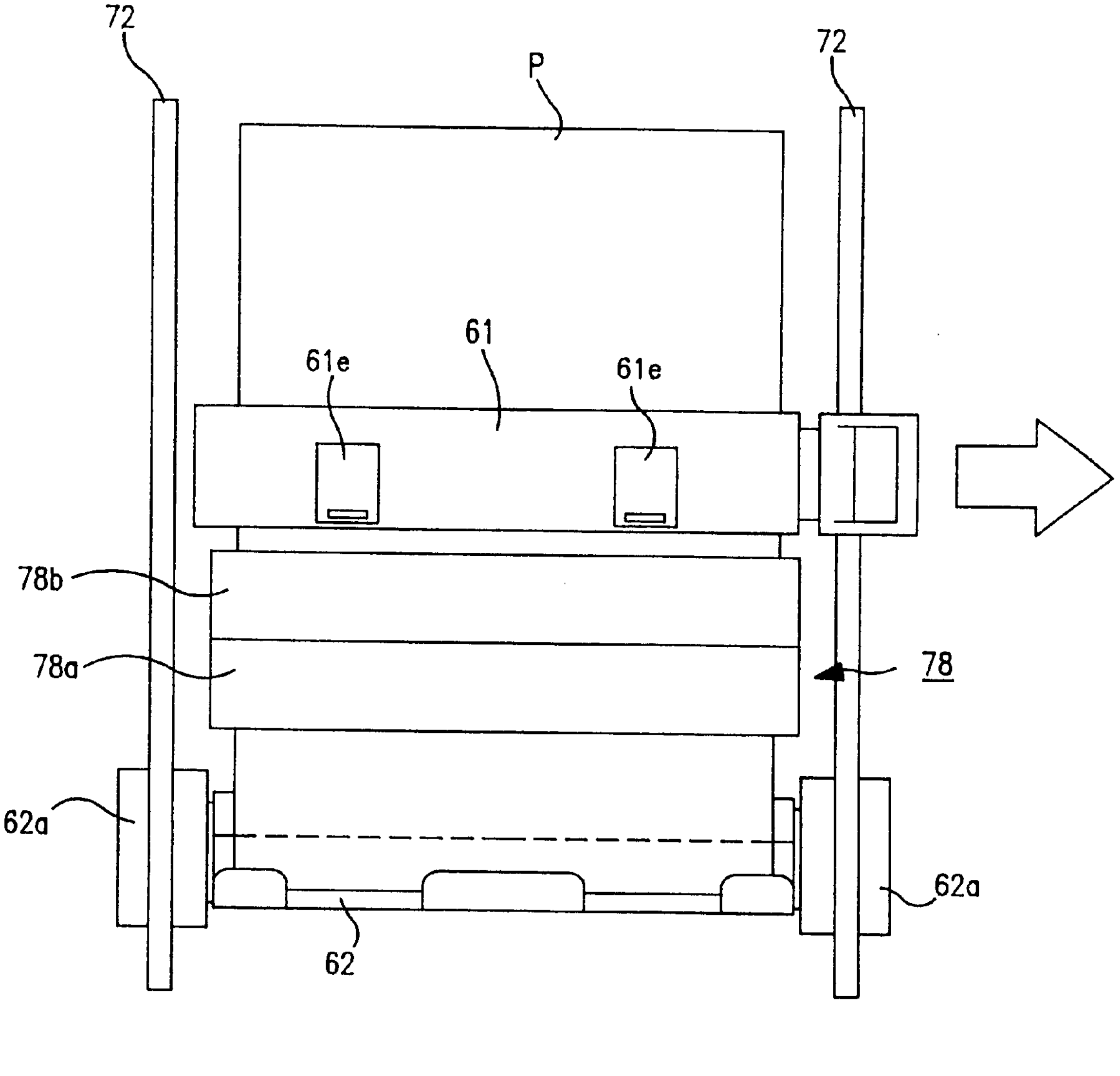
FIG. 49 is an illustration showing staple filling to the staple cartridge.

To the stapler unit 61 according to the embodiment, two staple cartridges 61*e* are to be attached for stapling two positions in the sheet width direction as shown in FIG. 49, and if all staple has gone from either staple cartridges 61*e*, the stapler unit can detect the no staple status.

When the no staple status is detected, the stapler unit 61 as shown in FIG. 49 is pulled in the arrow direction, and staples are newly filled in the staple cartridge 61*e*. If only one staple cartridge 61*e* becomes the no staple status where the other staple cartridge 61*e* still has some staples, the staples in the other staple cartridge 61*e* may be used up soon even where the staples are filled in the one staple cartridge 61*e*, and it is unproductive to pull the stapler unit 61 upon stopping the operation of the apparatus to fill the staples.

In this embodiment, when the no staple status is detected, the control panel as a display indicates to prompt to fill staples at the same time in the two staple cartridges 61*e* by pulling the stapler unit 61 to fill the staples in the one staple cartridge 61*c* in the no staple status and by replacing the remaining staples in the other staple cartridge 61*e* with new staples even where some staples are remaining the other staple cartridge 61*e*.

According to this display, where the staples are filled simultaneously in the two staple cartridges 61*e*, the two staple cartridges generally enter in the no staple status at the same time, so that when the one staple cartridge 61*e* holds no staple, the other staple cartridge 61*e* holds only few remaining staples even where both do not enter in the no staple status at the same time. Filling the staples in both cartridges at the same time makes this operation more productive than filling the staples individually in each staple cartridge 61*e* when each runs out the staples.

It is to be noted that although in this embodiment the two staple cartridges 61*e* are placed, staples in the all cartridges can be replaced at the same time even in a case that three or more staple cartridges 61 e are installed in the stapler unit 61.

The apparatus is required to detect as to whether the staple initialization is made where the stapler motor 61*i* (see, FIG. 48) is drive to initialize the staple state after the staples are filled as described above. Although such a staple initialization can be detected by a sensor or the like, the initialization in this embodiment is detected by checking the drive current value of the stapler motor 61*i*.

Figure 50A:
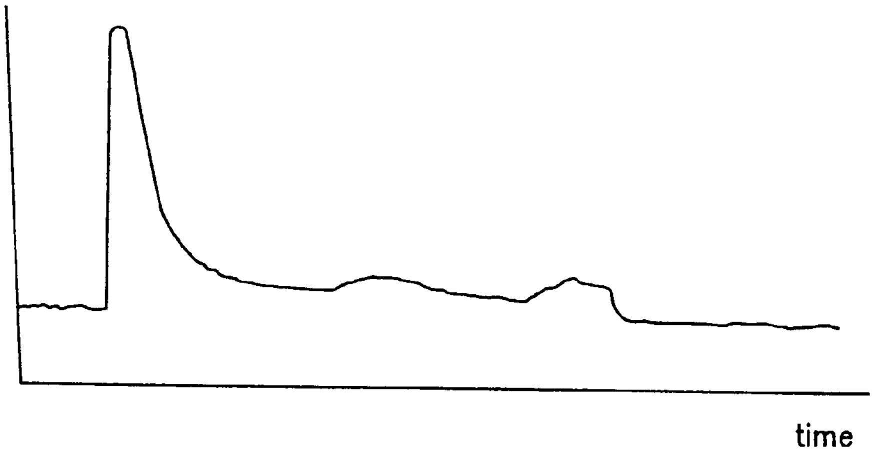
FIG. 50 is an illustration showing a motor drive current waveform during the staple initialization.
Figure 50B:
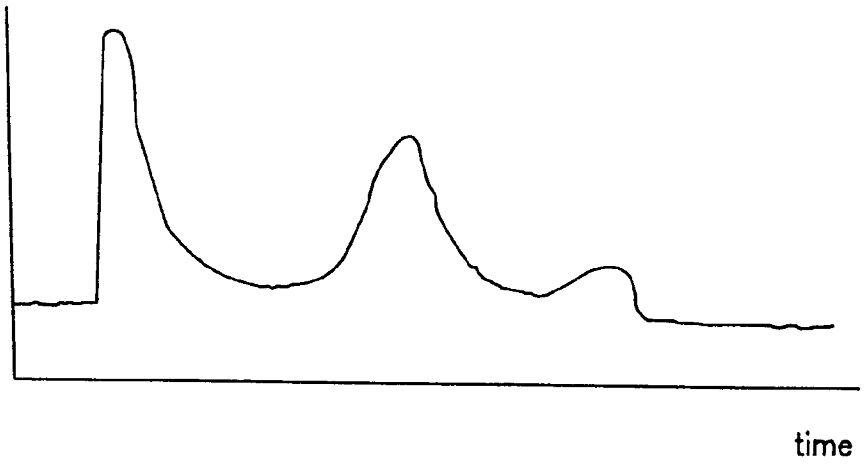
Figure 5I:
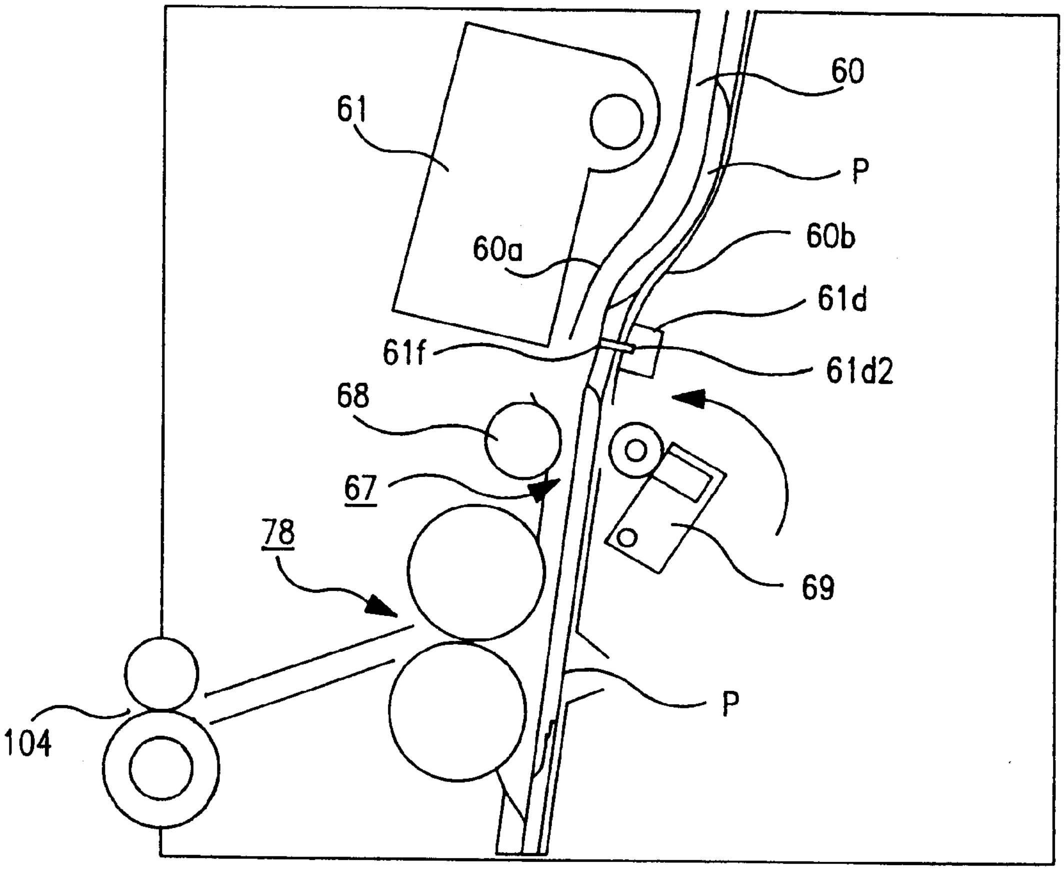

That is, where staples are set to the initialized position by drive of the stapler motor 61*i*, the stapler motor 61*i* is subject to a small load prior to the staple initialization (the empty shot state), and therefore, the current driving the stapler motor 61*i* is small as shown in FIG. 50(*a*). On the other hand, when the staples are set to the initial position (the staple shot state), the stapler motor 61*i* is subject to a large load, and therefore, the current driving the motor becomes larger than that in the empty shot state as shown in FIG. 50(*b*). Accordingly, when the value of the current driving the stapler motor 61*i* is detected, the apparatus detects that it is before the staple initialization if the detected current value is smaller than the prescribed value and that the staple initialization is done if the detected current value is larger than the prescribed value.

Such detection of the staple initialization in use of the drive current of the stapler motor 61*i* eliminates necessity for installing a special sensor for the staple initialization and can reduce the number of parts and costs.

Post-Processing of the Staple Operation)

After the sheet bundle P, which is conveyed and aligned at the vertical path 60 as described above, is stapled at the center in the sheet conveyance direction by drive of the stapler unit 61, the stopper 62 is moved down to convey the sheet bundle to the folding position. As shown in FIG. 51, at that time, if the staple 61*f* after the staple operation is fitted in a groove 61*d2* on the anvil 61*d*, the staple 61*f* is trapped at the groove 61*d2* even if the stopper 62 moves downward, thereby possibly causing conveyance failures of the sheet bundle P.

To solve such a problem, in this embodiment, as shown in FIG. 51, the pickup roller 69 of the lower roller pair 67 is structured to be rocked once in the arrow direction in FIG. 51 before the stapled sheet bundle P is conveyed downward. This rocking movement of the pickup roller 69 as the position changing means pushes the sheet bundle P toward the path guide 60*a*, and therefore, the staple 61*f* fitted in the groove 61*d2* on the anvil 61*d* is surely taken out of the groove 61*d2*. Accordingly, the stopper 62 does not move down while the staple 61*f* is fitted in the groove 61*d2*, and the apparatus can surely prevent failures in sheet conveyance from occurring.

Although in this embodiment, exemplified is an example that the pickup roller 69 is rocked to shift the position of the sheets to render the staple 61*f* escape from the groove 61*d2*, a special member as shifting means for shifting the sheets so as to take the staple 61*f* out of the groove 61*d2* may be provided instead of the pickup roller 69 and be executed so.

It is to be noted that when the sheet bundle is conveyed down by moving the stopper 62 downward, the pickup roller 69 is spaced from the drive roller 68, and the drive roller 68 is driven to rotate in a direction to move the sheet P down.

This structure does not create any frictional load during moving down of the sheet when the sheet bundle falls by its weight even where the sheet is in contact with the drive roller 68 formed of a material having a high frictional co-efficient. The sheet surely follows the dissenting stopper 62*b*, thereby guaranteeing the accuracy in the folding position.

Fine Adjustments of the Staple Position and the Folding Position

To perform the staple operation and the folding operation as described below accurately with respect to the center in the conveyance direction of the sheet bundle, the stopper 62 is required to move so that the center of the sheet bundle is positioned precisely at the staple position as well as the folding position. However, the length of the sheets may be not constant due to deviations when the sheets are cut or extensions or contractions due to humidity, and in some case, the staple position and the folding position may be out of the center of the sheet bundle P. In such a case, the position of the stopper 62 as a supporting means for supporting the lower end of the sheets is required to be finely adjusted.

In a conventional apparatus, the stopper is structured to be screwed in a long hole bored in a frame supporting the stopper, and the position of the stopper is finely adjusted in the range of the long hole, thereby finely adjusting the staple position and the folding position of the sheet bundle as described above.

However, such an apparatus is required to loosen the screw to finely adjust the position as described above and to fasten the screw after a fine adjustment is made, so that it requires laborious work for adjustment as well as makes tough to do a fine adjustment precisely. Such adjustment work is also done only by service persons.

In this embodiment, to solve such a problem, the shift amount of the stopper 62 is finely adjustable by a drive mechanism (see FIG. 47) as described above according to designations from an input means such as a control panel formed on the image forming apparatus body A or the sheet processing apparatus B.

More specifically, the apparatus is structured so that the shift amount (moving up amount) when the stopper 62 is moved from the home position to a lower end stopping position (stapling stopping position) as a stopping position for the staple operation according to the sheet size is finely adjustable according to the designation from a control panel (not shown) formed on the image forming apparatus body A. For example, the shift amount from the home position to the lower end position of the sheet of the respective sizes is normally constant for every sheet size, but the shift amount is increased or decreased by an amount according to the designation from the control panel as an input means to finely adjust the shift amount when the stopper 62 is moved up, thereby changing the stopping position by the portion of the fine adjustment.

Alternatively, the apparatus is structured so that the shift amount (moving down amount) when the stopper 62 is moved, after the sheets are stapled, from the lower end stopping position (stapling stopping position) according to the sheet size to a lower end stopping position (folding stopping position) during the folding operation is finely adjustable according to a dip switch (not shown) or a control panel on an electrical circuit substrate formed on the sheet processing apparatus B. The shift amount of the stopper 62 from the lower end stopping position during the staple operation to a lower end stopping position during the folding operation is constant (e.g., 70 mm in this embodiment) regardless the sheet size, but the shift amount is increased or decreased by an amount according to the dip switch on the electrical circuit substrate to finely adjust the shift amount when the stopper 62 is moved down, thereby changing the stopping position by the portion of the fine adjustment.

With such a constitution, the stopper for receiving the lower end of the sheet is finely adjustable precisely and easily.

The sheet may extend longitudinally due to roller pressure, temperature, humidity, and the like during the conveyance of the sheet. Therefore, where the sheet length is detected by a sheet length detecting means during conveyance of the sheet, the stopping position of the stopper 62 can be automatically adjusted according to the detected results.

Figure 52:
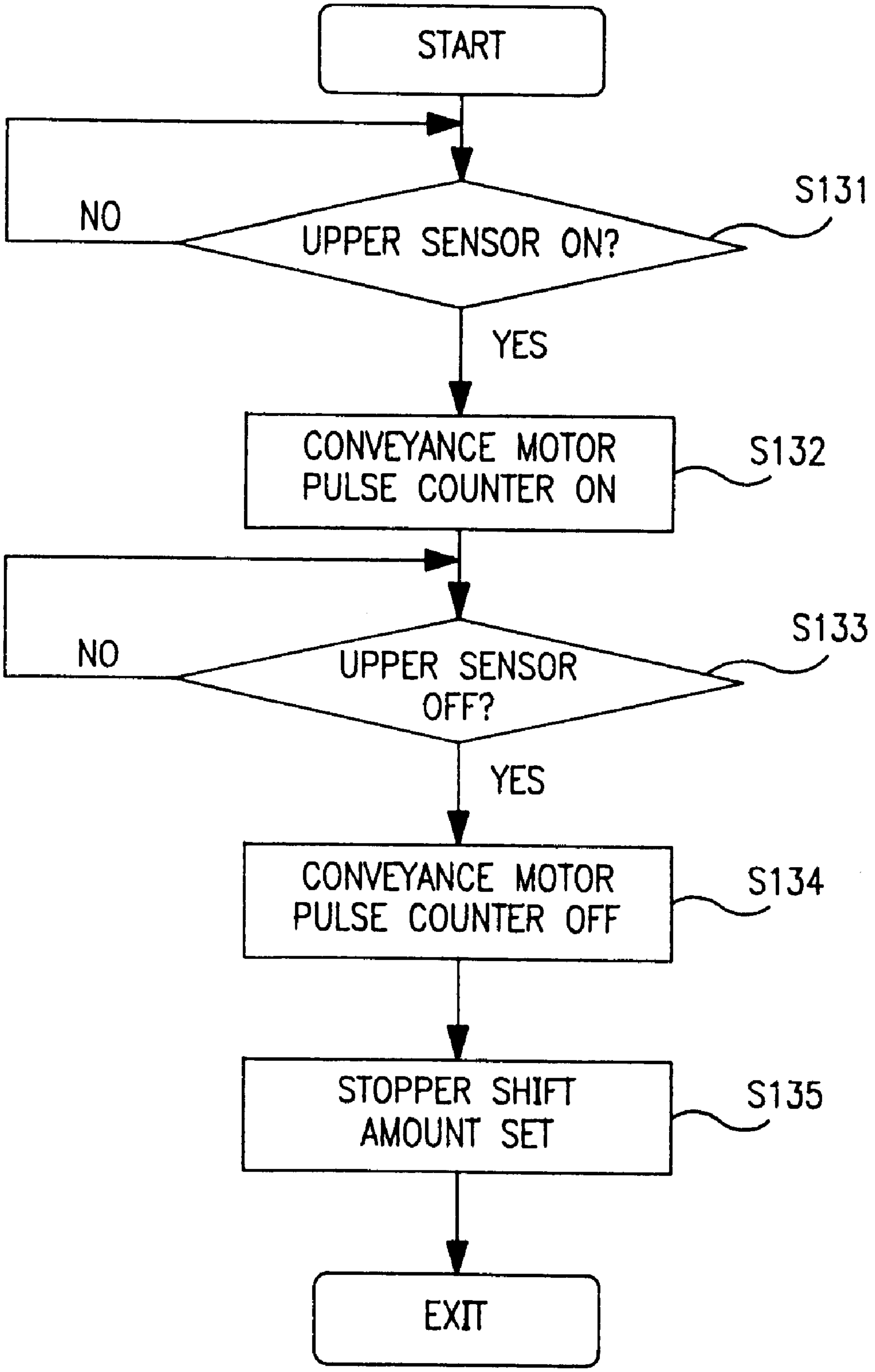
FIG. 52 is a flowchart in a case where the shifting amount of the stopper to the staple stopping position and folding stopping position is automatically adjustable.

For example, as shown in a flowchart of FIG. 52, when the sheet is conveyed to the vertical path 60, any one of the upper sensors 66*a* to 66*c* detects this according to the sheet size. When this sensor detects the front end of the sheet (S131), the pulse counter, not shown, for conveyance motor is turned on (S132) to count the pulse number up to a time from passing of the rear end of the sheet at the sensor position until the sensor is turned off (S133, S134). From this operation, the length of the sheet fed in the vertical path 60 can be detected precisely. The shift amount of the stopper 62 from the home position to the staple stopping position and the shift amount from the staple stopping position to the folding stopping position are finely adjusted upon automatic calculation by the control means according to the length of the conveyed sheet (slightly extended sheet) (S135), and the stopper 62 is moved according to the shift amount after the fine adjustment.

Where the stopper shift amount is automatically adjusted finely according to the sheet length detected during the conveyance, the user does not have to set for fine adjustment, and the sheet can be stopped at the staple position and the folding position precisely and easily.

Folding of the Sheet Bundle

Figure 53:
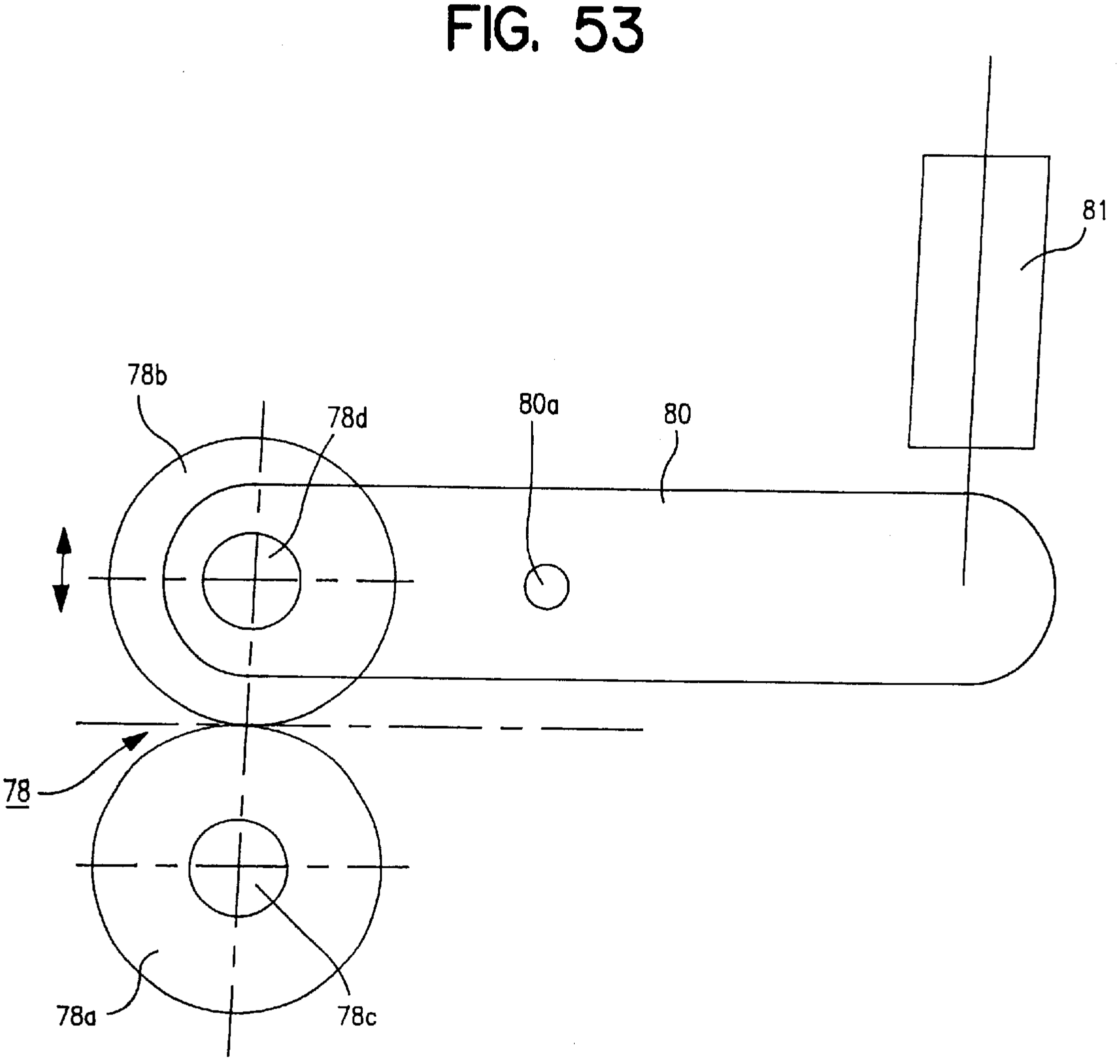
FIG. 53 is an illustration showing a movable structure of a movable roller.

Thus, the staple position is conveyed until reaching the position of the folding roller 78 disposed below the stapler unit 61 by the down movement of the stopper 62, and the sheets are hit by a striking plate 79*a* at the staple position and folded in folio on conveyed through nipping the sheets by the folding roller 78 while the sheets are in folio. Referring to FIG. 53 to FIG. 57, the sheet folding structure is described next As shown in FIG. 53, the folding roller 78 is constituted of a stable roller 78*a* pivotally movable around a secured rotary shaft 78*c*, and a movable roller 78*b* attached pivotally to a support arm 80 which can be pivotally moved around a pendulum 80*a* with respect to the apparatus frame. The folding roller 78 is constituted in which a spring 81 engaged at one end of the support arm 80 renders both rollers 78*a*, 78*b* in pressed contact with each other. This structure allows the pitch between the folding rollers 78 to be corrected according to the thickness of the sheet bundle P to be nipped.

Figure 54:
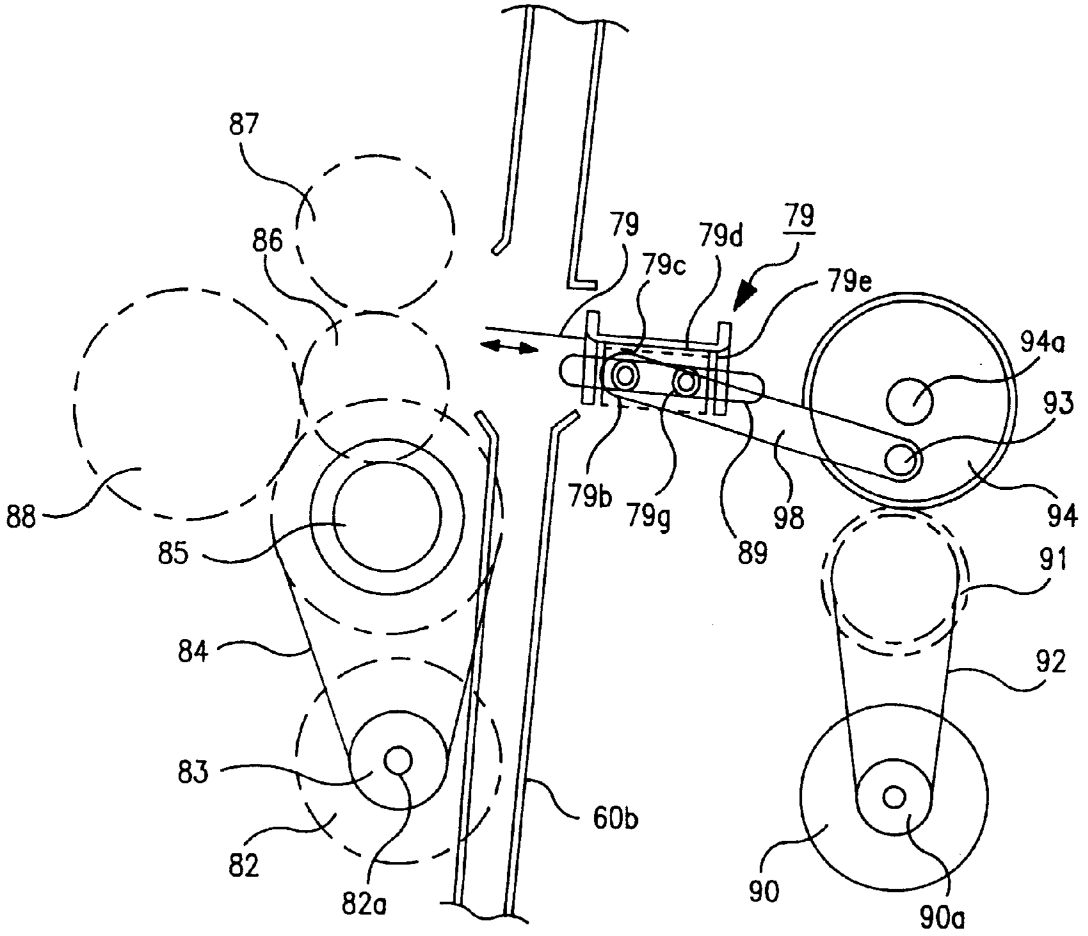
FIG. 54 is a side illustration showing a drive structure of the folding unit.
Figure 55:
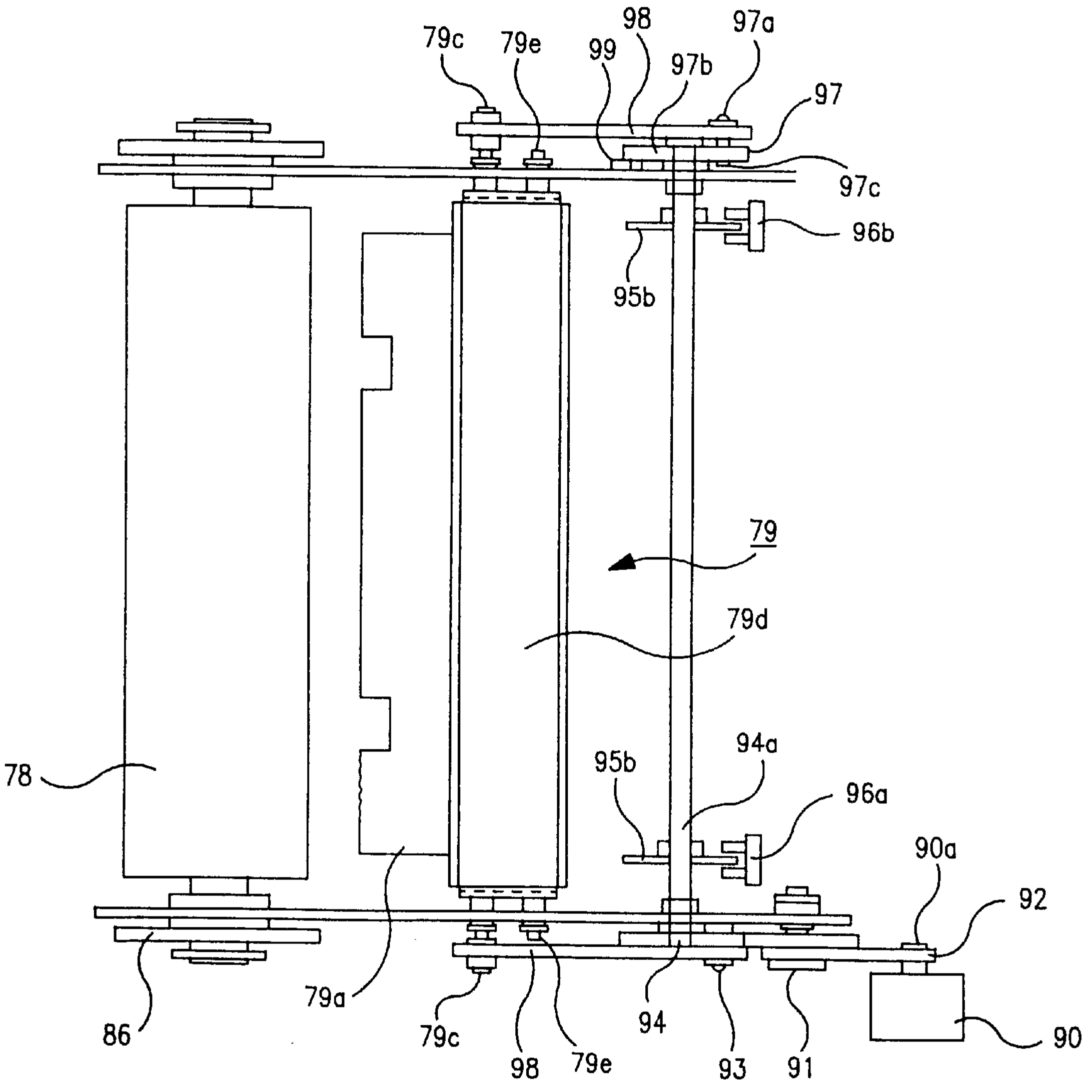
FIG. 55 is a plan illustration showing the drive structure of the folding unit.

The structure for driving the folding roller 78 is as shown in FIG. 54 and FIG. 55 with a motor pulley 83 secured to an output shaft 82*a* of a folding motor 82. The drive force of the motor pulley 83 is transmitted to a pulley of an idler gear pulley 85 via a timing belt 84. The idler gear pulley 85 is formed coaxially with the pulley and the gear portion.

Respective folding gears 86, 87 are secured to the shaft of the folding roller 78 described above, and both gears 86, 87 are in mesh with each other. One end of the folding gear 86 is in mesh with the gear portion of the idler gear pulley 85. The folding gear 86 is also meshing an idler gear 88.

The rotary force of the folding motor 82 is transmitted to the idler gear pulley 85 from the motor pulley 83 through the timing belt 84. The rotation of the idler gear pulley 85 is transmitted to the folding gear 87 from the folding gear 86, thereby driving the folding roller 78. The rotation force is also transmitted at the same time to the idler gear 88 in meshing with the folding gear 86. The idler gear 88 also transmits the rotation force to the delivery roller as described below.

In FIG. 54, the numeral 79 is a projecting unit as a projecting means, and is constituted of a projecting plate 79*a*, holders 79*b*, 79*d*, axes 79*c*, 79*e*, and so on. The projecting plate 79*a* is supported by the holders 79*b*, 79*d*, and the axes 79*c*, 79*e* are secured to the holder 79*b*. A roller not shown is rotatively mounted on outer peripheral surfaces of the axes 79*c*, 79*e*, and the roller slides in a groove 89 formed in the housing frame.

The numeral 90 is a projecting motor, and a motor pulley 90*a* is secured to the output shaft of the motor. The numeral 91 is an idler pulley, in which a pulley portion and a gear portion are formed coaxially. A timing belt 92 is wound around the pulley portion of the idler gear pulley 91 and the motor pulley 90*a*. The gear portion of the idler gear pulley 91 is in mesh with a gear 126 having an axis 93 as a part. As shown in FIG. 55, flags 95*a*, 95*b* are fixed to a rotary shaft 94*a* of a gear 94. The flags 95*a*, 95*b* have cutoffs as a part. A projecting home sensor 96*a* and a projecting position sensor 96*b* are provided at positions where the cutoffs of the flags 95*a*, 95*b* are detected. The projecting home sensor 96*a* is arranged to detect the projecting plate 79*a* at a position deeper than the sheet conveyance surface constituted by the path guides 60*a*, 60*b*, and the projecting position sensor 96*b* is arranged to detect the projecting plate 79*a* at a position where the projecting plate 79 is inserted.

As shown in FIG. 55, a rotational plate 97 having a shaft 97*a* in substantially the same way as the gear 94 is secured to the other end of the gear 94 On the rotary shaft 94*a*, and is structured to rotate in synchrony with the gear 94.

The rotary force of the projecting motor 90 is transmitted to the idler gear pulley 91 from the motor pulley 90*a* through the timing belt 92. The gear 94 rotates because the idler gear pulley 91, thereby moving the axis 93 circularly. One end of a link 98 is fitted to the axis 93, and the other end of the link 98 is fitted to the axis 79*c* of the projecting unit 79. Thus, the circle movement of the axis 93 is transmitted to the axis 79*c* of the projecting unit 79 through the link 98, and the axis 79*c* moves linearly along the groove 89 on the frame fitting to the axis 79*c* together through a roller, not shown.

The other end of the projecting unit is, in substantially the same manner, converting the circle movement of the rotational plate 97 and the axis 97 on the rotational plate 97 to a linear movement of the projecting unit through the link. The projecting unit 79 thus moves slidably in always parallel to the folding roller 78 in the arrow direction of FIG. 54 upon receiving drive at the opposing ends.

Figure 56A:
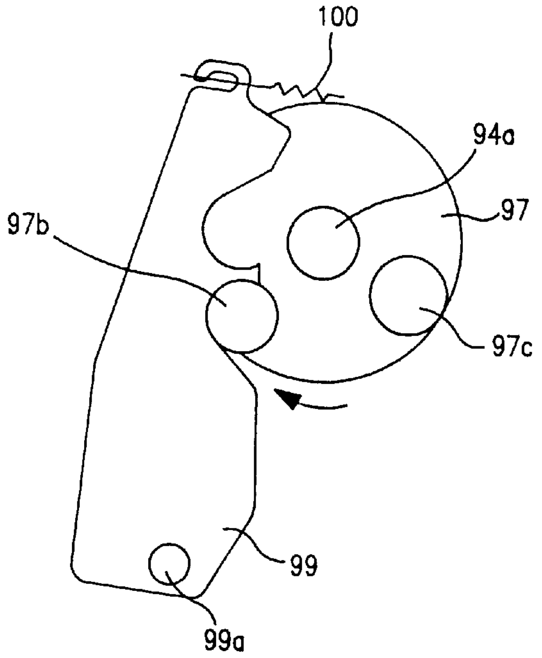
FIG. 56 is an illustration showing a stopper structure of a projecting plate.
Figure 56B:
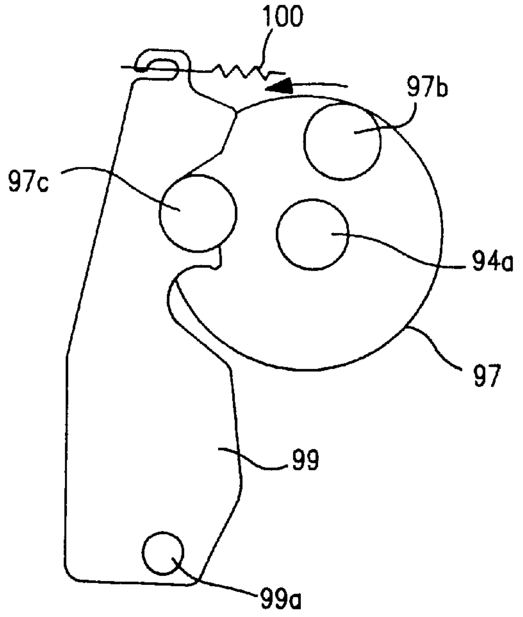

Moreover, as shown in FIGS. 55, 56, stopper shafts 97*b*, 97*c* are formed on a surface opposite to the axis 97*a* of the rotational plate 97; a stopper member 99 is provided pivotally around the a shaft 99*a* as a center on the housing frame and is urged toward the rotary shaft 94*a* by a spring 100. As described above, the projecting unit 79 moves in sliding by rotary movement of the rotational plate 97; the rotational plate 97 rotates in the arrow direction of FIG. 56(*b*); the projecting unit 79 projects therein; when the projection position sensor 96*b* reaches the detected position (upper left position in FIG. 54), the stopper shaft 97*c* and stopper member 99 are fitted to each other, and the rotational plate 97 rotates no more. Therefore, the projecting unit 79 is immobilized at the projecting position. When the projecting unit 79 is returned to the home position, the projecting motor 90 is rotated in a direction opposing to the direction at a time for projecting the unit, thereby disengaging the stopper member 99 and the stopper shaft 97*c* from each other. When the projecting unit returns to the home position, the stopper shaft 97*b* and the stopper member 99 are engaged with each other at a position (upper right position in FIG. 54) detected by the home sensor 96*a*, and therefore the rotational plate 97 rotates no more.

As described above, the apparatus is structured so that the projecting unit 79 moves horizontally from the normal and reverse rotations of the projecting motor 90.

Distance Between Nips of the Folding Roller and Center Adjustment of the Projecting Plate As described above, in the folding roller 78, the movable roller 78*b* moves up according to the thickness of the sheet bundle P. That is, the distance between the nips of the folding roller 78 may change. To the contrary, if the projecting position of the projecting plate 79*a* is always constant, the projecting plate 79*a* does not always strikes the center of the space between the nips of the folding roller 78, so that the sheet bundle P may be not be folded at a stapling position.

In this embodiment, the apparatus is so structured that a cam member allow the projecting plate 79*a* to strike always the center of the space between the nips even if the space between the nips of the folding roller 78 is deviated. This structure is described in reference to FIG. 57 in detail.

Figure 57A:
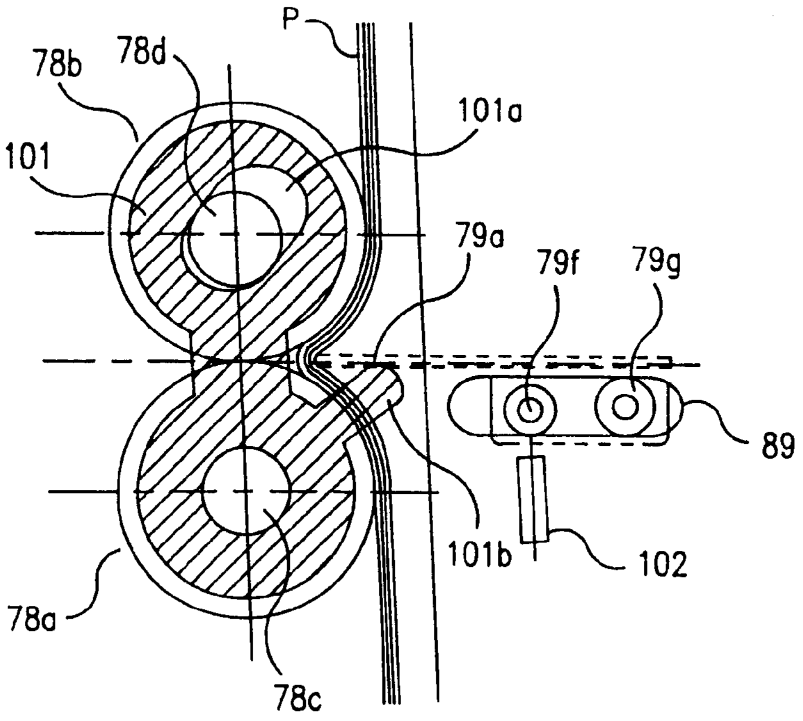
FIG. 57 is an illustration showing a structure of a cam member for adjusting the center of the projecting plate.
Figure 57B:
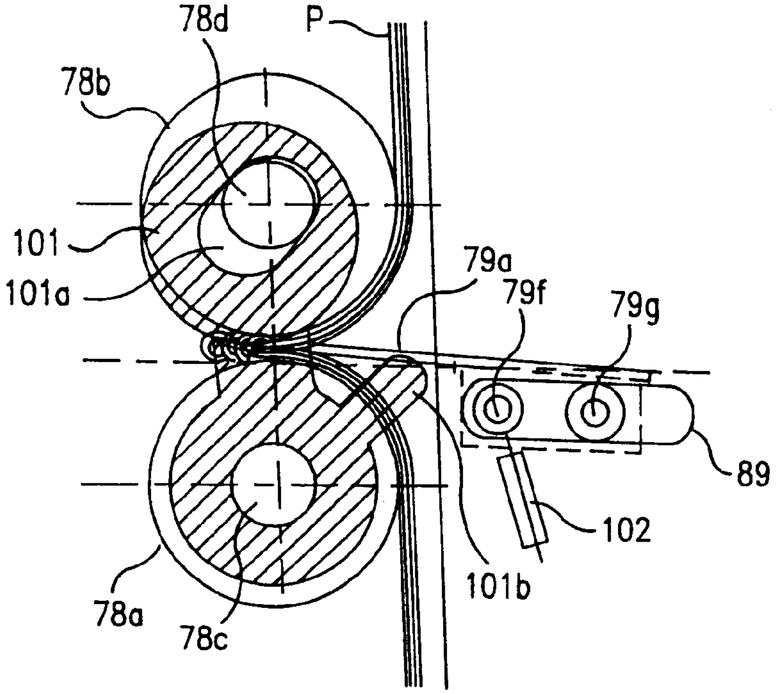

As shown in FIG. 57, the pushing unit 79 is structured to be rotatable around a sliding roller 79*g* as a center (the outer diameter of the sliding roller 79*f* is smaller than the width of the groove 89), and a cam member 101 to attached to both shafts 78*c*, 78*d* of the folding roller 78. The cam member 101 has a cam groove 101*a* capable of engaging with the movable roller shaft 78*d* and a guide portion 101*b* of the projecting unit 79, and the projecting unit 79 is slidable on the guide portion 101*b* and is urged downward by a spring 102.

The cam member 101 is mounted pivotably around a shaft 78*c* as a center of the stable roller 78*a*. When the movable roller 78*b* moves up upon rotation of the movable roller 78*b* around the center 80*a* (see, FIG. 53), the shaft 78*d* of the movable roller 78*b* pushes up the cam groove 101*a*. By this pressing, the cam member 101 rotates in the counterclockwise direction in FIG. 57, and as shown in FIG. 57(*b*), the guide portion 101*b* pushes up the projecting unit 79. It is to be noted that the cam groove 101*a* and the guide portion 101 are shaped to always project the projecting plate 79*a* to the center of the space between the nips of the folding roller 78.

By providing the cam member 101 thus structured, the projecting center of the projecting plate 79 is adjusted to strike always the center of the space between the nips, thereby surely folding the sheet bundle P at the staple position. The center adjustment of the projecting plate 79*a* can be done by replacement of the cam member 101 as described above, so that the structure cannot be complicated.

It is to be noted that although the sheet bundle P is nipped by the folding roller 78 upon folding the sheet bundle P by projection of the projecting plate 79*a*, wrinkles may occur on an inner sheet due to frictional force between the folded sheet and the projecting plate 79*a* if the projecting plate 79*a* is located at a position where the projecting unit 79 is projected even after the folding roller 78 nips the sheet bundle P.

Figure 58:
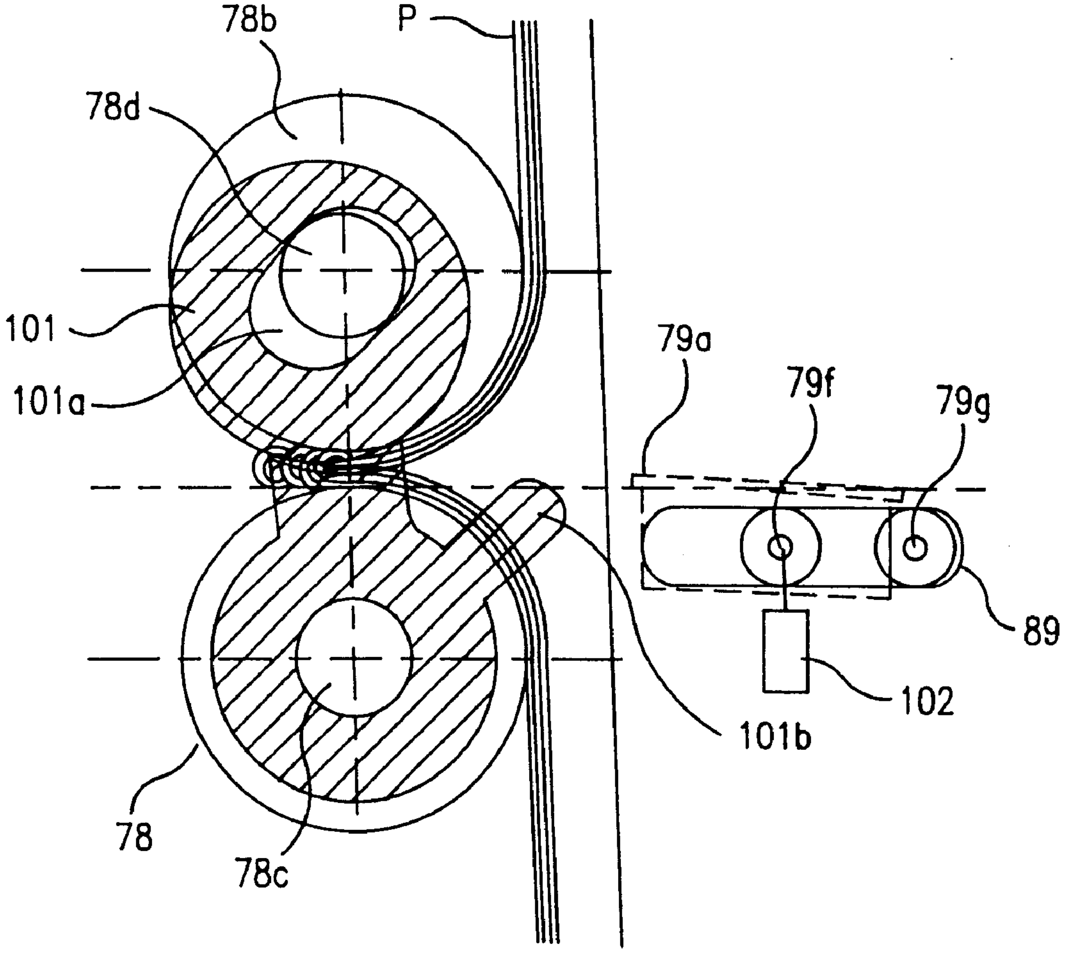
FIG. 58 is a state illustration when the projecting plate is pulled back.

In this embodiment, as shown in FIG. 58, the apparatus is structured that after the sheet bundle P is nipped by the folding roller 78, the projecting plate 79*a* is returned to the home position. If the projecting plate 79*a* is returned too early, the projecting plate 79*a* returns before the folding roller 78 nips the sheet bundle P. Therefore, in this embodiment, the projecting plate 79*a* is pulled back at a time that the folding roller 78 rotates in a prescribed amount to fold the sheet bundle P.

This operation prevent wrinkles from occurring where the folded sheet bundle P proceeds without suffering from friction to the projecting plate 79*a*, because the projecting plate 79*a* escapes to the home position at a time when the sheet bundle P is conveyed upon nipped by the folding roller 78.

Folding Operation

Folding operation for sheet bundle P is executed by projecting the center of the sheet bundle P already subjecting to the staple operation by the projecting plate 79*a*, and by conveying the sheet bundle P upon nipping the sheet bundle P with the folding roller 78 at the center of the sheet bundle P which is struck by the projecting plate 79*a*.

Images are recorded on respectively upstream half and downstream half, with respect to the sheet center, in the conveyance direction of respective sheets constituting the sheet bundle. Similarly, such image formation thus described is made on double sides of the sheet, and such image formation on the sheet bundle subjecting to the staple and folding operations is made according to the page order.

When the sheet bundle is pulled by the folding roller as described above, if an image is formed at the center of the sheet bundle, the image (toners) makes lower the sheet frictional coefficient, thereby causing a failure in pulling of the sheet bundle by the folding roller and possibly creating wrinkles and tears.

Figures 59A, 59B, 59C, 59D:
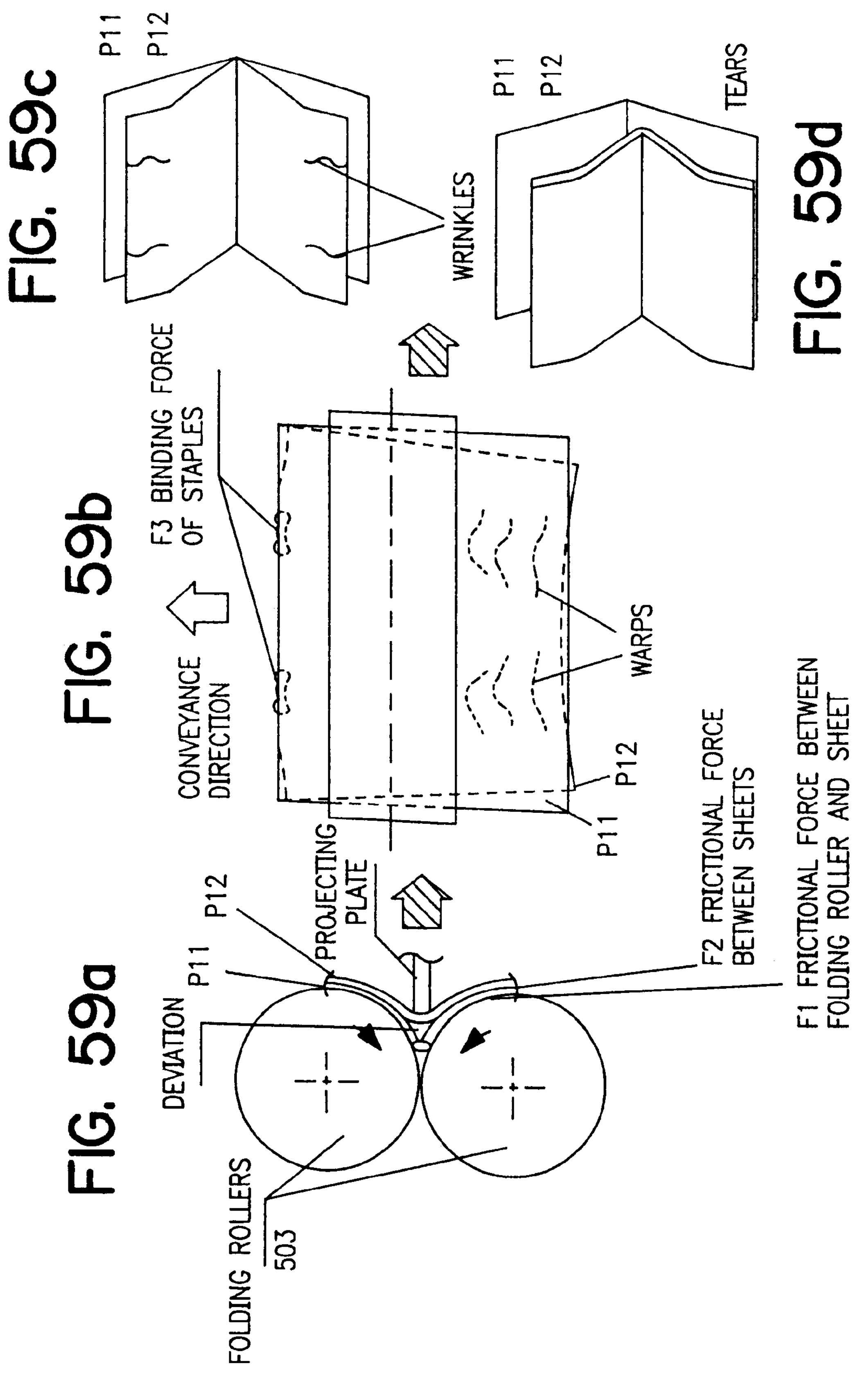
FIG. 59 is an illustration showing mechanisms of occurrences of tears and wrinkles in sheets during the folding operation.

Referring to FIG. 59, a mechanism of occurrences of tears and wrinkles of the sheet during the folding operation is briefly described. It is to be noted that a sheet bundle made of the two sheets P11, P12 is exemplified herein.

Where the fictional force between the folding roller 503 and the first sheet P11 is denoted as F1, where the frictional force between the first sheet P11 and the second sheet P12 is denoted as F2, and where the binding force of the staples fastening the sheet bundle is denoted as F3, ordinary folding operation is generally made while the forces satisfy the formula F1=F2+F3. However, to satisfy the above formula when the frictional force F2 between the sheets P11, P12 is made smaller, the binding force F3 of the staple is required larger. At that time, even where the sheet strength is durable enough against the binding force F3 of the staple, the second sheet P12 may be pulled by the staple, thereby inflicting scars as shown in FIG. 59(*a*), and creating warps as shown in FIG. 59(*b*). If the sheet bundle passes by the folding roller 503 in this state, wrinkles as shown in FIG. 59(*c*) may occur. Moreover, if the sheet is broken down due to the binding force F3 of the staple, tears as shown in FIG. 59(*d*) may occur.

Figure 60:
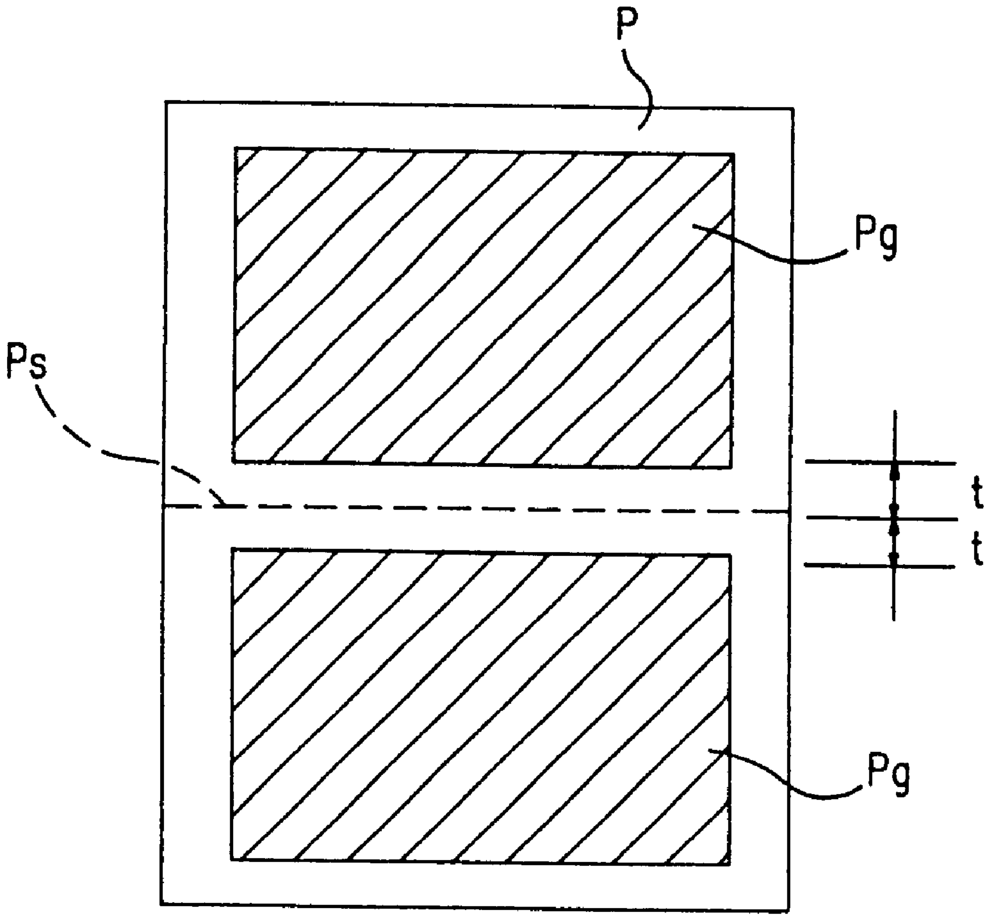
FIG. 60 is an illustration showing an image forming area and a margin for folding on a sheet.

In this embodiment, as shown in FIG. 60, a margin (folding margin t) of a certain size is provided at a center of the sheet (sheet bundle) P as a folded area. More specifically, image formation to the sheet P subjecting to a processing in the stitcher unit D is done during image recording in the image forming apparatus body A by avoiding in advance the folding margin t at the sheet center (in this embodiment, it is set as t=about 5 to 8 mm, margin width 2t=about 10 to 16 mm).

It is to be noted that in the drawing, Ps denotes the center (center in the conveyance direction) on the sheet P and that Pg denotes the image recording areas on the sheet P.

With this structure, the margin (folding margin t) formed on the sheet P in advance makes the frictional force between the sheet P and the folding roller 78 larger where the sheet bundle is pulled by the folding roller 78, so that wrinkles and tears as described above are suppressed, and so that the sheet bundle P is pulled in surely.

If the width of the margin is narrower than about 10 mm, adequate frictional force may not be obtained when the sheet bundle is pulled, and if the margin width exceeds about 16 mm, the image forming area may become smaller. Therefore, it is desirable to set the margin width between about 10 mm and 16 mm.

It is to be noted that although in this embodiment image formation is made in providing the margin of the prescribed width as described above for the sheet subjecting to the folding operation, the setting of the margin can be reset or cancelled where a larger image formation area is required. Where the sheet number of the sheets to be fold is few, the setting of the margin of the prescribed width can be cancelled to form images with an ordinary margin width (e.g., about 4 mm) because tears. may not be created even where the margin of the folded portion is narrowed. With this operation, the wide image formation area can he obtained.

In a case where the sheet bundle subjecting to the staple and folding operations as described above has a sheet forming a front cover (during a front cover mode), if images are formed on a back side of the sheet forming the front cover (hereinafter, referred to as "front cover sheet" ), silicon oil or the like may adhere when transferred toner images are fixed by a fixing means on the back side of the front cover sheet, thereby making lower the frictional coefficient between the back side of the front cover sheet and the sheet in contact with the front cover sheet. It is to be noted that though a fine quality paper (thick paper, cardboard paper, as well) can be used frequently, if silicon oil adheres on the fine quality paper, the frictional coefficient is further lowered in comparison with other sheets (plain papers). If such a front cover sheet is nipped by the folding roller to fold the sheet and is pulled in, the sheet may be skipped between the sheets because the frictional coefficient is so small between the back side of the front cover sheet and the sheet in contact with the front cover sheet, so that only the front cover sheet may be pulled.

In this embodiment, during the front cover mode, the apparatus does not make recording on the back side of the front cover sheet. More specifically, during the image recording period in the image forming apparatus body A, the front cover sheet is delivered without passing through the re-feeding path 7 (see, FIG. 1) after the image is recorded on the surface of the front cover sheet and is sent to the stitcher unit D.

It is to be noted that since in this embodiment the front cover sheets (fine quality sheets or the like) are to be fed from a multi-tray 8 (see, FIG. 1), the sheet is controlled to be delivered without passing through the re-feeding path 7 if the last sheet fed to the stitcher unit D is fed from the multi-tray 8.

This structure prevents the back side of the front cover sheet from contacting with the fixing means (namely, a fixing roller provided on a side of the image surface), and therefore, the silicon oil will not adhere on the back side of the front cover sheet, thereby preventing the frictional coefficient from lowering, and preventing the front cover sheet from being pulled solely.

Detection of Tears of the Sheet Bundle

A structure detecting tears by a detecting means such as a sensor may be generally conceivable in the case where the tears occur in the sheet bundle during folding processing as described above, but if such a detecting means is provided separately to detect the tears, the number of parts and costs are increased. Because the subsequent sheet may be already conveyed when the tears are detected, paper jamming of a more serious degree may occur where the proceeding, sheet is remaining.

Figure 61:
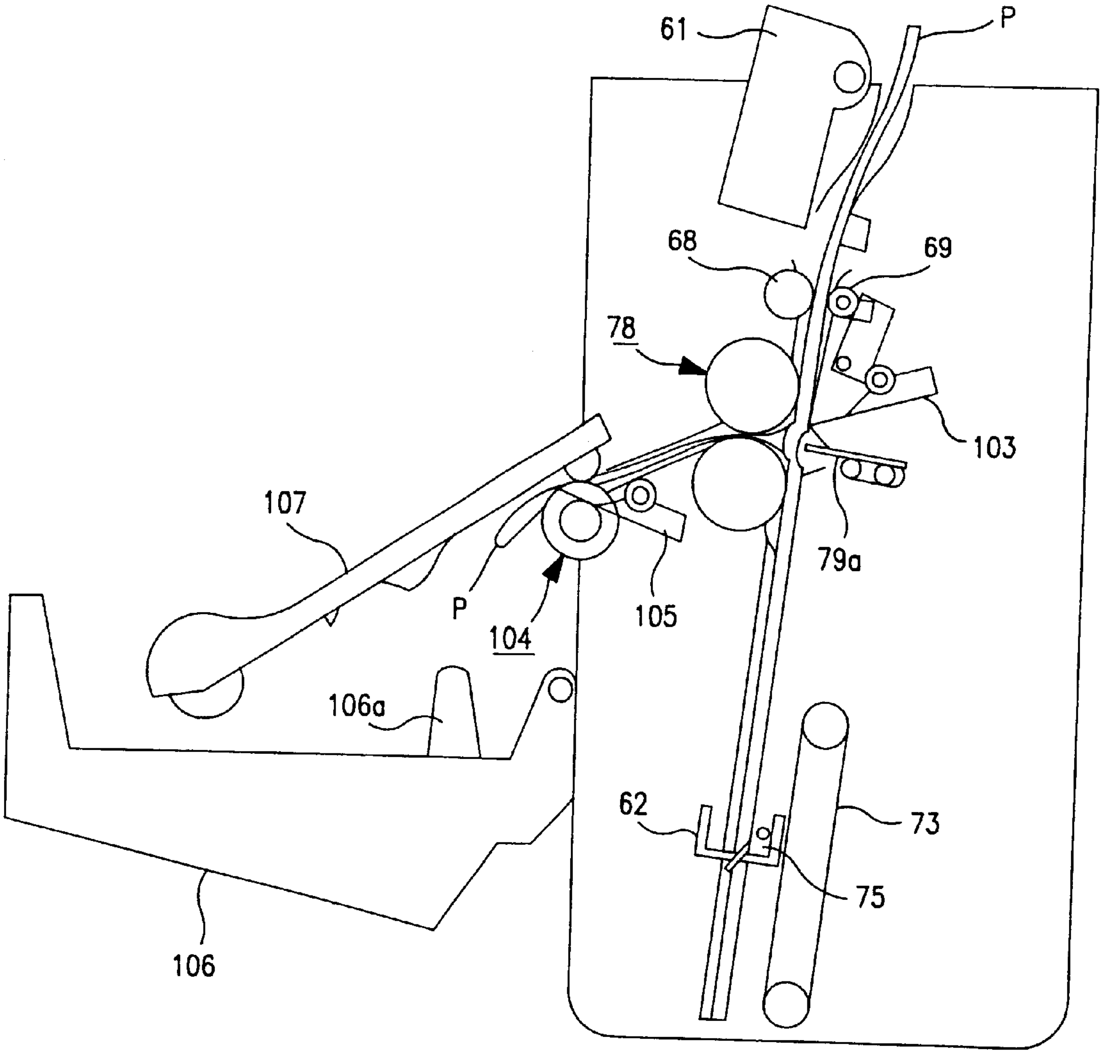
FIG. 61 is a diagram showing a layout of an intermediate sensor, a stopper sensor, and a delivery sensor which detect tears in sheets.

In this embodiment, as shown in FIG. 61, using an intermediate sensor 103 formed near the folding roller 78 (upstream side), the stopper sensor 75 formed at the stopper 62, and a delivery sensor 105 formed near a delivery roller 104, when the respective sensors detect the existence of the sheet at the same time, the apparatus is structured to detect that a sheet (or sheet bundle) is torn and stays at the stitcher unit D.

It is to be noted that although in this embodiment the occurrence of tears in sheets is detected when all of the intermediate sensor 103, the stopper sensor 75, and the delivery sensor 105 detect the existence of the sheet at the same time, the invented structure is not limited to this, and for example, the apparatus may detect the occurrence of tears in sheets when both of the stopper sensor 75 and the delivery sensor 105 detect the sheet existence.

With this structure, a detecting means for detecting as to whether tears occur in the sheet (or sheet bundle) is not necessarily installed separately, it is possible to prevent the increase of the number of the parts and the costs. Tears of the sheets can be detected early at the folding timing of the sheets, so that jamming of the sheets can be prevented by stopping the conveyance of the sheets early.

Delivery Operation

Figure 63:
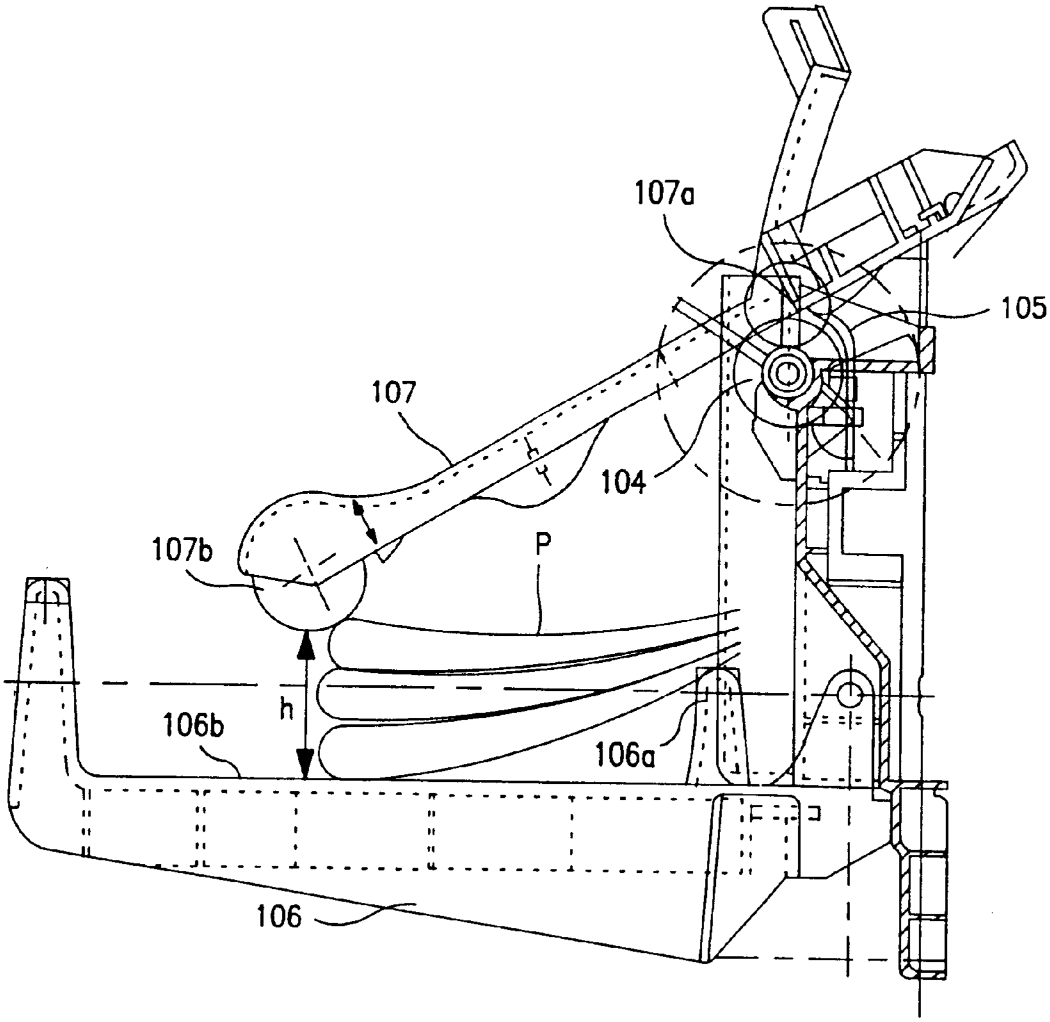
FIG. 63 is an illustration showing a stacking state of sheet bundles on a stack tray.

As described above, the sheet bundle subjecting to the folding operation is delivered on the stack tray 106 by the delivery roller 104 and stacked on the tray. A sheet bundle pressing member 107 for pressing the sheet bundle P is rotatively formed above the delivery roller 104 as shown in FIG. 63 around the rotary shaft 107a as a center. When the sheet bundle P subjecting to the folding operation is delivered on the stack tray 106 by the delivery roller 104 through the delivery opening, the pressing member 107 can press the end of the sheet bundle P, thereby stacking the sheet bundle P even where the bundle P is inadequately folded on the tray without unfolding the sheet bundle on the stack tray 106.

Figure 62:
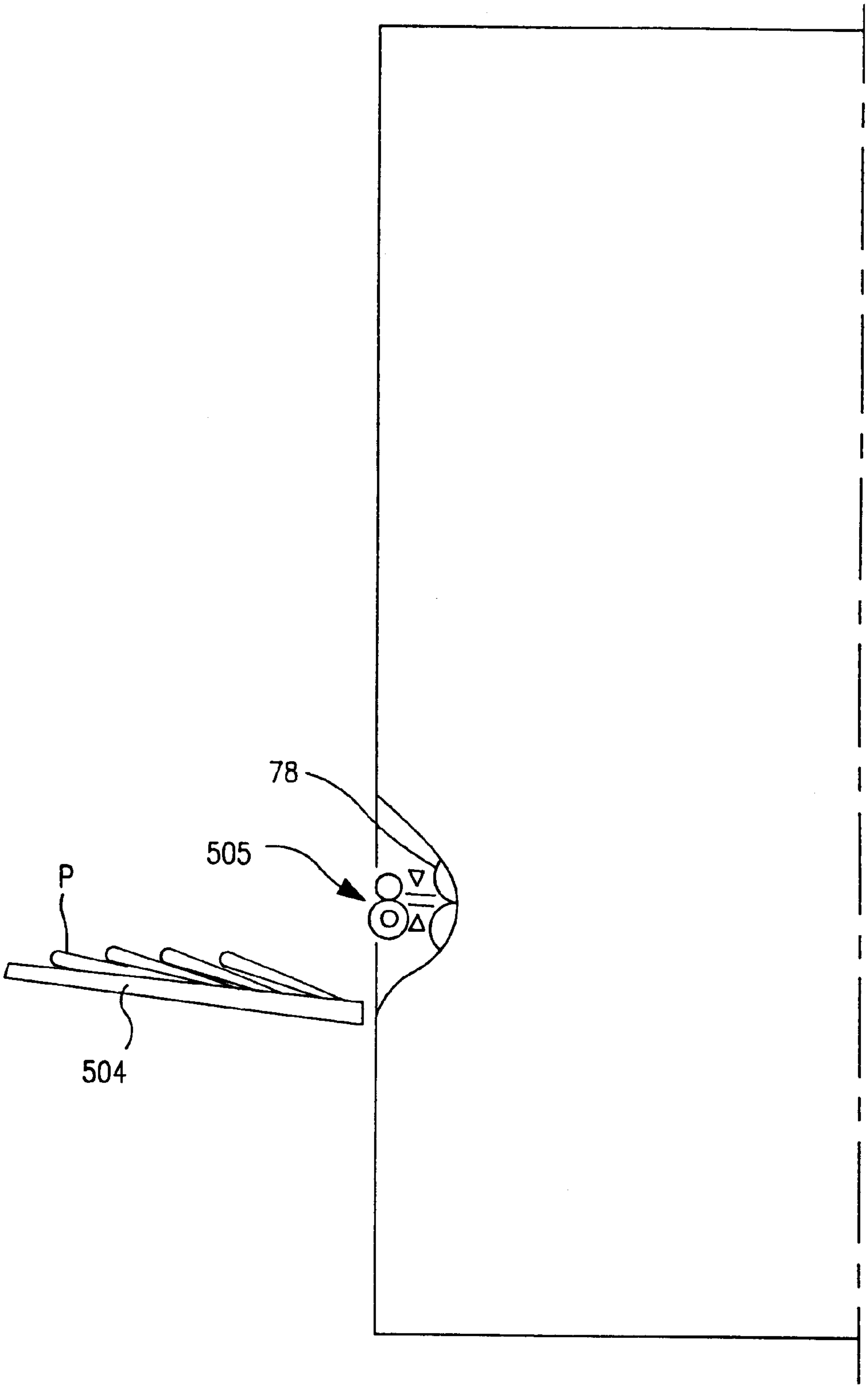
FIG. 62 is an illustration showing a shiftingly stacking state of sheet bundles on a stack tray.

This pressing member 107 is restricted so that a roller 107b formed at a tip of the member does not move below a prescribed height h (height not contacting with the stacking tray 106), but can freely move in a direction that the roller 107b is raised. Accordingly, any delivery failure, otherwise occurring by pressing the front end of a flexible sheet bundle P with the pressing member 107, would not occur, and therefore, the sheets can be surely stacked on the stack tray 106.

Where the sheet bundle P thus subjecting to the folding operation is delivered on the stack tray 106 by the delivery roller 104, since the sheets expand more on the sheet bundle folded side (the downstream side in the delivery direction) in comparison with the sheet bundle open side, if the bundles are stacked as they are, only the sheet bundle side becomes higher, thereby possibly rendering the stacking property of the sheet bundles unstable. To solve such a problem, as shown in FIG. 62, a device has been proposed having a structure to deliver and stack the sheet bundles P bundle by bundle in a positionally shifting manner so that the sheet bundles P delivered by the delivery roller 505 are shiftingly stacked on the stack tray 504.

However, the above structure requires a large stack tray for delivering many sheet bundles, and the apparatus may become larger, so does the installation space.

With this embodiment, as shown in FIG. 63, a portion near the delivery roller 104 of the stack tray 106 is made higher than the stacking surface 106b (projection 106a), the sheets are delivered so that the folded side of the sheet bundle P comes over the stacking surface 106b on the front end side (downstream side in the delivery direction) of the stack tray 106 and the open side comes over the projection 106a. By this structure, the folded side goes lower than the open side, and the height differential from the open side can be made smaller even where the folded side expands greatly more than the open side.

More specifically, when the sheet bundle P is thick (that is, in the case that the folded side particularly expands), the sheet bundle delivery speed by the delivery roller 104 is made slow, and the sheet bundles are delivered so that the open side of the sheet bundles P comes over the projection 106a. When the sheet bundle P is thin (that is, in the case that the folded side relatively does not expand so much), the sheet bundle delivery speed by the delivery roller 104 is made faster, and the sheet bundles are delivered so that the open side of the sheet bundles P does not come over the projection 106a.

With this operation, the sheet bundles P delivered on the stack tray 106 can avoid a situation that only one side (the folded side) is raised, thereby making the stacking property of the sheet bundle stable. The sheet bundles P are not necessarily stacked in a shifting manner, a large stack tray may not be needed.

Although in this embodiment the projection is formed, the invention is not limited to this structure, and can be structured with a slant portion, the stack tray 106 itself modified in a shape having a slope, or a projection extendable from the bottom of the stack tray 106 or detachable.

Description of the Control System

Figure 64:
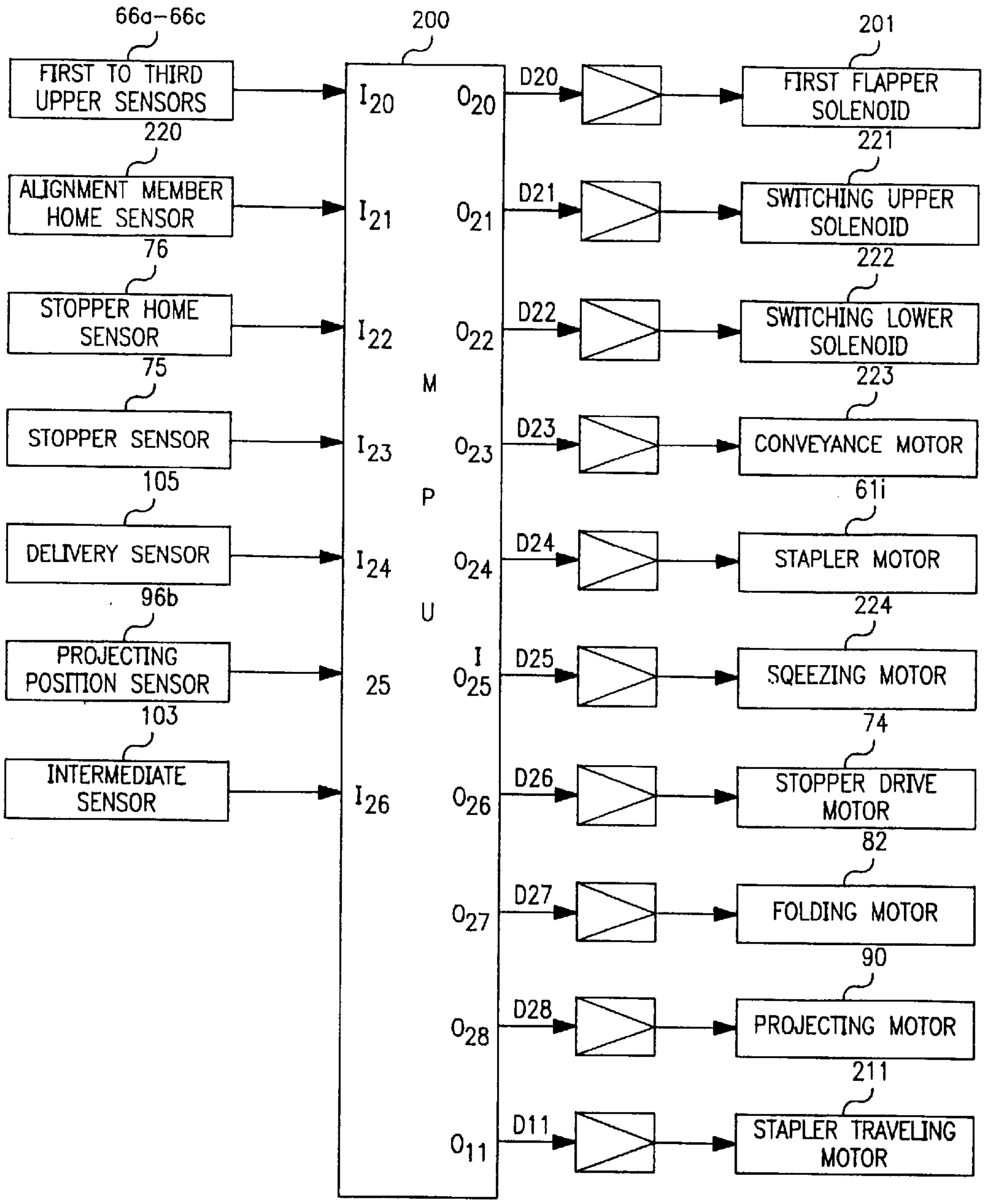
FIG. 64 is a block diagram showing an outline of a control system for stitcher unit.

Referring to FIG. 64, the structural elements of the control system for drive controlling the respective members in the stitcher unit as described above is briefly described.

In FIG. 64, an MPU 200 as a control means inputs respective sensors such as first to third upper sensors 66a to 66c detecting the existence, the front end, and the rear end of the sheet conveyed by the stitcher unit, an alignment member home sensor 220 for detecting the home position of the alignment member 71, the stopper home sensor 76 for detecting the home position of the stopper 62, the stopper sensor 75 formed at the stopper 62 for detecting the sheet, the delivery sensor 105 formed near the delivery roller 104, the projecting position sensor 96b for detecting the projecting position of the projecting plate 79a, the intermediate sensor 103 formed near the folded roller 78, and so on.

Based on the signals from the respective sensors and the image forming apparatus body A, the MPU 200 controls, through respective drivers D20 to D 28, a first flapper solenoid 201 for driving the first flapper 21 to feed the sheets to the vertical path of the stitcher unit, a switching upper solenoid 221 and a switching lower solenoid 222 for switching the first and second flappers 64a, 64b on the route of the vertical path, a conveyance motor 223 for conveying sheets by driving the upper and lower roller pairs 63, 67, the stapler motor 61i, a squeezing motor 224 for operating the alignment member 71, the stopper drive motor 74 for moving the stopper 62, the folding motor 82 for driving the folding roller 78, the projecting motor 90 for driving the projecting plate 79a, and so on, and renders operations as described above.

What is claimed is:

1. An image forming apparatus for folding plural sheets in folio comprising:

image forming means for forming images on a recording area on sheets, and forming a margin between the recording area and another forming area;

two rollers for folding the sheets in folio; and projecting means for folding the sheets upon nipping the sheets between the two rollers by projecting between the two rollers, so as to nip a part of the sheets where the margin is formed at first, wherein the projecting means projects to the margin of a prescribed width of images formed at an image forming apparatus body to fold the plural sheets.

2. An image forming apparatus for folding plural sheets in folio comprising:

an image forming apparatus body having image forming means for forming images on the sheets;

a sheet processing apparatus for stapling the plural sheets on which images are formed at the image forming apparatus body and bookbinding the sheets in folio; and margin determination means for determining a margin of a prescribed width wherein the margin of the prescribed width is placed at a folded portion of the sheets when the images are formed at the image forming apparatus body on the sheets to be folded and made into a book in the sheet processing apparatus.

3. The image forming apparatus according to claim 1, wherein the width of the margin is 10 to 16 mm.

4. The image forming apparatus according to claim 1, further comprising means for canceling the operation of the protecting means for placing the margin at the prescribed width.

5. An image forming apparatus for folding plural sheets in folio comprising:

an image forming apparatus body having image forming means for forming images on the sheets;

image forming means for forming images on a recording area on the sheets, and forming a margin between the recording area and another forming area; and a sheet processing apparatus for stapling the plural sheets on which images are formed at the image forming apparatus body and bookbinding the sheets in folio, wherein the margin is placed at a folded portion of the sheets when the images are formed at the image forming apparatus body on the sheets to be folded and made into a book in the sheet processing apparatus.

* * * * *

UNITED STATES PATENT AND TRADEMARK OFFICE
CERTIFICATE OF CORRECTION

PATENT NO. : 6,268,909 B1
DATED : July 31, 2001
INVENTOR(S) : Hiroki Honmochi et al.

It is certified that error appears in the above-identified patent and that said Letters Patent is hereby corrected as shown below:

Title page,
ABSTRACT, change "an" to -- on --.

Column 9,
Line 32, "(S1 to S15)." should read -- (S11 to S15). --.

Column 13,
Line 30, "thickness I" should read -- thickness t --.

Column 15,
Line 32, "bend." should read -- bent. --; and
Line 39, "direction" should read -- direction. --.

Column 18,
Line 47, "detect" should read -- detects --.

Column 20,
Line 2, "more rotates," should read -- rotates more, --.

Column 22,
Line 40, "bead" should read -- head --; and
Line 57, "going on" should read -- going on. --.

Column 24,
Line 32, "occurs" should read -- occur --.

Column 28,
Line 51, "he" should read -- be --.

Column 30,
Line 2, "pivotally" should read -- pivotal --.
Line 50, "reach" should read -- reached --.

Column 33,
Line 32, "drive" should read -- driven --.

Column 36,
Line 2, "on" should read -- and --.

UNITED STATES PATENT AND TRADEMARK OFFICE

CERTIFICATE OF CORRECTION

PATENT NO. : 6,268,909 B1
DATED : July 31, 2001
INVENTOR(S) : Hiroki Honmochi et al.

It is certified that error appears in the above-identified patent and that said Letters Patent is hereby corrected as shown below:

Column 37,
Line 48, "strikes" should read -- strike --.

Column 38,
Line 36, "prevent" should read -- prevents --.

Column 39,
Line 51, "fold" should read -- folded --; and
Line 56, "he" should read -- be --.

Signed and Sealed this

Ninth Day of April, 2002

*Attest:*

JAMES E. ROGAN
*Director of the United States Patent and Trademark Office*

*Attesting Officer*